(12) United States Patent
Yoshikawa et al.

(10) Patent No.: US 12,393,445 B2
(45) Date of Patent: Aug. 19, 2025

(54) COMPUTER-READABLE RECORDING MEDIUM STORING INFORMATION PROCESSING PROGRAM, INFORMATION PROCESSING METHOD, AND INFORMATION PROCESSING APPARATUS

(71) Applicant: Fujitsu Limited, Kawasaki (JP)

(72) Inventors: Daiki Yoshikawa, Handa (JP); Toru Kitayama, Kobe (JP); Yusuke Hara, Kawasaki (JP); Kenichirou Shimogawa, Numazu (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 18/474,378

(22) Filed: Sep. 26, 2023

(65) Prior Publication Data

US 2024/0211303 A1     Jun. 27, 2024

(30) Foreign Application Priority Data

Dec. 26, 2022 (JP) ................. 2022-208926

(51) Int. Cl.
*G06F 11/00* (2006.01)
*G06F 9/48* (2006.01)

(52) U.S. Cl.
CPC .................... *G06F 9/485* (2013.01)

(58) Field of Classification Search
CPC ............ G06F 11/0766; G06F 11/0793; G06F 11/079; G06F 11/076
See application file for complete search history.

(56) References Cited

U.S. PATENT DOCUMENTS

2019/0243740 A1    8/2019   Kambe et al.

FOREIGN PATENT DOCUMENTS

| JP | 2003341157 A | * | 12/2003 |
|---|---|---|---|
| JP | 2015-204036 | | 11/2015 |
| JP | 2019-139262 | | 8/2019 |
| JP | 2020-160817 | | 10/2020 |
| JP | 2022-133010 | | 9/2022 |

OTHER PUBLICATIONS

U.S. Non-Final Office Action in co-pending U.S. Appl. No. 18/243,308 dated Nov. 19, 2024.
U.S. Appl. No. 18/243,308, filed Sep. 7, 2023, Daiki Yoshikawa, Fujitsu Limited.

* cited by examiner

*Primary Examiner* — Katherine Lin
(74) *Attorney, Agent, or Firm* — STAAS & HALSEY LLP

(57) ABSTRACT

A recording medium stores a program causing a computer to execute a process including: classifying, based on a processing content of each job in a job group which has an execution order defined in a job flow, the job group into a groups; and restarting, when an abnormality of a first job classified into a first group of the groups is detected, by referring to a memory that stores information which indicates a job in a head execution order in a group as a starting point from which the job flow is to be restarted, based on information which indicates a job in a head execution order in a second group as a starting point from which the job flow is to be restarted, and is associated with the first group, the job flow from the job in the head execution order in the second group as the starting point.

5 Claims, 32 Drawing Sheets

FIG. 6

| JOB FLOW NAME | JOB ID | JOB NAME | PRECEDING JOB ID | FOLLOWING JOB ID |
|---|---|---|---|---|
| JOB FLOW A | 1 | JOB 1 | n/a | 2 |
| JOB FLOW A | 2 | JOB 2 | 1 | 3 |
| JOB FLOW A | 3 | JOB 3 | 2 | 4 |
| JOB FLOW A | 4 | JOB 4 | 3 | 5 |
| JOB FLOW A | 5 | JOB 5 | 4,10 | 6 |
| JOB FLOW A | 6 | JOB 6 | 5 | n/a |
| JOB FLOW A | 7 | JOB 7 | n/a | 8 |
| JOB FLOW A | 8 | JOB 8 | 7 | 9 |
| JOB FLOW A | 9 | JOB 9 | 8 | 10 |
| JOB FLOW A | 10 | JOB 10 | 9 | 5 |

FIG. 7

| JOB FLOW NAME | JOB ID | JOB NAME | TYPE |
| --- | --- | --- | --- |
| JOB FLOW A | 1 | JOB 1 (COLLECTION 1) | COLLECTION |
| JOB FLOW A | 2 | JOB 2 (PROCESSING 1) | PROCESSING |
| JOB FLOW A | 3 | JOB 3 (PROCESSING 2) | PROCESSING |
| JOB FLOW A | 4 | JOB 4 (PROCESSING 3) | PROCESSING |
| JOB FLOW A | 5 | JOB 5 (INTEGRATION 1) | INTEGRATION |
| JOB FLOW A | 6 | JOB 6 (ACCUMULATION 1) | ACCUMULATION |
| JOB FLOW A | 7 | JOB 7 (COLLECTION 2) | COLLECTION |
| JOB FLOW A | 8 | JOB 8 (COLLECTION 3) | COLLECTION |
| JOB FLOW A | 9 | JOB 9 (PROCESSING 4) | PROCESSING |
| JOB FLOW A | 10 | JOB 10 (PROCESSING 5) | PROCESSING |

FIG. 8

| JOB FLOW NAME | JOB ID | JOB NAME | TYPE | GROUP ID |
|---|---|---|---|---|
| JOB FLOW A | 1 | JOB 1 (COLLECTION 1) | COLLECTION | GROUP 1 |
| JOB FLOW A | 2 | JOB 2 (PROCESSING 1) | PROCESSING | GROUP 2 |
| JOB FLOW A | 3 | JOB 3 (PROCESSING 2) | PROCESSING | GROUP 2 |
| JOB FLOW A | 4 | JOB 4 (PROCESSING 3) | PROCESSING | GROUP 2 |
| JOB FLOW A | 5 | JOB 5 (INTEGRATION 1) | INTEGRATION | GROUP 3 |
| JOB FLOW A | 6 | JOB 6 (ACCUMULATION 1) | ACCUMULATION | GROUP 4 |
| JOB FLOW A | 7 | JOB 7 (COLLECTION 2) | COLLECTION | GROUP 1 |
| JOB FLOW A | 8 | JOB 8 (COLLECTION 3) | COLLECTION | GROUP 1 |
| JOB FLOW A | 9 | JOB 9 (PROCESSING 4) | PROCESSING | GROUP 2 |
| JOB FLOW A | 10 | JOB 10 (PROCESSING 5) | PROCESSING | GROUP 2 |

FIG. 11

| JOB FLOW NAME | JOB ID | JOB NAME | JOB STATUS | JOB END CODE |
|---|---|---|---|---|
| JOB FLOW A | 1 | JOB 1 (COLLECTION 1) | NORMAL END | 0 |
| JOB FLOW A | 2 | JOB 2 (PROCESSING 1) | NORMAL END | 0 |
| JOB FLOW A | 3 | JOB 3 (PROCESSING 2) | NORMAL END | 0 |
| JOB FLOW A | 4 | JOB 4 (PROCESSING 3) | NORMAL END | 0 |
| JOB FLOW A | 5 | JOB 5 (INTEGRATION 1) | ABNORMAL END | 1 |
| JOB FLOW A | 6 | JOB 6 (ACCUMULATION 1) | WAITING FOR EXECUTION | n/a |
| JOB FLOW A | 7 | JOB 7 (COLLECTION 2) | NORMAL END | 0 |
| JOB FLOW A | 8 | JOB 8 (COLLECTION 3) | NORMAL END | 0 |
| JOB FLOW A | 9 | JOB 9 (PROCESSING 4) | NORMAL END | 0 |
| JOB FLOW A | 10 | JOB 10 (PROCESSING 5) | NORMAL END | 0 |

| JOB FLOW NAME | JOB ID | JOB NAME | TYPE | |
|---|---|---|---|---|
| JOB FLOW A | 1 | JOB 1 (COLLECTION 1) | | ← COLLECTION |
| JOB FLOW A | 2 | JOB 2 (PROCESSING 1) | | ← PROCESSING |
| JOB FLOW A | 3 | JOB 3 (PROCESSING 2) | | ⋮ |
| JOB FLOW A | 4 | JOB 4 (PROCESSING 3) | | |
| JOB FLOW A | 5 | JOB 5 (INTEGRATION 1) | | |
| JOB FLOW A | 6 | JOB 6 (ACCUMULATION 1) | | |
| JOB FLOW A | 7 | JOB 7 (COLLECTION 2) | | |
| JOB FLOW A | 8 | JOB 8 (COLLECTION 3) | | |
| JOB FLOW A | 9 | JOB 9 (PROCESSING 4) | | |
| JOB FLOW A | 10 | JOB 10 (PROCESSING 5) | | |

| ... | JOB ID | JOB NAME | TYPE | GROUP ID |
|---|---|---|---|---|
| ... | 1 | JOB 1 (COLLECTION 1) | COLLECTION | |
| ... | 2 | JOB 2 (PROCESSING 1) | PROCESSING | |
| ... | 3 | JOB 3 (PROCESSING 2) | PROCESSING | |
| ... | 4 | JOB 4 (PROCESSING 3) | PROCESSING | |
| ... | 5 | JOB 5 (INTEGRATION 1) | INTEGRATION | ← GROUP 3 |
| ... | 6 | JOB 6 (ACCUMULATION 1) | ACCUMULATION | |
| ... | 7 | JOB 7 (COLLECTION 2) | COLLECTION | |
| ... | 8 | JOB 8 (COLLECTION 3) | COLLECTION | |
| ... | 9 | JOB 9 (PROCESSING 4) | PROCESSING | |
| ... | 10 | JOB 10 (PROCESSING 5) | PROCESSING | |

FIG. 17

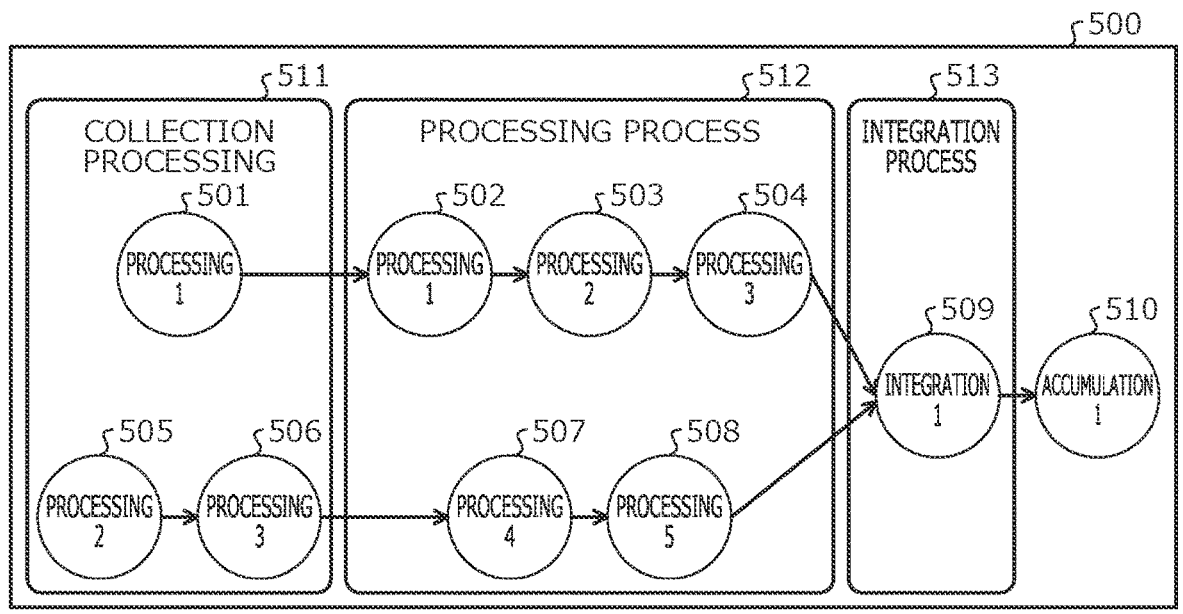

| ... | JOB ID | JOB NAME | TYPE | GROUP ID |
|---|---|---|---|---|
| ... | 1 | JOB 1 (COLLECTION 1) | COLLECTION | ← GROUP 1 |
| ... | 2 | JOB 2 (PROCESSING 1) | PROCESSING | GROUP 2 |
| ... | 3 | JOB 3 (PROCESSING 2) | PROCESSING | GROUP 2 |
| ... | 4 | JOB 4 (PROCESSING 3) | PROCESSING | GROUP 2 |
| ... | 5 | JOB 5 (INTEGRATION 1) | INTEGRATION | GROUP 3 |
| ... | 6 | JOB 6 (ACCUMULATION 1) | ACCUMULATION | |
| ... | 7 | JOB 7 (COLLECTION 2) | COLLECTION | ← GROUP 1 |
| ... | 8 | JOB 8 (COLLECTION 3) | COLLECTION | ← GROUP 1 |
| ... | 9 | JOB 9 (PROCESSING 4) | PROCESSING | GROUP 2 |
| ... | 10 | JOB 10 (PROCESSING 5) | PROCESSING | GROUP 2 |

FIG. 19

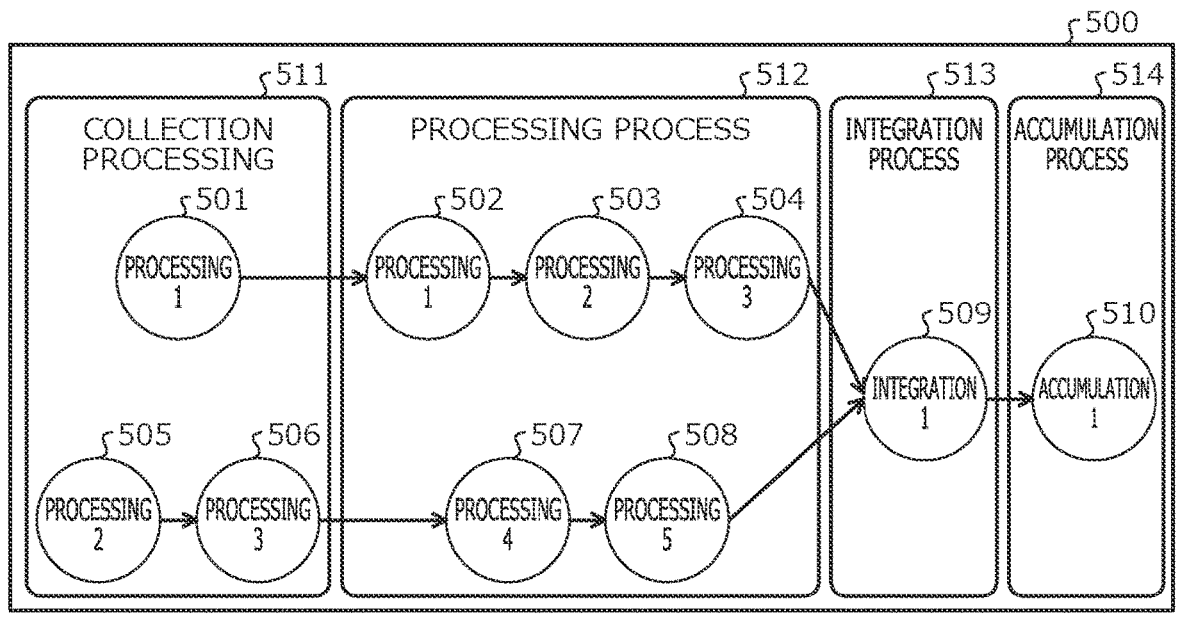

| ... | JOB ID | JOB NAME | TYPE | GROUP ID |
|---|---|---|---|---|
| ... | 1 | JOB 1 (COLLECTION 1) | COLLECTION | GROUP 1 |
| ... | 2 | JOB 2 (PROCESSING 1) | PROCESSING | GROUP 2 |
| ... | 3 | JOB 3 (PROCESSING 2) | PROCESSING | GROUP 2 |
| ... | 4 | JOB 4 (PROCESSING 3) | PROCESSING | GROUP 2 |
| ... | 5 | JOB 5 (INTEGRATION 1) | INTEGRATION | GROUP 3 |
| ... | 6 | JOB 6 (ACCUMULATION 1) | ACCUMULATION | ← GROUP 4 |
| ... | 7 | JOB 7 (COLLECTION 2) | COLLECTION | GROUP 1 |
| ... | 8 | JOB 8 (COLLECTION 3) | COLLECTION | GROUP 1 |
| ... | 9 | JOB 9 (PROCESSING 4) | PROCESSING | GROUP 2 |
| ... | 10 | JOB 10 (PROCESSING 5) | PROCESSING | GROUP 2 |

| GROUP ID | RESTART CONDITION | RESTARTING POINT |
|---|---|---|
| GROUP 1 | n/a | n/a |
| GROUP 2 | n/a | GROUP 1 |
| GROUP 3 | n/a | GROUP 2 |
| GROUP 4 | n/a | GROUP 4 |

| GROUP ID | TYPE | JOB ID | HEAD JOB IN GROUP |
|---|---|---|---|
| GROUP 1 | COLLECTION | 1,7,8 | 1,7 |
| GROUP 2 | PROCESSING | 2,3,4,9,10 | 2,9 |
| GROUP 3 | INTEGRATION | 5 | 5 |
| GROUP 4 | ACCUMULATION | 6 | 6 |

FIG. 24

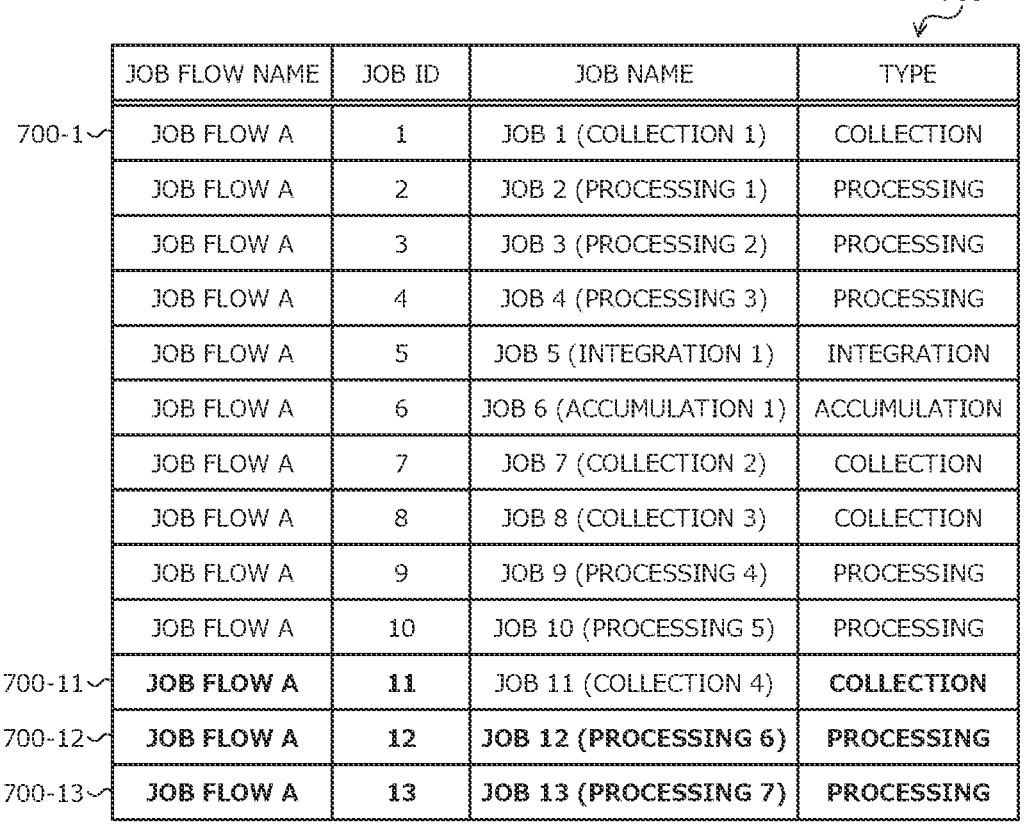

| JOB FLOW NAME | JOB ID | JOB NAME | TYPE |
|---|---|---|---|
| JOB FLOW A | 1 | JOB 1 (COLLECTION 1) | COLLECTION |
| JOB FLOW A | 2 | JOB 2 (PROCESSING 1) | PROCESSING |
| JOB FLOW A | 3 | JOB 3 (PROCESSING 2) | PROCESSING |
| JOB FLOW A | 4 | JOB 4 (PROCESSING 3) | PROCESSING |
| JOB FLOW A | 5 | JOB 5 (INTEGRATION 1) | INTEGRATION |
| JOB FLOW A | 6 | JOB 6 (ACCUMULATION 1) | ACCUMULATION |
| JOB FLOW A | 7 | JOB 7 (COLLECTION 2) | COLLECTION |
| JOB FLOW A | 8 | JOB 8 (COLLECTION 3) | COLLECTION |
| JOB FLOW A | 9 | JOB 9 (PROCESSING 4) | PROCESSING |
| JOB FLOW A | 10 | JOB 10 (PROCESSING 5) | PROCESSING |
| JOB FLOW A | 11 | JOB 11 (COLLECTION 4) | COLLECTION |
| JOB FLOW A | 12 | JOB 12 (PROCESSING 6) | PROCESSING |
| JOB FLOW A | 13 | JOB 13 (PROCESSING 7) | PROCESSING |

FIG. 25

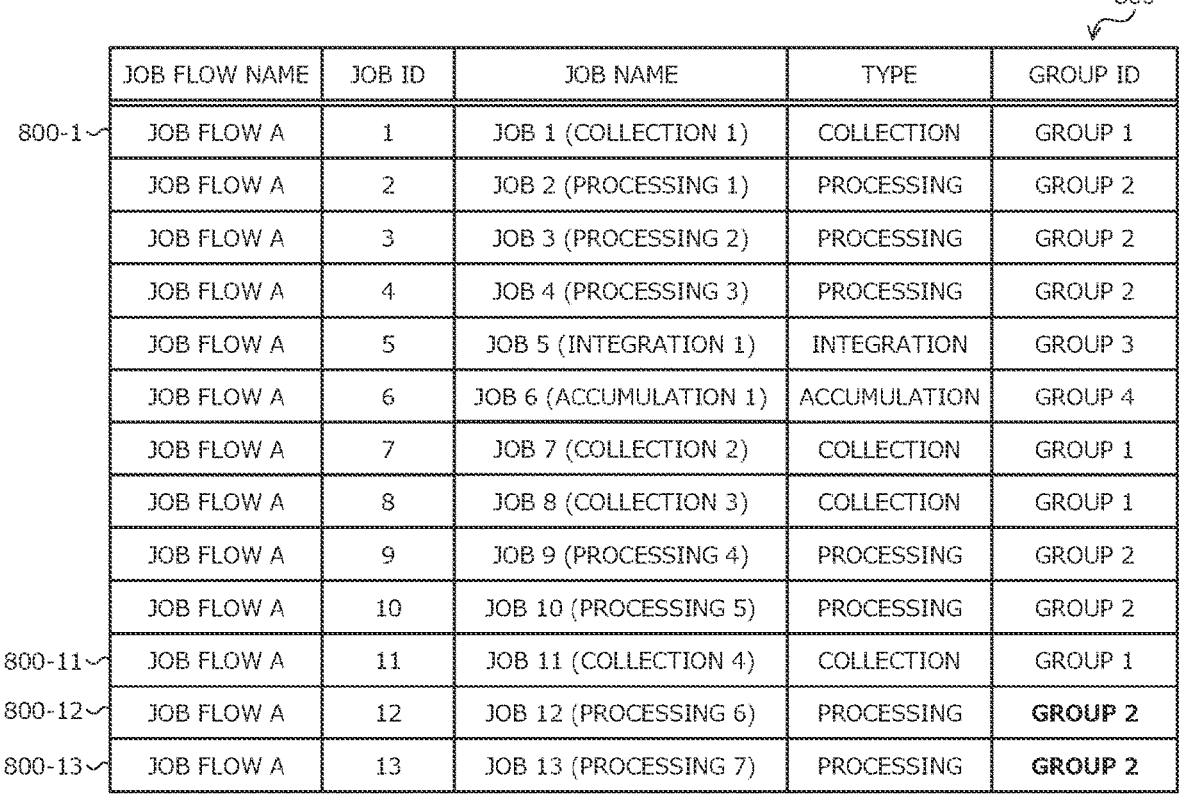

| | JOB FLOW NAME | JOB ID | JOB NAME | TYPE | GROUP ID |
|---|---|---|---|---|---|
| 800-1 | JOB FLOW A | 1 | JOB 1 (COLLECTION 1) | COLLECTION | GROUP 1 |
| | JOB FLOW A | 2 | JOB 2 (PROCESSING 1) | PROCESSING | GROUP 2 |
| | JOB FLOW A | 3 | JOB 3 (PROCESSING 2) | PROCESSING | GROUP 2 |
| | JOB FLOW A | 4 | JOB 4 (PROCESSING 3) | PROCESSING | GROUP 2 |
| | JOB FLOW A | 5 | JOB 5 (INTEGRATION 1) | INTEGRATION | GROUP 3 |
| | JOB FLOW A | 6 | JOB 6 (ACCUMULATION 1) | ACCUMULATION | GROUP 4 |
| | JOB FLOW A | 7 | JOB 7 (COLLECTION 2) | COLLECTION | GROUP 1 |
| | JOB FLOW A | 8 | JOB 8 (COLLECTION 3) | COLLECTION | GROUP 1 |
| | JOB FLOW A | 9 | JOB 9 (PROCESSING 4) | PROCESSING | GROUP 2 |
| | JOB FLOW A | 10 | JOB 10 (PROCESSING 5) | PROCESSING | GROUP 2 |
| 800-11 | JOB FLOW A | 11 | JOB 11 (COLLECTION 4) | COLLECTION | GROUP 1 |
| 800-12 | JOB FLOW A | 12 | JOB 12 (PROCESSING 6) | PROCESSING | GROUP 2 |
| 800-13 | JOB FLOW A | 13 | JOB 13 (PROCESSING 7) | PROCESSING | GROUP 2 |

COMPUTER-READABLE RECORDING MEDIUM STORING INFORMATION PROCESSING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2022-208926, filed on Dec. 26, 2022, the entire contents of which are incorporated herein by reference.

FIELD

The embodiment discussed herein is related to a computer-readable recording medium storing an information processing program, an information processing method, and an information processing apparatus.

BACKGROUND

In the related art, there is a system that executes a job group in accordance with a job flow. In a case where an abnormality occurs in one job of the job group and the one job is ended, the entire job flow is also ended for now, and thus it is desirable to restart the job flow.

Japanese Laid-open Patent Publication No. 2020-160817, Japanese Laid-open Patent Publication No. 2019-139262, Japanese Laid-open Patent Publication No. 2015-204036, and Japanese Laid-open Patent Publication No. 2022-133010 are disclosed as related art.

SUMMARY

According to an aspect of the embodiments, a non-transitory computer-readable recording medium stores an information processing program causing a computer to execute a process including: classifying, based on a processing content of each job in a job group which has an execution order defined in a job flow, the job group into a plurality of groups; and restarting, in a case where an abnormality of a first job classified into a first group of the plurality of groups is detected, by referring to a memory that stores, in association with at least one group of the plurality of groups, information which indicates a job in a head execution order in a group as a starting point from which the job flow is to be restarted among the plurality of groups, based on information which indicates a job in a head execution order in a second group as a starting point from which the job flow is to be restarted, and is associated with the first group, the job flow from the job in the head execution order in the second group as the starting point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of storing the job flow;

FIG. 7 is an explanatory diagram illustrating an example of contents stored in an attribute information management table;

FIG. 8 is an explanatory diagram illustrating an example of contents stored in a group information management table;

FIG. 11 is an explanatory diagram illustrating an example of contents stored in an execution history management table;

FIG. 17 is an explanatory diagram (part 6) illustrating the specific example in which the job group is classified into the plurality of groups;

FIG. 19 is an explanatory diagram (part 8) illustrating the specific example in which the job group is classified into the plurality of groups;

FIG. 24 is an explanatory diagram (part 2) illustrating the specific example in which the new job is added to the job group;

FIG. 25 is an explanatory diagram (part 3) illustrating the specific example in which the new job is added to the job group;

DESCRIPTION OF EMBODIMENTS

As the related art, for example, there is a technique in which, in a case where a new error of a job is detected and a plurality of recovery candidates are specified at the same time, a recovery process of the job is executed based on a priority correspondence order. For example, there is another technique for making a determination regarding an abnormality of a target job, based on a reference timing or a reference time changed based on monitoring information acquired by monitoring a monitoring target associated with the target job. For example, there is still another technique for re-executing a job specified by specific information of a notification destination job of an event corresponding to specific information of a notification source job of the event. For example, there is still another technique for returning a state of a system to a state before a target job and a job having a dependency relationship when the target job is executed are executed.

For example, in a case where an abnormality occurs in any job, a method of restarting a job flow from a job serving as a starting point set in advance among the job in which the abnormality occurs, a job immediately before the job in which the abnormality occurs, a job existing at a head of the job flow, and the like is conceivable. Meanwhile, it is difficult to appropriately set a starting point from which the job flow is to be restarted by the method described above. For example, as the number of jobs is increased, a work load for setting or updating a starting point from which the job flow is to be restarted tends to be increased, and it tends to be difficult to correctly set or update the starting point from which the job flow is to be restarted.

According to one aspect, an object of the present disclosure is to easily set a starting point from which a job flow is to be restarted.

Hereinafter, an embodiment of an information processing program, an information processing method, and an information processing apparatus according to the present disclosure will be described in detail with reference to the drawings.

(Example of Information Processing Method According to Embodiment)

Figure 1:
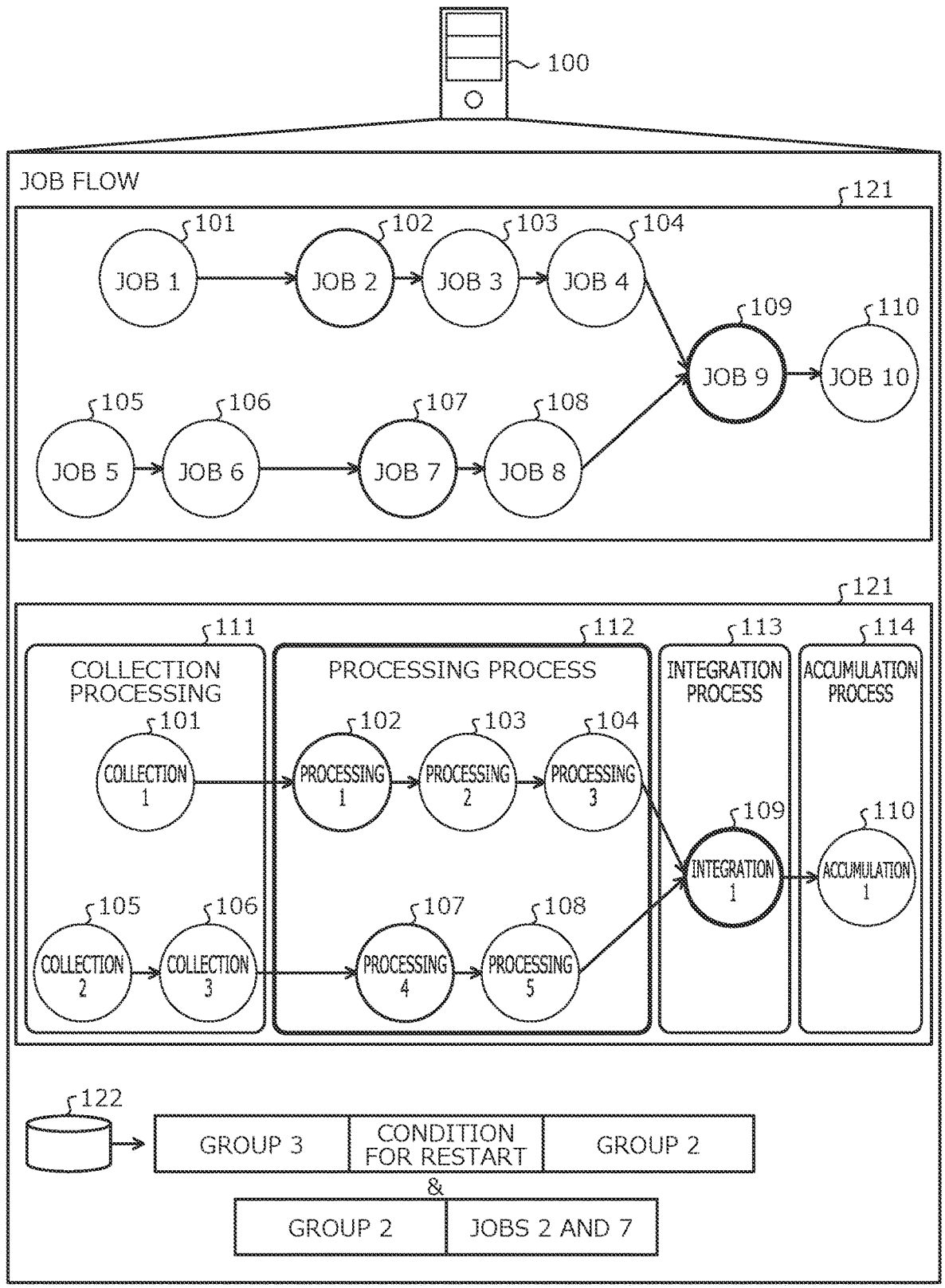
FIG. 1 is an explanatory diagram illustrating an example of an information processing method according to an embodiment.

FIG. 1 is an explanatory diagram illustrating an example of an information processing method according to an embodiment. An information processing apparatus 100 is a computer for starting a job flow. For example, the information processing apparatus 100 is a server, a personal computer (PC), or the like.

The job flow indicates, for example, a job group related to a system that uses data. For example, the job flow defines an execution order in a job group. The job flow indicates, for example, a data dependency relationship in the job group. Any job in the job group may be a job that uses data output by each of a plurality of jobs. The plurality of jobs may use data output by any job of the job group.

The job flow may be represented by, for example, a directed graph including a node representing each job in a job group and a directed edge coupling the nodes respectively representing two different jobs in the job group. For example, the directed edge couples a node representing any one job of the job group to a node representing another job that is executed next to the one job and uses data output by the one job. Accordingly, the directed edge indicates, for example, a data dependency relationship between the jobs.

For example, in the following description, another job represented by a node that is reachable by reversely tracing a directed edge from a node representing a certain job is treated as a "preceding job" preceding the certain job and existing before the certain job. On the other hand, for example, another job represented by a node that is reachable by sequentially tracing a directed edge from a node representing a certain job is treated as a "following job" that follows the certain job and exists after the certain job. For example, another job represented by a node that is unreachable by tracing a directed edge in order or in reverse from a node representing a certain job is treated as a "parallel job" that is parallel to the certain job. For example, a certain job and a parallel job that is parallel to the certain job may be executed in parallel.

Starting of a job flow means that each job in a job group, which has an execution order defined in the job flow, is sequentially started and execution of each job is sequentially started. Completing all the jobs in the job group corresponds to completing the job flow. According to the job flow, it is considered that after the execution of the job group is started, an abnormality occurs in any job of the job group, and the any job is ended.

For example, an abnormality of a certain job includes an error due to a timeout of the certain job, an error due to an environment in which the certain job is executed, an error due to processing contents of the certain job, an error due to processing contents of another preceding job preceding the certain job, and the like. In a case where an abnormality occurs in any one job in a job group and the one job is ended, a job flow is also ended for now.

Therefore, it is desirable to restart the job flow. At this time, the job group includes jobs waiting for execution and already executed jobs. The executed job may be a job that is already executed but is preferably re-executed to resolve the abnormality of the one job. The executed job may be a job that may not be re-executed. The executed job may be a job that may cause an error by being re-executed and is preferably not re-executed.

For example, depending on a type of abnormality that occurs in any job, which job is a job that is preferable to be re-executed may be changed. For example, when a job flow is restarted, there is a case where an abnormality of any job may not be solved unless a job which is preferably re-executed is re-executed. For example, when the job flow is restarted, re-execution of a job that does not have to be re-executed may lead to an increase in processing load and processing time taken to complete the job flow. Accordingly, it is desirable that a job serving as a starting point from which the job flow is to be restarted be flexibly changeable.

By contrast, in a case where an abnormality occurs in a certain job, a method of restarting a job flow from a single job serving as a starting point set in advance is conceivable. The single job serving as a starting point is set by an operator or the like of the job flow, for example. As the single job serving as a starting point, for example, it is considered that the certain job itself in which the abnormality occurs, another preceding job existing immediately before the certain job in which the abnormality occurs, another job existing at a head of the job flow, still another arbitrary job, or the like is set.

For example, the method described above is implemented by using a job flow branching technique. For example, in the method described above, a job flow is controlled such that processing branches from a certain job to a single job serving as a starting point set in advance, in accordance with an error code related to an abnormality occurring in the certain job.

According to the method described above, it may be difficult to appropriately set the job serving as a starting point from which the job flow is to be restarted. For example, the number of jobs included in a job group tends to be increased with an increase in a scale of a system that uses data. According to the method described above, as the number of jobs included in the job group is increased, when the operator or the like of the job flow sets or updates a starting point from which the job flow is to be restarted in association with each job, a work load and a work time for the operator or the like of the job flow are increased.

Unless the operator of the job flow grasps properties of the job, the operator of the job flow may not determine which any another job included in the job group is preferably set as a starting point from which the job flow is to be restarted in association with each job. Therefore, in the method described above, the operator of the job flow may have to refer to a design document or the like of the job flow to set a job serving as a starting point from which the job flow is to be restarted in association with each job. Therefore, when the starting point from which the job flow is to be restarted is set or updated, the work load and the work time for the operator or the like of the job flow are increased.

For example, as the system that uses data is updated, a new job may be added to the job group. According to the method described above, every time the new job is added to the job group, the operator or the like of the job flow sets the starting point from which the job flow is to be restarted in association with the new job, which leads to an increase in work load and work time for the operator or the like of the job flow.

Since the method described above causes an increase in work load and work time for the operator or the like of the job flow, there is a problem in that a probability that the operator or the like of the job flow may erroneously set the starting point from which the job flow is to be restarted is likely to be increased. In this manner, with the method described above, there is a tendency that it is difficult for the operator or the like of the job flow to correctly set or update the starting point from which the job flow is to be restarted.

In the present embodiment, an information processing method capable of easily setting a starting point from which a job flow is to be restarted will be described.

In FIG. 1, the information processing apparatus 100 stores a job flow 121. For example, the job flow 121 defines an execution order in a job group. For example, in the example illustrated in FIG. 1, the job group includes jobs 1 to 10. The job flow 121 indicates, for example, a data dependency relationship in the job group.

The job flow 121 is represented by a directed graph including nodes 101 to 110 representing the jobs 1 to 10, respectively. A node 10i representing a job i and a node 10j representing a job j that is executed next to the job i and uses data output by the job i are coupled by a directed edge. Accordingly, the directed edge indicates a data dependency relationship.

According to the job flow 121, the information processing apparatus 100 executes the job group. For example, the information processing apparatus 100 sequentially executes the job 1, the job 2, the job 3, and the job 4. For example, the information processing apparatus 100 sequentially executes the job 5, the job 6, the job 7, and the job 8. For example, the information processing apparatus 100 may execute the jobs 1 to 4 and the jobs 5 to 8 in parallel. For example, after the job 4 and the job 8 are completed, the information processing apparatus 100 sequentially executes the job 9 and the job 10.

(1-1) The information processing apparatus 100 classifies the job group into a plurality of groups, based on a processing content of each job of the job group having the execution order defined in the job flow 121.

For example, the information processing apparatus 100 assigns an attribute to each job, based on the processing content of each job of the job group. For example, the attribute includes collection, processing, integration, accumulation, or the like. The collection is, for example, an attribute indicating that data is collected from a data source. The processing is, for example, an attribute indicating that data obtained from a single preceding job is processed. The integration is, for example, an attribute indicating that data obtained from a plurality of preceding jobs is processed. The accumulation is, for example, an attribute indicating that data is stored in a database (DB).

For example, when a processing content of a certain job is to collect data, the information processing apparatus 100 assigns an attribute "collection" to the job. For example, when a processing content of a certain job is to process data obtained from a single preceding job, the information processing apparatus 100 assigns an attribute "processing" to the job.

For example, when a processing content of a certain job is to process data obtained from a plurality of preceding jobs, the information processing apparatus 100 assigns an attribute "integration" to the job. For example, when a processing content of a certain job is to store data, the information processing apparatus 100 assigns an attribute "accumulation" to the job.

For example, in the example illustrated in FIG. 1, the information processing apparatus 100 assigns the attribute "collection" to the jobs 1, 5, and 6. For example, the information processing apparatus 100 assigns the attribute "processing" to the jobs 2 to 4, 7, and 8. For example, the information processing apparatus 100 assigns the attribute "integration" to the job 9. For example, the information processing apparatus 100 assigns the attribute "accumulation" to the job 10. Thus, the information processing apparatus 100 may specify an attribute corresponding to the processing content of the job, and may obtain a guideline for classifying the job group into a plurality of groups.

For example, the information processing apparatus 100 classifies the job group into the plurality of groups, based on the attribute assigned to each job. For example, the plurality of groups include a group which has a collection attribute and into which a job having the collection attribute is classified. For example, the plurality of groups include a group which has a processing attribute and into which a job having the processing attribute is classified. For example, the plurality of groups include a group which has an integration attribute, and into which a job having the integration attribute is classified. For example, the plurality of groups include a group which has an accumulation attribute, and into which a job having the accumulation attribute is classified.

In the example illustrated in FIG. 1, for example, the information processing apparatus 100 classifies the jobs 1, 5, and 6 into a group 111 having the attribute "collection". For example, the information processing apparatus 100 classifies the jobs 2 to 4, 7, and 8 into a group 112 having the attribute "processing". For example, the information processing apparatus 100 classifies the job 9 into a group 113 having the attribute "integration". For example, the information processing apparatus 100 classifies the job 10 into a group 114 having the attribute "accumulation". Thus, the information processing apparatus 100 may collectively and easily handle one or more jobs having the same attribute in the job group.

(1-2) The information processing apparatus 100 includes a storage unit 122. The storage unit 122 stores, in association with at least any one group of the plurality of groups, information indicating a head job in a group serving as a starting point from which the job flow 121 is to be restarted in accordance with an abnormality of a job belonging to the one group of the plurality of groups.

For example, the head job is a job in which no preceding job exists in the group. For example, the head job is a job of which an execution order is a head in the group. For example, a plurality of head jobs may exist. The information indicating the head job is set by an operator or the like of the job flow 121, for example.

The storage unit 122 may store, in association with any one group, one or more combinations of a condition for restarting the job flow 121 in accordance with an abnormality of a job belonging to the one group and information indicating a head job in a group serving as a starting point from which the job flow 121 is to be restarted. The condition is, for example, that a certain abnormality occurs in a job belonging to any one group. The condition may be, for example, that a specific type of abnormality occurs in the job belonging to the one group.

For example, the storage unit 122 may store, in association with a first group, one or more combinations of a condition for restarting the job flow 121 in accordance with an abnormality of a job belonging to the first group and information indicating a head job in a second group serving as a starting point from which the job flow 121 is to be restarted. For example, the combination is set by an operator or the like of the job flow 121.

For example, in the example illustrated in FIG. 1, the storage unit 122 stores, in association with the group 113, a combination of a condition for restarting the job flow 121 in accordance with an abnormality of a job belonging to the group 113 and the group 112 serving as a starting point from which the job flow 121 is to be restarted. For example, the storage unit 122 further stores information indicating the jobs 2 and 7 as head jobs in the group 112, in association with the group 112.

(1-3) The information processing apparatus 100 detects an abnormality of a first job classified into the first group. The information processing apparatus 100 may specify a type of occurring abnormality of the first job. In a case where execution of the first job fails due to the abnormality of the first job in the job group, the information processing apparatus 100 ends the job flow 121 for now without completing the job flow 121.

Accordingly, in a case where the information processing apparatus 100 fails to execute the first job due to the abnormality of the first job in the job group, when there is another job being executed in the job group, the execution of the another job may also fail in the same manner. Therefore, due to the abnormality of the first job, an abnormality of the another job may occur. The abnormality of the another job is, for example, a forcible execution failure due to the abnormality of the first job.

For example, in the example illustrated in FIG. 1, it is assumed that the information processing apparatus 100 detects an abnormality of the job 9 belonging to the group 113. For example, the information processing apparatus 100 may specify a type of occurring abnormality of the job 9. Here, in the information processing apparatus 100, it is assumed that, when the abnormality occurs in the job 9 in the job group, there is no other job being executed in the job group, and no abnormality occurs in the other job in the job group. Thus, the information processing apparatus 100 may determine that it is preferable to restart the job flow 121, and may obtain a trigger for restarting the job flow 121.

(1-4) In a case where an abnormality of the first job is detected, the information processing apparatus 100 refers to the storage unit 122 to acquire information indicating a head job in the second group serving as a starting point from which the job flow 121 is to be restarted in accordance with the abnormality of the first job, which is associated with the first group. By referring to the storage unit 122, when there is a condition for restarting the job flow 121 in accordance with the abnormality of the first job, which is associated with the first group, the information processing apparatus 100 acquires the condition.

In a case where there is no condition, based on the acquired information, the information processing apparatus 100 restarts the job flow 121 from the head job in the second group serving as a starting point. In a case where there is a condition, the information processing apparatus 100 determines whether or not the condition is satisfied, and in a case where it is determined that the condition is satisfied, the information processing apparatus 100 restarts the job flow 121 from the head job in the second group serving as a starting point, based on the acquired information.

For example, in the example illustrated in FIG. 1, the information processing apparatus 100 refers to the storage unit 122 and acquires information indicating the jobs 2 and 7 as the head jobs in the group 112 serving as a starting point from which the job flow 121 is to be restarted in accordance with the abnormality of the job 9, which is associated with the group 113. For example, the information processing apparatus 100 refers to the storage unit 122 and acquires the condition for restarting the job flow 121 in accordance with the abnormality of the job 9, which is associated with the group 113.

For example, the information processing apparatus 100 determines whether or not the acquired condition is satisfied based on a type of abnormality of the job 9. Here, for example, it is assumed that the information processing apparatus 100 determines that the acquired condition is satisfied. For example, since it is determined that the condition is satisfied, the information processing apparatus 100 restarts the job flow 121 based on the acquired information with the jobs 2 and 7 as starting points.

For example, when the job flow 121 is restarted, the information processing apparatus 100 sequentially executes other following jobs following the jobs 2 and 7, based on the jobs 2 and 7 as starting points, in accordance with the job flow 121. For example, when the job flow 121 is restarted, it is preferable that the information processing apparatus 100 sequentially execute other parallel jobs that are not executed among other parallel jobs parallel to the jobs 2 and 7 as starting points.

For example, when the job flow 121 is restarted, the information processing apparatus 100 sequentially executes the jobs 2 to 4, and sequentially executes the jobs 7 and 8. For example, after the job 4, 8 is completed, the information processing apparatus 100 sequentially executes the jobs 9 and 10.

Thus, the information processing apparatus 100 may appropriately control the group serving as a starting point from which the job flow 121 is to be restarted. Even when the number of jobs included in a job group is increased, the information processing apparatus 100 may allow an operator or the like of the job flow 121 to set a restart starting point in group units. The information processing apparatus 100 may classify the job group into the plurality of groups based on the processing content of each job, and the operator or the like of the job flow 121 may not have to grasp the properties of the job. At a time of restarting the job flow 121, the information processing apparatus 100 may complete the job group without re-execution of all in the job group, and may reduce a processing load and a processing time taken at the time of restarting the job flow 121.

As described above, the information processing apparatus 100 may reduce a work load and a work time for the operator or the like of the job flow 121. Since the information processing apparatus 100 reduces the work load and the work time for the operator or the like of the job flow 121, it is possible to reduce the probability that the operator or the like of the job flow 121 will make a setting error of the starting point from which the job flow is to be restarted 121.

For example, in a case where an abnormality occurs in any job, the information processing apparatus 100 may switch the groups serving as starting points from which the job flow 121 is to be restarted in accordance with a type of the abnormality. Therefore, the information processing apparatus 100 may efficiently restart the job flow 121, and may reduce the processing load and the processing time taken to complete all the jobs in the job group.

Here, although the case where the information processing apparatus 100 restarts the job flow 121 after detecting an abnormality of a job without waiting for an operation input by a user of the information processing apparatus 100 is described, the embodiment is not limited thereto. The user of the information processing apparatus 100 is, for example, the operator of the job flow 121.

For example, the information processing apparatus 100 may restart the job flow 121 after detecting an abnormality of a job and waiting for a specific operation input by the user of the information processing apparatus 100. For example, the specific operation input is an operation input indicating that the restart of the job flow 121 is permitted. Thus, before the information processing apparatus 100 restarts the job flow 121, the operator or the like of the job flow 121 may easily handle an abnormality that occurs in any job.

Here, although the case where the information processing apparatus 100 operates alone is described, the embodiment is not limited to this. For example, there may be a case where the information processing apparatus 100 is in cooperation with another computer. For example, there may be a case where the information processing apparatus 100 does not execute the job group by itself, and controls the another computer that executes the job group. For example, there may be a case where a plurality of computers implements the function as the information processing apparatus 100 in cooperation with each other. For example, there may be a case where the function as the information processing apparatus 100 is implemented over a cloud. An example of a case where the information processing apparatus 100 cooperates with the another computer will be described below with reference to FIG. 2.

(Example of Information Processing System 200)

Next, an example of an information processing system 200 in which the information processing apparatus 100 illustrated in FIG. 1 is applied will be described with reference to FIG. 2.

Figure 2:
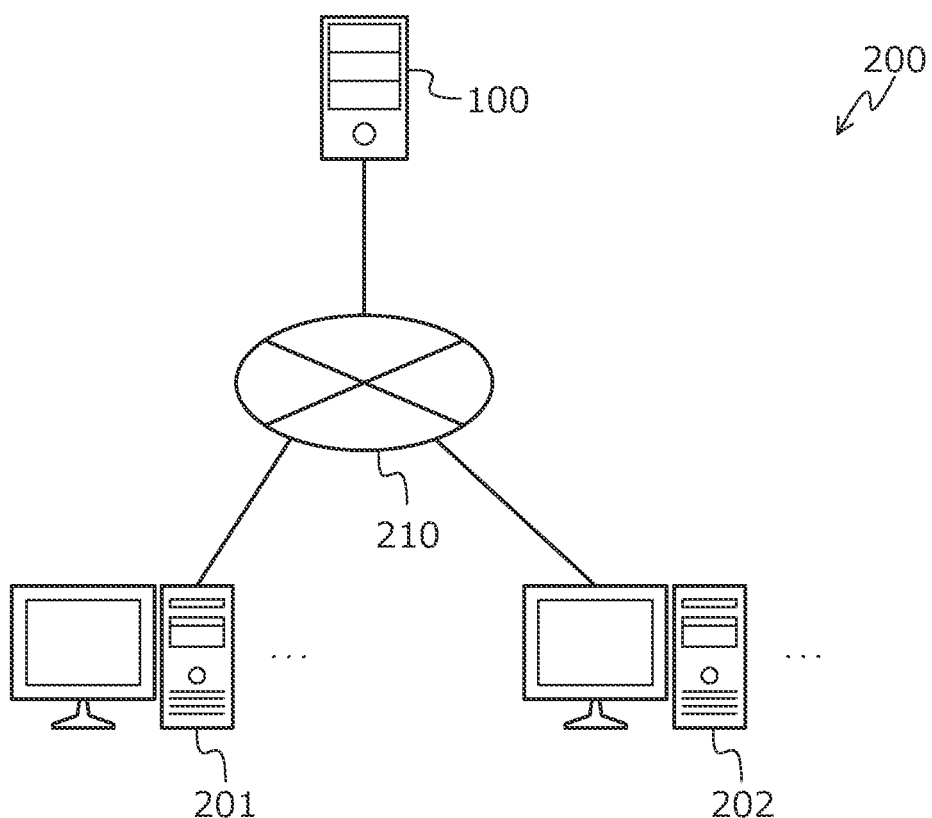
FIG. 2 is an explanatory diagram illustrating an example of an information processing system.

FIG. 2 is an explanatory diagram illustrating an example of the information processing system 200. In FIG. 2, the information processing system 200 includes the information processing apparatus 100, one or more job execution apparatuses 201, and a client apparatus 202.

In the information processing system 200, the information processing apparatus 100 and the job execution apparatus 201 are coupled to each other via a wired or wireless network 210. For example, the network 210 is a local area network (LAN), a wide area network (WAN), the Internet, or the like. In the information processing system 200, the information processing apparatus 100 and the client apparatus 202 are coupled to each other via the wired or wireless network 210.

The information processing apparatus 100 is a computer that starts a job flow. The information processing apparatus 100 stores the job flow. The information processing apparatus 100 classifies a job group into a plurality of groups, based on a processing content of each job of the job group having an execution order defined in the job flow.

The information processing apparatus 100 receives a start trigger for starting execution of the job group. For example, the information processing apparatus 100 receives a request for requesting the execution of the job group from the client apparatus 202 as the start trigger for starting the execution of the job group.

The information processing apparatus 100 controls the one or more job execution apparatuses 201. For example, the information processing apparatus 100 distributes the job group to the one or more job execution apparatuses 201. For example, the information processing apparatus 100 controls the one or more job execution apparatuses 201 such that each job execution apparatus 201 executes a job distributed to the job execution apparatus 201, in accordance with the job flow.

For example, in response to reception of the start trigger, the information processing apparatus 100 controls the one or more job execution apparatuses 201 such that each job execution apparatus 201 executes a job distributed to the job execution apparatus 201, and starts the job flow.

The information processing apparatus 100 includes a storage unit. The storage unit stores, in association with any one group, one or more combinations of a condition for restarting the job flow in accordance with an abnormality of a job belonging to the one group and information indicating a head job in a group serving as a starting point from which the job flow is to be restarted.

The information processing apparatus 100 detects an abnormality of a first job belonging to a first group and executed by any job execution apparatus 201, in the job group. For example, the information processing apparatus 100 detects the abnormality of the first job, by receiving a notification indicating the abnormality of the first job from any job execution apparatuses 201. For example, the notification may include information indicating a type of abnormality of the first job. For example, the information processing apparatus 100 specifies the type of occurring abnormality of the first job based on the notification. For example, when detecting the abnormality of the first job, the information processing apparatus 100 controls one or more job execution apparatuses 201 such that a job flow is abnormally ended without being completed.

By referring to the storage unit, the information processing apparatus 100 determines whether or not the detected abnormality of the first job satisfies a condition for restarting the job flow, which is associated with the first group to which the first job belongs. When it is determined that the condition is satisfied, the information processing apparatus 100 refers to the storage unit, and specifies one or more head jobs, based on information indicating one or more head jobs in a group serving as a starting point from which the job flow is to be restarted, which is associated with the first group to which the first job belongs.

The information processing apparatus 100 restarts the job flow, from each head job of the specified one or more head jobs as a starting point. For example, the information processing apparatus 100 controls one or more job execution apparatuses 201 to execute all or a part of the job group, from each head job of the specified one or more head jobs as the starting point. After completing all jobs in the job group and completing the job flow, the information processing apparatus 100 transmits, to the client apparatus 202, a notification indicating that all the jobs in the job group are completed and the job flow is completed. For example, the information processing apparatus 100 is a server, a PC, or the like.

The job execution apparatus 201 is a computer that executes any job in a job group. Under the control of the information processing apparatus 100, the job execution apparatus 201 executes a job distributed to the job execution apparatus 201. When a job to be executed next to the job allocated to the job execution apparatus 201 is distributed to another job execution apparatus 201, the job execution apparatus 201 transmits data output by the job distributed to the job execution apparatus 201 to the another job execution apparatus 201 to which the job to be executed next is distributed.

In a case where an abnormality of the job allocated to the job execution apparatus 201 occurs, the job execution apparatus 201 generates a notification indicating the abnormality of the job allocated to the job execution apparatus 201, and transmits the notification to the information processing apparatus 100. For example, the job execution apparatus 201 may specify a type of abnormality of the job allocated to the job execution apparatus 201, generate a notification that includes information indicating the specified type of abnormality of the job and represents the abnormality of the job allocated to the job execution apparatus 201, and transmit the notification to the information processing apparatus 100. For example, the job execution apparatus 201 is a server, a PC, or the like.

The client apparatus 202 is a computer used by a user of the information processing system 200. The user of the information processing system 200 is, for example, an operator of a job flow. For example, the client apparatus 202 generates a request for requesting execution of a job group based on an operation input by the user of the information processing system 200, and transmits the request to the information processing apparatus 100.

For example, the client apparatus 202 receives a notification indicating that all jobs in the job group are completed and the job flow is completed, from the information processing apparatus 100. For example, the client apparatus 202 outputs the notification indicating that all the jobs in the job group are completed and the job flow is completed such that the user of the information processing system 200 may refer to the notification. For example, the information processing apparatus 100 is a PC, a tablet terminal, a smartphone, or the like.

Here, although the case where the information processing apparatus 100 and the job execution apparatus 201 are different apparatuses is described above, the embodiment is not limited thereto. For example, there may be a case where the information processing apparatus 100 also operate as the job execution apparatus 201 by having the function of the job execution apparatus 201.

Here, although the case where the information processing apparatus 100 and the client apparatus 202 are different apparatuses is described above, the embodiment is not limited thereto. For example, there may be a case where the information processing apparatus 100 also operates as the client apparatus 202 by having the function of the client apparatus 202.

(Hardware Configuration Example of Information Processing Apparatus 100)

Next, a hardware configuration example of the information processing apparatus 100 will be described with reference to FIG. 3.

Figure 3:
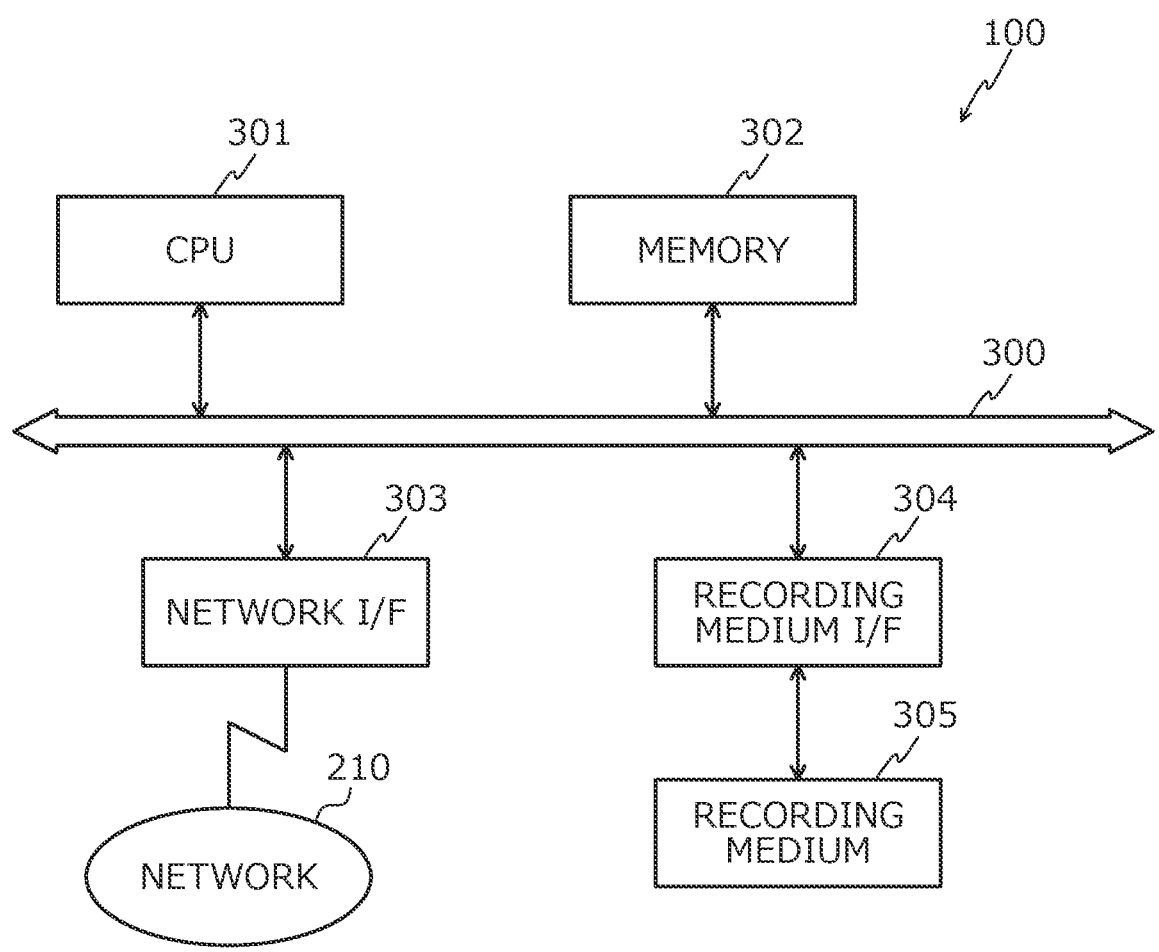
FIG. 3 is a block diagram illustrating a hardware configuration example of an information processing apparatus.

FIG. 3 is a block diagram illustrating the hardware configuration example of the information processing apparatus 100. In FIG. 3, the information processing apparatus 100 includes a central processing unit (CPU) 301, a memory 302, a network interface (I/F) 303, a recording medium I/F 304, and a recording medium 305. The respective components are coupled to each other by a bus 300.

The CPU 301 controls the entire information processing apparatus 100. The memory 302 includes, for example, a read-only memory (ROM), a random-access memory (RAM), a flash ROM, and the like. For example, the flash ROM or the ROM stores various programs, and the RAM is used as a work area of the CPU 301. The program stored in the memory 302 is loaded by the CPU 301, and thus causes the CPU 301 to execute coded processing.

The network I/F 303 is coupled to the network 210 through a communication line, and is coupled to another computer via the network 210. The network I/F 303 manages an interface between the network 210 and an internal interface, and controls an input and an output of data from the another computer. The network I/F 303 is, for example, a modem, a LAN adapter, or the like.

The recording medium I/F 304 controls reading and writing of data from and to the recording medium 305 in accordance with control of the CPU 301. The recording medium I/F 304 is, for example, a disk drive, a solid-state drive (SSD), a Universal Serial Bus (USB) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be removably attached to the information processing apparatus 100.

In addition to the components described above, the information processing apparatus 100 may include a keyboard, a mouse, a display, a printer, a scanner, a microphone, a speaker, or the like, for example. The information processing apparatus 100 may include a plurality of recording medium I/Fs 304 and a plurality of recording media 305. The information processing apparatus 100 does not have to include the recording medium I/F 304 or the recording medium 305.

(Hardware Configuration Example of Job Execution Apparatus 201)

A hardware configuration example of the job execution apparatus 201 has, for example, the same manner as the hardware configuration example of the information processing apparatus 100 illustrated in FIG. 3, and thus description thereof is omitted.

(Hardware Configuration Example of Client Apparatus 202)

For example, a hardware configuration example of the client apparatus 202 has the same manner as the hardware configuration example of the information processing apparatus 100 illustrated in FIG. 3, and thus description thereof is omitted.

In the following description, a case where the information processing apparatus 100 operates alone and executes a job group will be mainly described.

(Functional Configuration Example of Information Processing Apparatus 100)

Next, a functional configuration example of the information processing apparatus 100 will be described with reference to FIG. 4.

Figure 4:
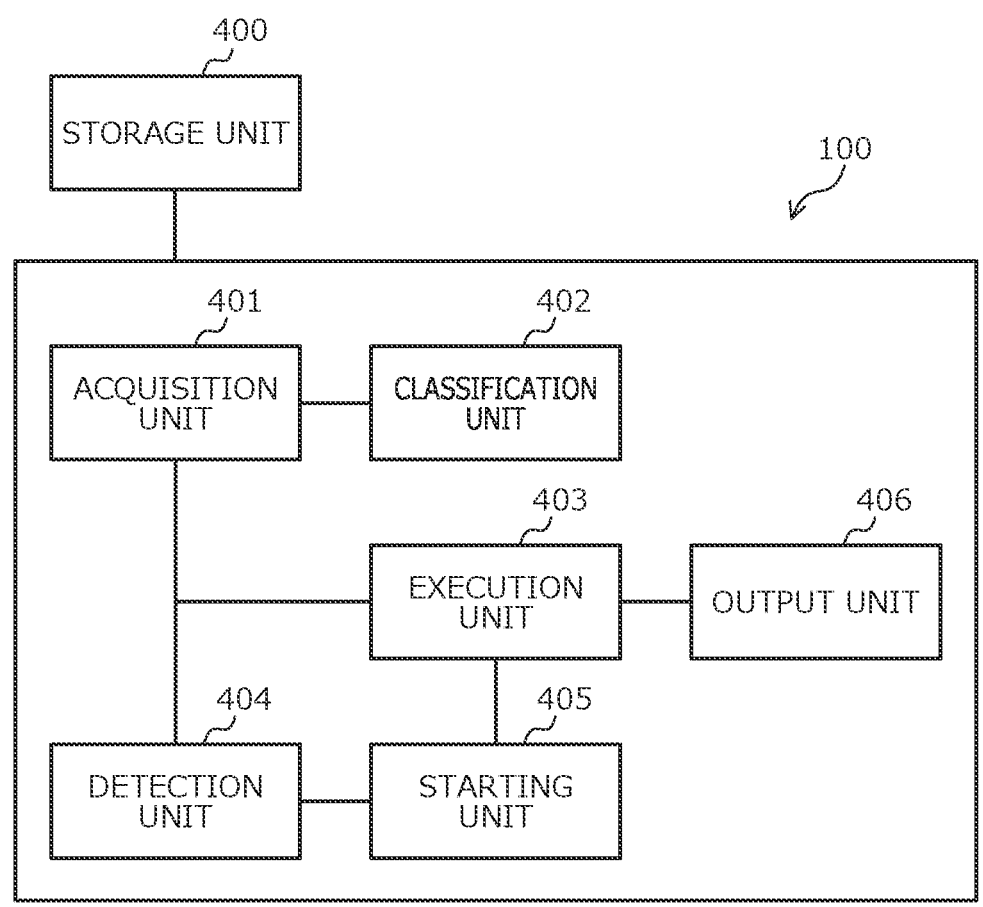
FIG. 4 is a block diagram illustrating a functional configuration example of the information processing apparatus.

FIG. 4 is a block diagram illustrating the functional configuration example of the information processing apparatus 100. The information processing apparatus 100 includes a storage unit 400, an acquisition unit 401, a classification unit 402, an execution unit 403, a detection unit 404, a starting unit 405, and an output unit 406.

The storage unit 400 is implemented by, for example, a storage region of the memory 302, the recording medium 305, or the like illustrated in FIG. 3. Hereinafter, a case will be described where the storage unit 400 is included in the information processing apparatus 100. Meanwhile, the embodiment is not limited to this. For example, there may be a case where the storage unit 400 is included in an apparatus different from the information processing apparatus 100 and contents stored in the storage unit 400 may be referred to from the information processing apparatus 100.

The acquisition unit 401 to the output unit 406 function as an example of a control unit. For example, the functions of the acquisition unit 401 to the output unit 406 are implemented by causing the CPU 301 to execute a program stored in a storage region of the memory 302, the recording medium 305, or the like illustrated in FIG. 3, or by using the network I/F 303. For example, a processing result of each functional unit is stored in the storage region of the memory 302, the recording medium 305, or the like illustrated in FIG. 3.

The storage unit 400 stores various types of information to be referred to or updated in processing performed by each functional unit. For example, the storage unit 400 stores a job flow. The job flow indicates, for example, a job group. For example, the job flow defines an execution order in the job group. The job flow indicates, for example, a data dependency relationship in the job group. Any job in the job group may be a job that uses data output by each of a plurality of jobs. The plurality of jobs may use data output by any job of the job group.

The job flow may be represented by, for example, a directed graph including a node representing each job in a job group and a directed edge coupling the nodes respectively representing two different jobs in the job group. For example, the directed edge couples a node representing any one job of the job group to a node representing another job that is executed after the one job by one job in the execution order and uses data output by the one job. For example, the storage unit 400 stores the job flow, by using a job flow management table 600. An example of the job flow management table 600 will be described below with reference to FIG. 6, for example. For example, the job flow is acquired by the acquisition unit 401.

For example, the storage unit 400 stores an attribute of each job in the job group. For example, the attribute includes collection, processing, integration, accumulation, or the like. The collection is, for example, an attribute indicating that data is collected from a data source. The data source is, for example, a file. The data source may be, for example, a DB. The data source may be a data collection source by an extract transform load (ETL) tool.

The processing is, for example, an attribute indicating that data obtained from a single preceding job is processed. The integration is, for example, an attribute indicating that data obtained from a plurality of preceding jobs is processed. The accumulation is, for example, an attribute indicating that data is stored in a DB. For example, the storage unit 400 stores the attribute of each job in the job group, by using an attribute information management table 700. An example of the attribute information management table 700 will be described below with reference to FIG. 7, for example. The attribute of each job is specified by the classification unit 402, for example.

For example, the storage unit 400 stores a result of classifying each job in the job group into a plurality of groups. The plurality of groups include a collection group having a collection attribute, for example. For example, the collection group is a group into which a collection job having the collection attribute is classified. The plurality of groups include a processing group having a processing attribute, for example. For example, the processing group is a group into which a processing job having the processing attribute is classified. The plurality of groups include an integration group having an integration attribute, for example. For example, the integration group is a group into which an integration job having the integration attribute is classified. The plurality of groups include an accumulation group having an accumulation attribute, for example. For example, the accumulation group is a group into which an accumulation job having the accumulation attribute is classified. For example, the storage unit 400 stores a result of classifying each job in the job group into a plurality of groups, by using a group information management table 800. An example of the group information management table 800 will be described below with reference to FIG. 8, for example. The classification of the job is performed by the classification unit 402, for example.

For example, the storage unit 400 stores, in association with at least one group, information indicating a head job in a group serving as a starting point from which a job flow is to be restarted in accordance with an abnormality of a job belonging to the one group. For example, the storage unit 400 uses a restart information management table 1000 to store, in association with any one group, information indicating a group serving as a starting point from which a job flow is to be restarted in accordance with an abnormality of a job belonging to the one group. An example of the restart information management table 1000 will be described below with reference to FIG. 10, for example. For example, the storage unit 400 stores, in association with each group, information indicating a head job in the group by using a head information management table 900. An example of the head information management table 900 will be described below in detail with reference to FIG. 9, for example.

For example, the storage unit 400 may store, in association with at least one group, one or more combinations of a condition for restarting a job flow in accordance with an abnormality of a job belonging to the one group and information indicating a head job in a group serving as a starting point from which the job flow is to be restarted. The condition is, for example, that a certain abnormality occurs in a job belonging to any one group. The condition may be, for example, that a specific type of abnormality occurs in the job belonging to the one group. For example, the storage unit 400 uses the restart information management table 1000 to store, in association with any one group, one or more combinations of the condition for restarting the job flow and the information indicating the head job in the group serving as a starting point from which the job flow is to be restarted. The example of the restart information management table 1000 will be described below with reference to FIG. 10, for example. For example, the storage unit 400 stores, in association with each group, information indicating a head job in the group by using the head information management table 900. The example of the head information management table 900 will be described below in detail with reference to FIG. 9, for example.

For example, the storage unit 400 stores information indicating an end status of each job of a job group at a time when a job flow is abnormally ended. The abnormal end of the job flow means that the job flow is ended without being completed. The end status indicates whether a job is waiting for execution, is ended normally, or is ended abnormally. The abnormal end of the job means that the job is ended without being completed. For example, the storage unit 400 stores an execution history management table 1100 for managing an end status of each job of the job group. An example of the execution history management table 1100 will be described below with reference to FIG. 11, for example. The information indicating the end status of each job of the job group is generated by the execution unit 403, for example.

In a case where a job flow is abnormally ended, for example, when an abnormality of any one job occurs and the one job is abnormally ended, the storage unit 400 may store information indicating a type of abnormality of the one job. For example, an abnormality of a certain job includes an error due to a timeout of the certain job, an error due to an environment in which the certain job is executed, an error due to processing contents of the certain job, an error due to processing contents of another preceding job preceding the certain job, and the like. For example, the storage unit 400 stores information indicating the type of abnormality of the job in the execution history management table 1100. The example of the execution history management table 1100 will be described below with reference to FIG. 11, for example. The information indicating the type of abnormality of any job is generated by, for example, the execution unit 403.

The acquisition unit 401 acquires various types of information to be used in processing of each functional unit. The acquisition unit 401 stores the acquired various types of information in the storage unit 400, or outputs the acquired various types of information to each functional unit. The acquisition unit 401 may output the various types of information stored in the storage unit 400 to each functional unit. For example, the acquisition unit 401 acquires the various types of information, based on an operation input of a user. For example, the acquisition unit 401 may receive the various types of information from an apparatus different from the information processing apparatus 100.

The acquisition unit 401 acquires a job flow. For example, the acquisition unit 401 acquires the job flow by receiving an input of the job flow, based on an operation input by a user of the information processing apparatus 100. For example, the acquisition unit 401 may acquire the job flow by receiving the job flow from another computer. For example, the another computer is a client apparatus or the like.

For example, the acquisition unit 401 acquires an addition request for requesting addition of a preceding job to any job classified into any group of a plurality of groups to a job group. For example, the acquisition unit 401 acquires the addition request by receiving an input of the addition request, based on an operation input of the user of the information processing apparatus 100. For example, the acquisition unit 401 may acquire the addition request by receiving the addition request from another computer. For example, the another computer is a client apparatus or the like.

For example, the acquisition unit 401 acquires a deletion request for requesting deletion of any job classified into any group of the plurality of groups from the job group. For example, the acquisition unit 401 acquires the deletion request by receiving an input of the deletion request, based on an operation input of the user of the information processing apparatus 100. For example, the acquisition unit 401 may acquire the deletion request by receiving the deletion request from another computer. For example, the another computer is a client apparatus or the like.

For example, the acquisition unit 401 acquires an execution request for requesting execution of the job group. For example, the acquisition unit 401 acquires the execution request by receiving an input of the execution request, based on an operation input of the user of the information processing apparatus 100. For example, the acquisition unit 401 may acquire the execution request by receiving the execution request from another computer.

For example, the acquisition unit 401 acquires information for detecting an abnormal end of the job flow. For example, the acquisition unit 401 acquires a notification indicating that the job flow is abnormally ended. For example, the notification is issued by the information processing apparatus 100 when the job flow is abnormally ended. For example, the notification may be issued by the execution unit 403.

For example, the acquisition unit 401 acquires information for detecting an abnormality of any job in the job group. For example, the acquisition unit 401 acquires information indicating an end status of each job in the job group at a time when the job flow is abnormally ended. The end status indicates whether a job is waiting for execution, is ended normally, or is ended abnormally. For example, the acquisition unit 401 acquires the execution history management table 1100.

The acquisition unit 401 may receive a start trigger for starting processing of any functional unit. The start trigger is, for example, a predetermined operation input by the user. The start trigger may be, for example, reception of predetermined information from another computer. For example, the start trigger may also be an output of predetermined information from any of the functional units.

For example, the acquisition unit 401 may receive acquisition of a job flow as a start trigger for starting processing of the classification unit 402. For example, the acquisition unit 401 may receive acquisition of an addition request or a deletion request as a start trigger for starting the processing of the classification unit 402. For example, the acquisition unit 401 may receive acquisition of an execution request as a start trigger for starting processing of the execution unit 403. For example, the acquisition unit 401 may receive, as a start trigger for starting processing of the detection unit 404, acquisition of information for detecting an abnormal end of the job flow. For example, the acquisition unit 401 may receive, as a start trigger for starting the processing of the detection unit 404, acquisition of information for detecting an abnormality of any job in a job group.

The classification unit 402 classifies a job group into a plurality of groups, based on processing contents of each job of the job group indicated by the job flow. For example, in a case where it is determined that any one job is a collection job based on processing contents of the one job, the classification unit 402 classifies the one job into a collection group. For example, in a case where the processing content of any one job is to collect data from a data source, the classification unit 402 determines that the one job is a collection job, and classifies the one job into the collection group. Thus, the classification unit 402 may handle a job in group units, by classifying the job into the group.

For example, in a case where it is determined that any one job is a processing job based on processing contents of the one job, the classification unit 402 classifies the one job into a processing group. For example, in a case where the processing content of any one job is to process data obtained from a single preceding job, the classification unit 402 determines that the one job is a processing job, and classifies the one job into the processing group. Thus, the classification unit 402 may handle a job in group units, by classifying the job into the group.

For example, in a case where it is determined that any one job is an integration job based on processing contents of the one job, the classification unit 402 classifies the one job into an integration group. For example, in a case where the processing content of any one job is to integrate data obtained from a plurality of preceding jobs, the classification unit 402 determines that the one job is an integration job, and classifies the one job into the integration group. Thus, the classification unit 402 may handle a job in group units, by classifying the job into the group.

For example, in a case where it is determined that any one job is an accumulation job based on processing contents of the one job, the classification unit 402 classifies the one job into an accumulation group. For example, in a case where the processing content of any one job is to store data in a DB, the classification unit 402 determines that the one job is an accumulation job, and classifies the one job into the accumulation group. Thus, the classification unit 402 may handle a job in group units, by classifying the job into the group.

In a case where an addition request is acquired by the acquisition unit 401, the classification unit 402 updates a job flow such that a job requested to be added to a job group is added to the job group. The classification unit 402 classifies a job into any one of a plurality of groups based on processing contents of the job requested to be added to the job group. For example, as described above, the classification unit 402 determines whether or not the job requested to be added to the job group is a collection job, a processing job, an integration job, and an accumulation job, and classifies the job into any one of the groups. Thus, the classification unit 402 may add a new job to the job group.

In a case where the acquisition unit 401 acquires an addition request, and a job requested to be added to a job group becomes a new head job in a group into which the job is classified, the classification unit 402 updates information indicating the head job in the group, which is stored in the storage unit 400. Thus, the classification unit 402 may appropriately reflect the addition of the new job to the job group in the storage unit 400.

In a case where the acquisition unit 401 acquires a deletion request, the classification unit 402 updates a job flow such that a job requested to be deleted from a job group is deleted from the job group. Thus, the classification unit 402 may delete the existing job from the job group.

In a case where a deletion request is acquired by the acquisition unit 401 and a job requested to be deleted from a job group is a head job in a group into which the job is classified, the classification unit 402 updates information indicating a head job in the group, which is stored in a storage unit 400. For example, the classification unit 402 updates information indicating the head job in the group, which is stored in the storage unit 400 such that a following job existing immediately after the job requested to be deleted from the job group becomes a new head job in the group into which the job is classified. Thus, the classification unit 402 may appropriately reflect the deletion of the existing job from the job group in the storage unit 400.

The execution unit 403 sequentially executes a job group according to a job flow. For example, in a case where the acquisition unit 401 acquires an execution request, the execution unit 403 sequentially executes the job group in accordance with the job flow. Thus, the execution unit 403 may execute the job group, and may complete the job flow.

For example, in a case where the job flow is restarted by the starting unit 405, the execution unit 403 sequentially executes all or a part of the job group in accordance with the job flow, from each head job in a group serving as a starting point from which the job flow is to be restarted, as a starting point. For example, the execution unit 403 sequentially executes each head job in the group serving as a starting point and one or more following jobs existing after each head job in the group serving as the starting point.

At this time, for example, the execution unit 403 may not re-execute another job that is already executed among other jobs in parallel with each head job in the group serving as the starting point. For example, the execution unit 403 executes another job that is not executed among the other jobs in parallel with each head job in the group serving as the starting point, in accordance with the job flow. Thus, the execution unit 403 may appropriately re-execute all or part of the job group, and may restart and complete the job flow.

In a case where any one job is abnormally ended due to an abnormality of the one job, the execution unit 403 abnormally ends the job flow without completing the job flow. In a case where there is a job being executed when the job flow is abnormally ended without being completed, the execution unit 403 abnormally ends the job. For example, in a case where the job flow is abnormally ended without being completed, the execution unit 403 reflects an end status of each job in the execution history management table 1100. In a case where any one job is abnormally ended, the execution unit 403 may reflect information indicating a type of abnormality of the one job in the execution history management table 1100.

Thus, in a case where the job flow is abnormally ended without being completed, the execution unit 403 may keep the end status of each job useful when the job flow is restarted, and thus it is possible to easily determine how to restart the job flow. In a case where an abnormality of any one job occurs, the execution unit 403 may keep information indicating the type of the abnormality of the one job, and thus it is possible to easily determine how to restart the job flow.

The detection unit 404 detects an abnormality of a first job classified into a first group. For example, the detection unit 404 detects the abnormality of the first job, based on information for detecting the abnormality of the first job classified into the first group, which is acquired by the acquisition unit 401. For example, when the first job classified into the first group is abnormally ended, based on information indicating the end status of each job, which is acquired by the acquisition unit 401, the detection unit 404 determines that the abnormality of the first job occurs, and detects the abnormality of the first job. Thus, the detection unit 404 may obtain a guideline for restarting the job flow.

The starting unit 405 restarts a job flow when the detection unit 404 detects an abnormality of a first job. For example, the starting unit 405 refers to the storage unit 400 to acquire information indicating a head job in a second group serving as a starting point from which the job flow is to be restarted, which is associated with the first group to which the first job in which the abnormality occurs belongs. For example, based on the acquired information, the starting unit 405 restarts the job flow from each head job in the second group as a starting point.

For example, the starting unit 405 controls the execution unit 403 to execute, from each head job in the second group as a starting point in accordance with the job flow, the head job, a following job to the head job, and another job that is not executed in parallel with the head job. For example, the starting unit 405 sets each head job in the second group as a starting point in the execution unit 403.

Thus, the starting unit 405 may appropriately set a group serving as a starting point from which the job flow is to be restarted, may appropriately complete the job group, and may appropriately complete the job flow. The starting unit 405 may make it easier for the execution unit 403 to complete the job flow. For example, the starting unit 405 may complete the job group without executing all in the job group by the execution unit 403, and a processing load and a processing time may be reduced.

When the abnormality of the first job is detected by the detection unit 404, the starting unit 405 refers to the storage unit 400 to determine whether or not one or more conditions for restarting the job flow in accordance with the abnormality of the first job, which are associated with the first group to which the first job in which the abnormality occurs belongs, exist.

In a case where it is determined that one or more conditions do not exist, the starting unit 405 restarts the job flow from any one job set in advance as a starting point. The one job set in advance is, for example, any one job of the first job, a preceding job immediately before the first job, and a head job in the first group to which the first job belongs.

For example, the starting unit 405 specifies, in accordance with the job flow, with any one job set in advance as a starting point, the one job, a following job to the one job, and another job that is not executed and parallel to the one job. For example, the starting unit 405 controls the execution unit 403 to sequentially execute the one job set in advance, the specified following job to the one job, and the specified another job that is not executed and parallel to the one job, in accordance with the job flow.

Thus, even when a group serving as a starting point from which the job flow is to be restarted is not set, the starting unit 405 may restart the job flow, may complete the job group, and may complete the job flow. The starting unit 405 may make it easier for the execution unit 403 to complete the job flow. For example, the starting unit 405 may complete the job group without executing all in the job group by the execution unit 403, and a processing load and a processing time may be reduced.

In a case where it is determined that one or more conditions exist, the starting unit 405 refers to the storage unit 400 to determine whether or not the abnormality of the first job detected by the detection unit 404 satisfies any one condition of the one or more conditions. For example, the starting unit 405 acquires the one or more conditions for restarting the job flow, which are associated with the first group to which the first job belongs, by referring to the storage unit 400. For example, in a case where a first condition among the one or more acquired conditions indicates that any abnormality occurs in the first job, the starting unit 405 determines that the abnormality of the first job detected by the detection unit 404 satisfies the first condition.

For example, in a case where the first condition among the one or more acquired conditions indicates that a specific type of abnormality occurs in the first job, the starting unit 405 specifies the type of abnormality of the first job by referring to the storage unit 400. For example, in a case where the specified type coincides with the specific type indicated by the first condition, the starting unit 405 determines that the first condition is satisfied. For example, in a case where the specified type does not coincide with the specific type indicated by the first condition, the starting unit 405 determines that the first condition is not satisfied.

Thus, the starting unit 405 may determine whether or not to restart the job flow. Based on whether or not any condition of the one or more conditions for restarting the job flow, which are associated with the first group to which the first job belongs, is satisfied, the starting unit 405 may flexibly change the second group serving as a starting point from which the job flow is to be restarted.

In a case where it is determined that the abnormality of the first job detected by the detection unit 404 satisfies any condition for restarting the job flow, which is associated with the first group to which the first job belongs, the starting unit 405 restarts the job flow. For example, the starting unit 405 refers to the storage unit 400 to acquire information indicating a head job in the second group serving as a starting point from which the job flow is to be restarted, which is associated with the first group. For example, based on the acquired information, the starting unit 405 restarts the job flow from each head job in the second group as a starting point.

For example, the starting unit 405 controls the execution unit 403 to sequentially execute, from each head job as a starting point in accordance with the job flow, the head job, a following job existing after the head job, and another job that is not executed and parallel to the head job. For example, the starting unit 405 sets each head job as a starting point in the execution unit 403.

Thus, the starting unit 405 may appropriately set a group serving as a starting point from which the job flow is to be restarted, may appropriately complete the job group, and may appropriately complete the job flow. The starting unit 405 may make it easier for the execution unit 403 to complete the job flow. For example, the starting unit 405 may complete the job group without executing all in the job group by the execution unit 403, and a processing load and a processing time may be reduced.

In a case where it is determined that the abnormality of the first job detected by the detection unit 404 does not satisfy any condition associated with the first group to which the first job belongs, the starting unit 405 restarts the job flow by using any one job set in advance as a starting point. The one job set in advance is, for example, any one job of the first job, a preceding job immediately before the first job, and a head job in the first group to which the first job belongs.

For example, the starting unit 405 specifies, in accordance with the job flow, with any one job set in advance as a starting point, the one job, a following job to the one job, and another job that is not executed and parallel to the one job.

For example, the starting unit 405 controls the execution unit 403 to sequentially execute the one job set in advance, the specified following job to the one job, and the specified another job that is not executed and parallel to the one job, in accordance with the job flow.

Thus, the starting unit 405 may restart the job flow even when the abnormality of the first job detected by the detection unit 404 does not satisfy any condition associated with the first group to which the first job belongs. The starting unit 405 may complete the job group, and may complete the job flow. The starting unit 405 may make it easier for the execution unit 403 to complete the job flow. For example, the starting unit 405 may complete the job group without executing all in the job group by the execution unit 403, and a processing load and a processing time may be reduced.

The output unit 406 outputs a processing result of at least any functional unit. For example, an output form is displayed on a display, output to a printer for printing, transmission to an external apparatus through the network I/F 303, or storage in a storage region of the memory 302, the recording medium 305, or the like. Thus, the output unit 406 may enable a user to be notified of the processing result of at least any functional unit, and achieve improvement in the convenience of the information processing apparatus 100.

For example, the output unit 406 outputs a notification indicating that the job flow is completed to be referred to by the user of the information processing apparatus 100. Thus, the output unit 406 enables the user of the information processing apparatus 100 to grasp that the job flow is completed.

(Operation Example of Information Processing Apparatus 100)

Next, an operation example of the information processing apparatus 100 will be described with reference to FIGS. 5 to 26. First, an example in which the information processing apparatus 100 stores a job flow 500 by using the job flow management table 600 will be described with reference to FIGS. 5 and 6.

Figure 5:
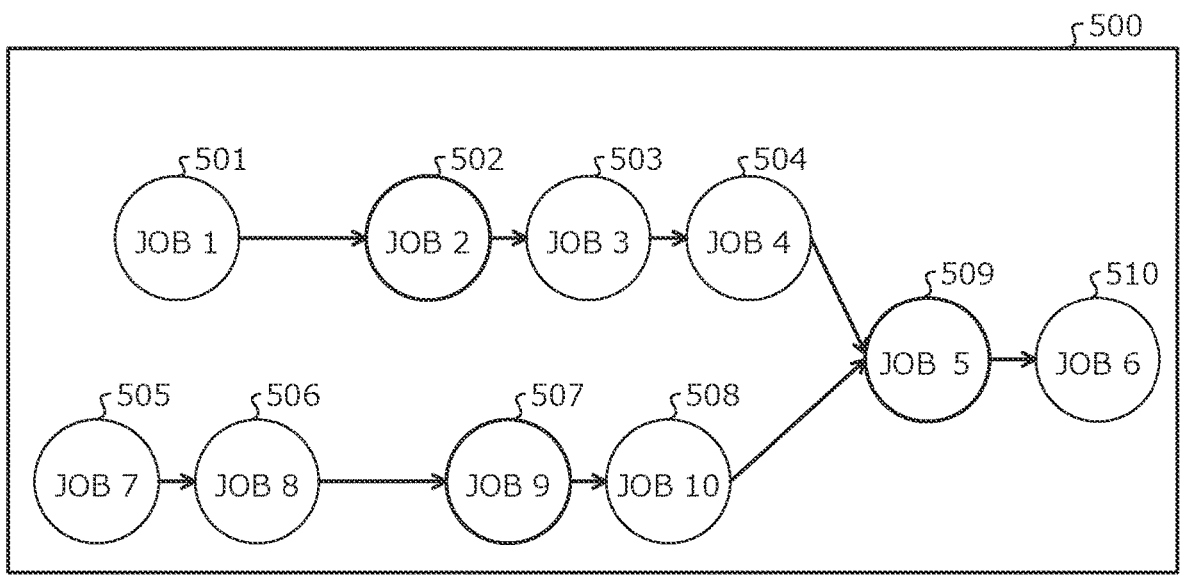
FIG. 5 is an explanatory diagram illustrating an example of a job flow.

FIG. 5 is an explanatory diagram illustrating an example of the job flow 500. As illustrated in FIG. 5, the job flow 500 defines an execution order in a job group. For example, in the example illustrated in FIG. 5, the job group includes jobs 1 to 10. The job flow 500 indicates a data dependency relationship in the job group.

For example, the job flow 500 is represented by a directed graph including nodes 501 to 510 representing the jobs 1 to 10, respectively. A node 50*i* representing a job i and a node 50*j* representing a job j that is executed next to the job i and uses data output by the job i are coupled by a directed edge. "i" and "j" are, for example, integers equal to or more than 1. Accordingly, the directed edge indicates a data dependency relationship. Next, description will be continued with reference to FIG. 6.

FIG. 6 is an explanatory diagram illustrating an example of storing the job flow 500. In FIG. 6, the information processing apparatus 100 stores the job flow 500 by using the job flow management table 600. The job flow management table 600 is implemented by a storage region such as the memory 302 or the recording medium 305 of the information processing apparatus 100 illustrated in FIG. 3, for example.

As illustrated in FIG. 6, the job flow management table 600 has fields of a job flow name, a job ID, a job name, a preceding job ID, and a following job ID. A record 600-*a* indicating job-related information is stored in the job flow management table 600 by setting information in each field for each job. "a" is an arbitrary integer.

A job flow name assigned to the job flow that defines the execution order in the job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

A preceding job ID for identifying another preceding job executed immediately before the one job identified by the job ID is set in the field of the preceding job ID. A following job ID for identifying another following job executed immediately after the one job identified by the job ID is set in the field of the following job ID.

Next, an example of storage contents of the attribute information management table 700 in which the information processing apparatus 100 stores attribute information indicating attributes of each job will be described with reference to FIG. 7. For example, the attribute information management table 700 is implemented by a storage region such as the memory 302 or the recording medium 305 of the information processing apparatus 100 illustrated in FIG. 3. A method by which the information processing apparatus 100 generates, updates, and uses the attribute information management table 700 will be described below with reference to FIGS. 12 to 26, for example.

FIG. 7 is an explanatory diagram illustrating an example of contents stored in the attribute information management table 700. As illustrated in FIG. 7, the attribute information management table 700 has fields of a job flow name, a job ID, a job name, and a type. A record 700-*b* indicating attribute information is stored in the attribute information management table 700 by setting information in each field for each job. "b" is an arbitrary integer.

A job flow name assigned to a job flow that defines an execution order in a job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i (attribute k). For example, the attribute k is an alias name assigned by the information processing apparatus 100 in accordance with the attribute of the one job. For example, the attribute k is collection k, processing k, integration k, accumulation k, or the like. "k" is, for example, an integer equal to or more than 1.

An attribute of the one job, which represents a type of the one job identified by the job ID, is set in the field of the type. For example, the attribute includes collection, processing, integration, accumulation, or the like. For example, the attribute may be out-of-use. The collection is, for example, an attribute indicating that data is collected from a data source. The processing is, for example, an attribute indicating that data obtained from a single preceding job is processed. The integration is, for example, an attribute indicating that data obtained from a plurality of preceding jobs is processed. The accumulation is, for example, an attribute indicating that data is stored in a DB. The out-of-use is an attribute indicating neither collection, processing, integration, nor accumulation.

Next, an example of contents stored in the group information management table 800 in which the information processing apparatus 100 stores group information indicating a group into which each job is classified will be described with reference to FIG. 8. The group information management table 800 is implemented by a storage region such as the memory 302 or the recording medium 305 of the information processing apparatus 100 illustrated in FIG. 3, for example. A method by which the information processing apparatus 100 generates, updates, and uses the group information management table 800 will be described below with reference to FIGS. 12 to 26, for example.

FIG. 8 is an explanatory diagram illustrating an example of contents stored in the group information management table 800. As illustrated in FIG. 8, the group information management table 800 has fields of a job flow name, a job ID, a job name, a type, and a group ID. A record 800-*c* indicating group information is stored in the group information management table 800 by setting information in each field for each job. "c" is an arbitrary integer.

A job flow name assigned to a job flow that defines an execution order in a job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

An attribute of the one job, which represents a type of the one job identified by the job ID, is set in the field of the type. A group ID for identifying a group into which the one job identified by the job ID is classified is set in the field of the group ID. A group ID is, for example, a group 1, a group 2, a group 3, or a group 4.

Here, the group 1 is a group ID for identifying a group into which a job having a collection attribute is classified. The group 2 is a group ID for identifying a group into which a job having a processing attribute is classified. The group 3 is a group ID for identifying a group into which a job having an integration attribute is classified. The group 4 is a group ID for identifying a group into which a job having an accumulation attribute is classified.

Next, an example of storage contents of the head information management table 900 in which the information processing apparatus 100 stores head information indicating a head job of each group will be described with reference to FIG. 9. For example, the head information management table 900 is implemented by a storage region such as the memory 302 or the recording medium 305 of the information processing apparatus 100 illustrated in FIG. 3. A method by which the information processing apparatus 100 generates, updates, and uses the head information management table 900 will be described below with reference to FIGS. 12 to 26, for example.

Figure 9:
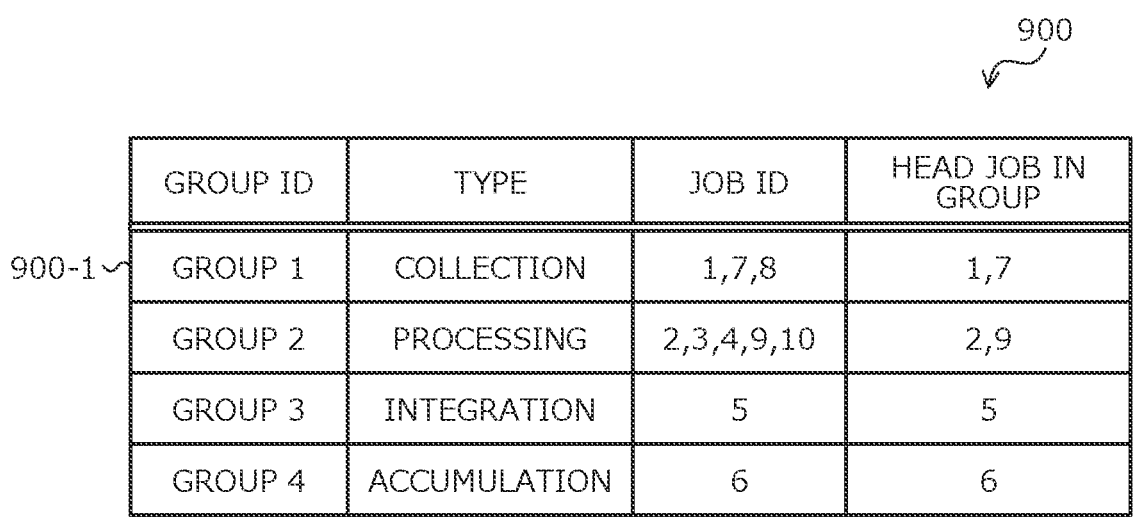
FIG. 9 is an explanatory diagram illustrating an example of contents stored in a head information management table.

FIG. 9 is an explanatory diagram illustrating an example of contents stored in the head information management table 900. As illustrated in FIG. 9, the head information management table 900 has fields of a group ID, a type, a job ID, and a head job ID. A record 900-*d* indicating head information is stored in the head information management table 900 by setting information in each field for each group. "d" is an arbitrary integer.

A group ID for identifying any one group of a plurality of groups is set in the field of the group ID. An attribute which represents a type of the one group identified by the group ID and the one group has is set in the field of the type. The attribute of the group corresponds to, for example, an attribute of a job to be classified into the group. The attribute of the group includes, for example, collection, processing, integration, accumulation, or the like.

A list of job IDs for respectively identifying one or more jobs belonging to the one group identified by the group ID is set in the field of the job ID. A list of head job IDs for respectively identifying one or more head jobs in the one group identified by the group ID is set in the field of the head job ID.

Next, an example of storage contents of the restart information management table 1000 corresponding to the job flow 500, which is stored by the information processing apparatus 100 and used when the job flow 500 is restarted, will be described with reference to FIG. 10. For example, the restart information management table 1000 is implemented by a storage region such as the memory 302 or the recording medium 305 of the information processing apparatus 100 illustrated in FIG. 3. A method by which the information processing apparatus 100 uses the restart information management table 1000 will be described below with reference to FIGS. 12 to 26, for example.

Figure 10:
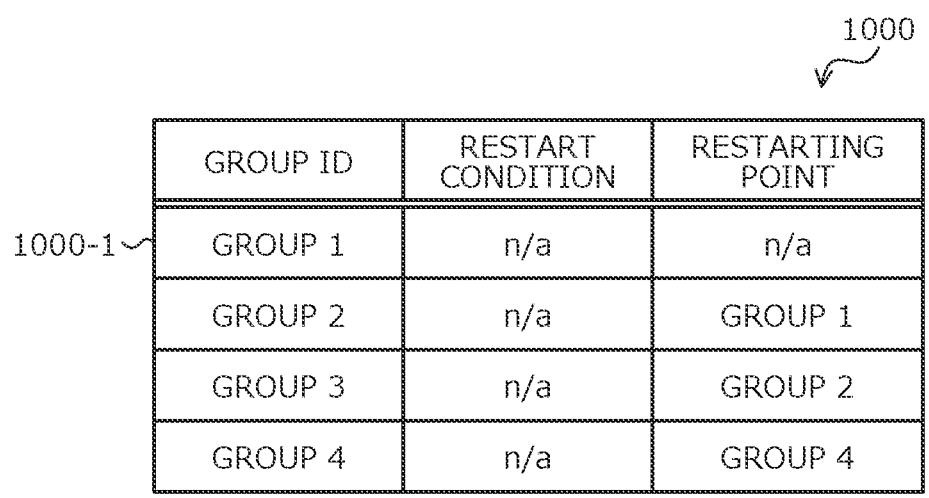
FIG. 10 is an explanatory diagram illustrating an example of contents stored in a restart information management table.

FIG. 10 is an explanatory diagram illustrating an example of contents stored in the restart information management table 1000. As illustrated in FIG. 10, the restart information management table 1000 has fields of a group ID, a restart condition, and a restarting point. A record 1000-*e* indicating restart information is stored in the restart information management table 1000 by setting information in each field for each group. "e" is an arbitrary integer. For example, a plurality of pieces of restart information may exist for one job.

A group ID for identifying any one group of a plurality of groups is set in the field of the group ID. A condition for restarting the job flow 500 in accordance with an abnormality of any one job belonging to the one group identified by the group ID is set. "n/a" is set in the field of the restart condition as a condition for restarting the job flow 500 in a case where any abnormality occurs and a type of abnormality is not restricted. In a case where the condition for restarting the job flow 500 does not exist, "n/a" is set in the field of the restart condition.

For example, an end code representing the type of abnormality occurring in the one job belonging to the one group identified by the group ID may be set in the field of the restart condition as a condition for restarting the job flow. The set end code indicates that the job flow 500 is to be restarted in a case where the type of abnormality occurring in the one job belonging to the one group identified by the group ID coincides with the specific type indicated by the end code.

Information indicating a group serving as a starting point from which the job flow 500 is to be restarted is set in the field of the restarting point. A group ID for identifying the group is set in the field of the restarting point as the information indicating the group serving as a starting point from which the job flow 500 is to be restarted. "n/a" is set in the field of the restarting point in a case where there is no group serving as a starting point from which the job flow 500 is to be restarted.

In a case where a value other than "n/a" is set in the field of the restarting point, "n/a" set in the field of the restart condition represents that the type of abnormality is not restricted and the abnormality occurs in the job, as a condition for restarting the job flow 500. In a case where "n/a" is set in the field of the restarting point, "n/a" set in the field of the restart condition indicates that the condition for restarting the job flow 500 does not exist.

Next, an example of storage contents of the execution history management table 1100 in which the information processing apparatus 100 stores execution history information indicating an end status of each job of a job group when the job flow 500 is abnormally ended will be described with reference to FIG. 11. For example, the execution history management table 1100 is implemented by a storage region such as the memory 302 or the recording medium 305 of the information processing apparatus 100 illustrated in FIG. 3. A method by which the information processing apparatus 100 generates, updates, and uses the execution history management table 1100 will be described below with reference to FIGS. 12 to 26, for example.

FIG. 11 is an explanatory diagram illustrating an example of contents stored in the execution history management table 1100. As illustrated in FIG. 11, the execution history management table 1100 has fields of a job flow name, a job ID, a job name, a job status, and a job end code. A record 1100-*f* indicating execution history information is stored in the execution history management table 1100 by setting information in each field for each job. "f" is an arbitrary integer.

A job flow name assigned to a job flow that defines an execution order in a job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

A status indicating an end status of the one job identified by the job ID is set in the field of the job status. The status indicates whether the one job identified by the job ID is abnormally ended, whether the one job identified by the job ID is normally ended, or whether the one job identified by the job ID is waiting for execution.

An end code of the one job identified by the job ID is set in the field of the end code of the job. For example, when a value of the end code is 0, the end code indicates that no abnormality occurs in the one job identified by the job ID and the one job identified by the job ID is normally ended.

For example, when the value is equal to or more than one, the end code indicates that an abnormality occurs in the one job identified by the job ID and the one job identified by the job ID is abnormally ended. For example, when the value is equal to or more than one, the end code represents a type of abnormality corresponding to the value. For example, in a case where the one job identified by the job ID is waiting for execution, the end code is "n/a".

Next, a specific example in which the information processing apparatus 100 classifies a job group into a plurality of groups will be described with reference to FIGS. 12 to 20.

Figure 12:
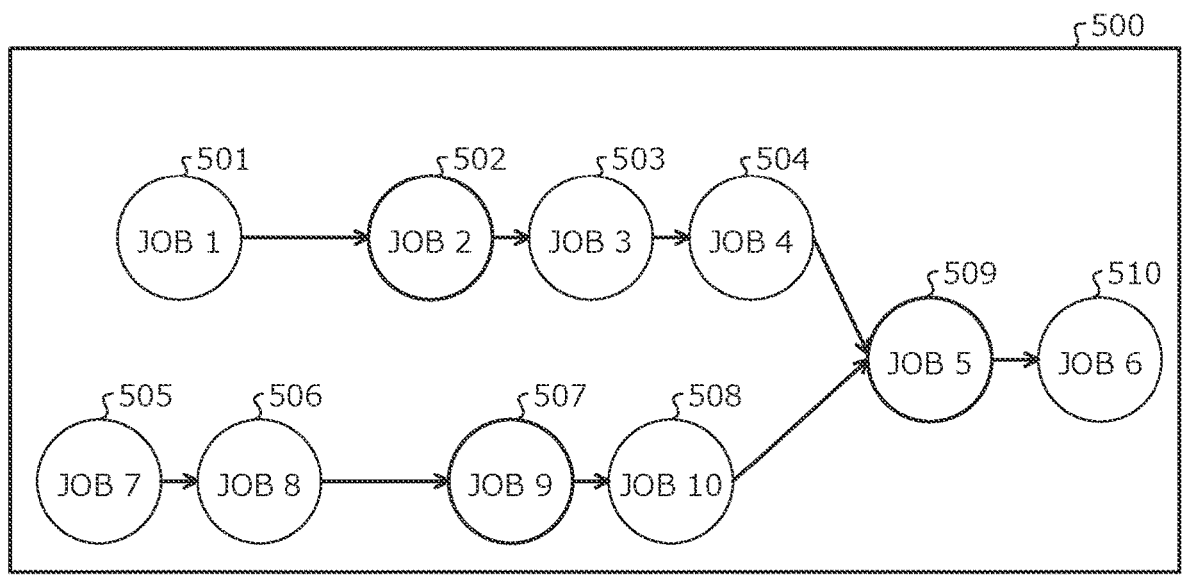
FIG. 12 is an explanatory diagram (part 1) illustrating a specific example in which a job group is classified into a plurality of groups.

FIGS. 12 to 20 are explanatory diagrams illustrating a specific example in which a job group is classified into a plurality of groups. In FIG. 12, it is assumed that the information processing apparatus 100 acquires the job flow 500, and stores the acquired job flow 500 by using the job flow management table 600. The job flow 500 does not represent an attribute of each job of the job group. Therefore, in order to classify the job group into the plurality of groups, the information processing apparatus 100 specifies the attribute of each job of the job group.

The attribute information management table 700 in an initial state is empty. The information processing apparatus 100 stores, in the attribute information management table 700, a record corresponding to each job of the job group and having an empty type field. The information processing apparatus 100 acquires processing contents of each job of the job group.

In a case where the processing content of any one job is to collect data from a data source, the information processing apparatus 100 assigns a collection attribute to the one job. For example, when the processing content of any one job is a processing content for acquiring data by using an ETL tool, the information processing apparatus 100 determines that the processing content is a processing content for collecting data from a data source. For example, when the processing content of any one job is a processing content for issuing a data collection request to a DB in a structured query language (SQL), the information processing apparatus 100 determines that the processing content is a processing content for collecting data from a data source.

For example, when the processing content of any one job is a processing content for generating an intermediate file to be handled by a job to be executed next, the information processing apparatus 100 determines that the processing content is a processing content for collecting data from a data source. In this case, the information processing apparatus 100 updates the attribute information management table 700 by setting a collection attribute to a record corresponding to the one job in the attribute information management table 700.

For example, in the example illustrated in FIG. 12, the information processing apparatus 100 sets the collection attribute in records corresponding to the jobs 1, 7, and 8 in the attribute information management table 700. The information processing apparatus 100 assigns an alias name of collection 1 to the job 1. The information processing apparatus 100 assigns an alias name of collection 2 to the job 7. The information processing apparatus 100 assigns an alias name of collection 3 to the job 8.

In a case where the processing content of any one job is to process data acquired from a single preceding job, the information processing apparatus 100 assigns a processing attribute to the one job. In this case, the information processing apparatus 100 updates the attribute information management table 700 by setting the processing attribute in a record corresponding to the one job in the attribute information management table 700.

For example, in the example illustrated in FIG. 12, the information processing apparatus 100 sets the processing attribute in records corresponding to the jobs 2 to 4, 9, and 10 in the attribute information management table 700. The information processing apparatus 100 assigns an alias name of processing 1 to the job 2. The information processing apparatus 100 assigns an alias name of processing 2 to the job 3. The information processing apparatus 100 assigns an alias name of processing 3 to the job 4. The information processing apparatus 100 assigns an alias name of processing 4 to the job 9. The information processing apparatus 100 assigns an alias name of processing 5 to the job 10.

In a case where the processing content of any one job is to integrate data acquired from a plurality of preceding jobs, the information processing apparatus 100 assigns an integration attribute to the one job. In this case, the information processing apparatus 100 updates the attribute information management table 700 by setting the integration attribute in a record corresponding to the one job in the attribute information management table 700.

For example, in the example illustrated in FIG. 12, the information processing apparatus 100 sets the integration attribute in a record corresponding to the job 5 in the attribute information management table 700. The information processing apparatus 100 assigns an alias name of integration 1 to the job 5.

In a case where the processing content of any one job is to store data in a database, the information processing apparatus 100 assigns an accumulation attribute to the one job. In this case, the information processing apparatus 100 updates the attribute information management table 700 by setting the accumulation attribute in a record corresponding to the one job in the attribute information management table 700.

For example, in the example illustrated in FIG. 12, the information processing apparatus 100 sets the accumulation attribute in a record corresponding to the job 6 in the attribute information management table 700. The information processing apparatus 100 assigns an alias name of accumulation 1 to the job 6. Thus, the information processing apparatus 100 may obtain a guideline for classifying the job group into the plurality of groups. Next, description will be continued with reference to FIG. 13.

Figure 13:
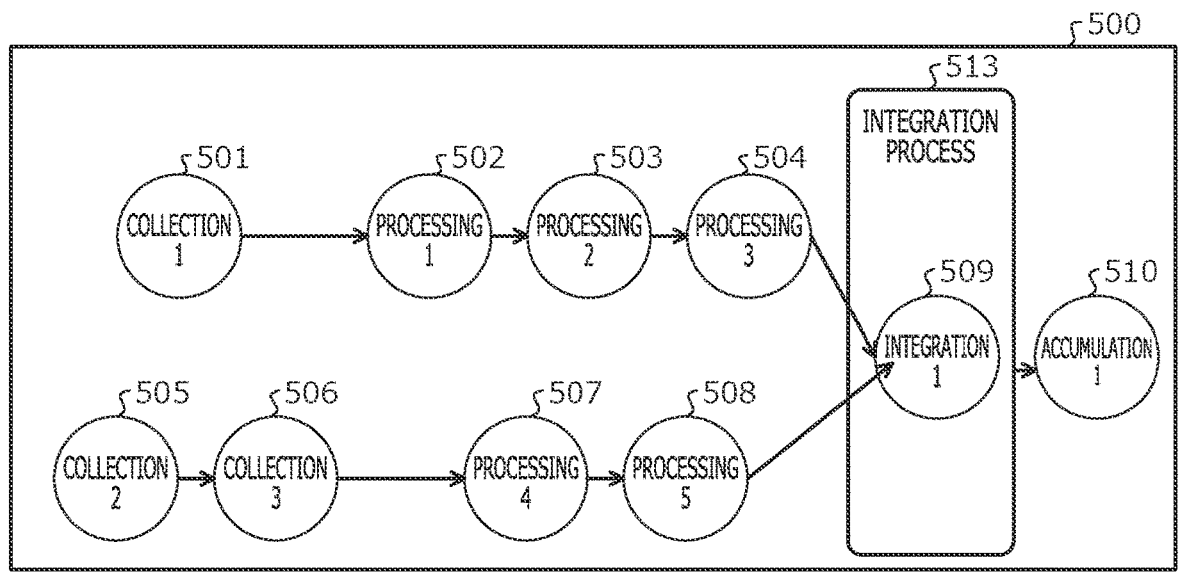
FIG. 13 is an explanatory diagram (part 2) illustrating the specific example in which the job group is classified into the plurality of groups.

In FIG. 13, the group information management table 800 in an initial state is empty. The information processing apparatus 100 stores, in the group information management table 800, a record corresponding to each job of the job group and having an empty group ID field.

First, for each job having an integration attribute, the information processing apparatus 100 prepares one group having the integration attribute, and classifies the job having the integration attribute into the one group prepared for the job having the integration attribute. The information processing apparatus 100 updates the group information management table 800 by setting a group ID for identifying a group into which the job is classified, in a record corresponding to the job having the integration attribute in the group information management table 800.

For example, in the example illustrated in FIG. 13, the information processing apparatus 100 prepares a group 513 having the integration attribute, and classifies integration 1 into the group 513 having the integration attribute. For example, the information processing apparatus 100 sets the group ID=group 3 for identifying the group 513 to a record corresponding to integration 1, in the group information management table 800.

Thus, the information processing apparatus 100 may classify the job having the integration attribute into the group. Therefore, the information processing apparatus 100 may reduce classifying, into one group, two or more jobs that do not have the common processing content and are not preferably handled collectively as a starting point from which the job flow 500 is to be restarted. For example, the information processing apparatus 100 may reduce classification of a job having an integration attribute and a job having an attribute other than the integration attribute into one group.

In the information processing apparatus 100, a job having an integration attribute is considered to tend to have a processing content independent of another job having the integration attribute. Accordingly, the information processing apparatus 100 may classify the jobs having the integration attribute into different groups one by one, and may handle the job having the integration attribute in preferable units as a starting point from which the job flow 500 is to be restarted. At a time of restarting the job flow 500, the information processing apparatus 100 may handle the job having the integration attribute in group units. Next, description will be continued with reference to FIG. 14.

Figure 14:
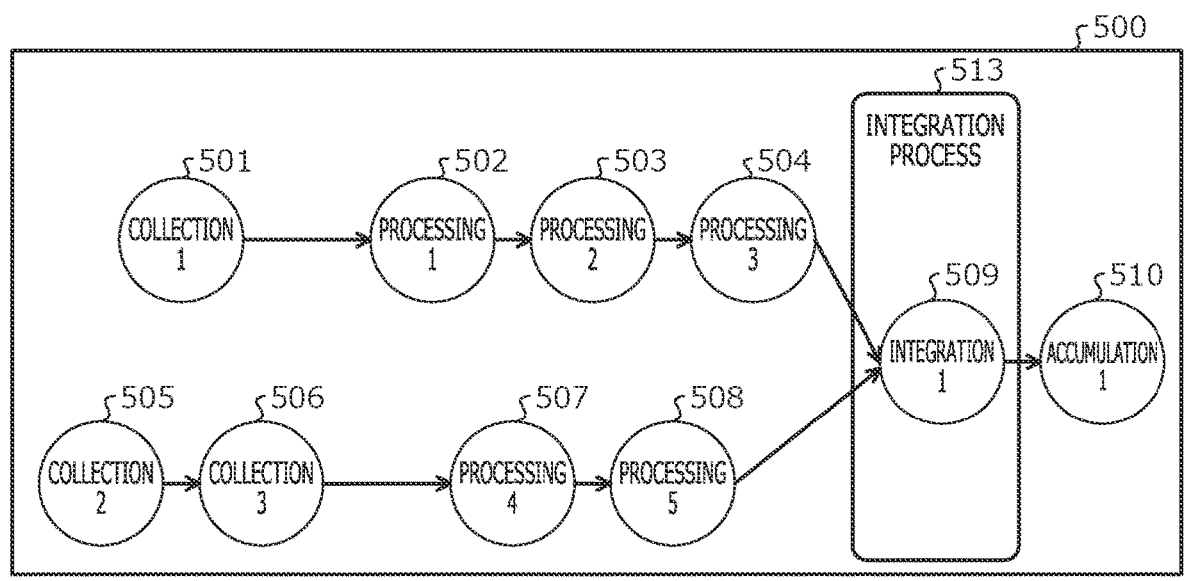
FIG. 14 is an explanatory diagram (part 3) illustrating the specific example in which the job group is classified into the plurality of groups.

In FIG. 14, in accordance with the classification of integration 1 into the group 513 having the integration attribute, the information processing apparatus 100 specifies integration 1 as a head job in the group 513 having the integration attribute. The information processing apparatus 100 stores, in the head information management table 900, a record representing the group 513 having the integration attribute, one or more jobs belonging to the group 513, and integration 1 that is the specified head job in association with each other.

For example, the information processing apparatus 100 generates a record 900-3 in which a group ID for identifying the group 513, a list of a job ID for identifying each job belonging to the group 513, and a job ID for identifying a head job are associated with each other. The information processing apparatus 100 stores the generated record 900-3 in the head information management table 900.

Thus, in a case where the group 513 is set as a starting point from which the job flow 500 is to be restarted, the information processing apparatus 100 may specify which job belonging to the group 513 is set as a specific starting point from which the job flow 500 is to be restarted. Next, description will be continued with reference to FIG. 15.

Figure 15:
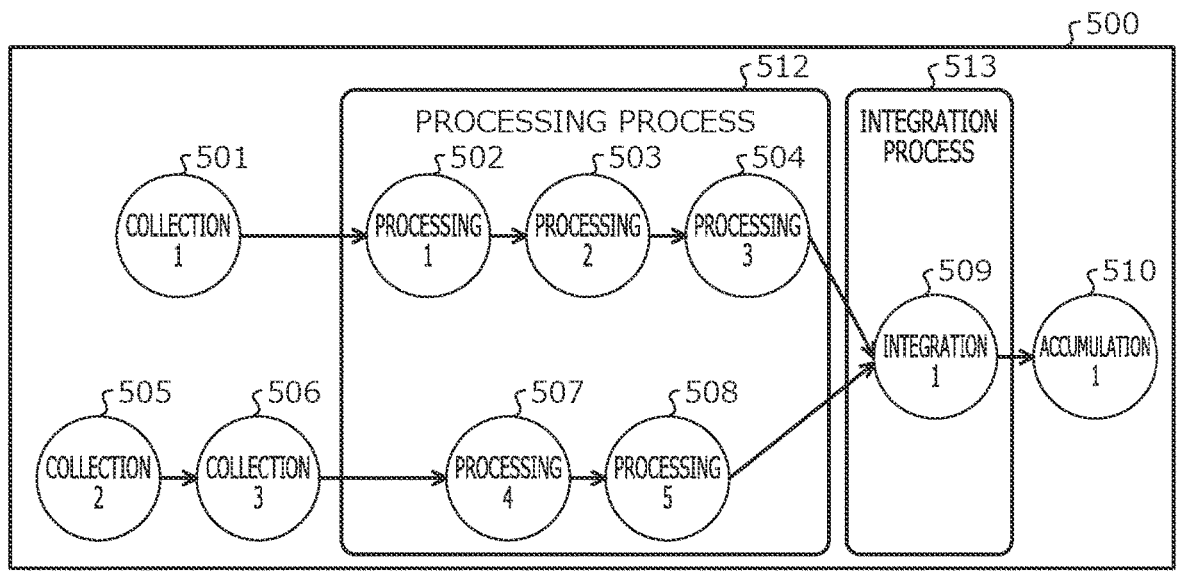
FIG. 15 is an explanatory diagram (part 4) illustrating the specific example in which the job group is classified into the plurality of groups.

In FIG. 15, for each job having the integration attribute, the information processing apparatus 100 searches for a preceding job existing before the job having the integration attribute, finds one or more jobs having a processing attribute, and classifies the job into one group. For example, by using one job having the integration attribute as a starting point, the information processing apparatus 100 classifies one or more preceding jobs having the processing attribute, which continuously exist before the one job, into one group having the processing attribute. The information processing apparatus 100 updates the group information management table 800 by setting a group ID for identifying a group into which the job is classified, in a record corresponding to the job having the processing attribute in the group information management table 800.

For example, in the example illustrated in FIG. 15, the information processing apparatus 100 classifies processing 1 to 3 continuously existing before integration 1 and processing 4 and 5 continuously existing before integration 1 into a group 512 having a processing attribute. For example, the information processing apparatus 100 sets the group ID=group 2 for identifying the group 512 to records corresponding to processing 1 to 5, in the group information management table 800.

Thus, the information processing apparatus 100 may classify the job having the processing attribute into the group. Since it is considered that two or more jobs having a common processing content have similar properties even when the jobs are used as a starting point from which the job flow 500 is to be restarted, a failure is unlikely to occur even when the jobs are collectively handled as the starting point from which the job flow 500 is to be restarted.

By contrast, the information processing apparatus 100 may classify two or more jobs which have the common processing content and are preferably handled collectively as a starting point from which the job flow 500 is to be restarted, into one group. For example, the information processing apparatus 100 may collectively classify two or more jobs having the same processing attribute into one group.

The information processing apparatus 100 may reduce classifying, into one group, two or more jobs that do not have the common processing content and are not preferably handled collectively as a starting point from which the job flow 500 is to be restarted. For example, the information processing apparatus 100 may reduce classification of a job having a processing attribute and a job having an attribute other than the processing attribute into one group. At a time of restarting the job flow 500, the information processing apparatus 100 may handle the job having the processing attribute in group units. Next, description will be continued with reference to FIG. 16.

Figure 16:
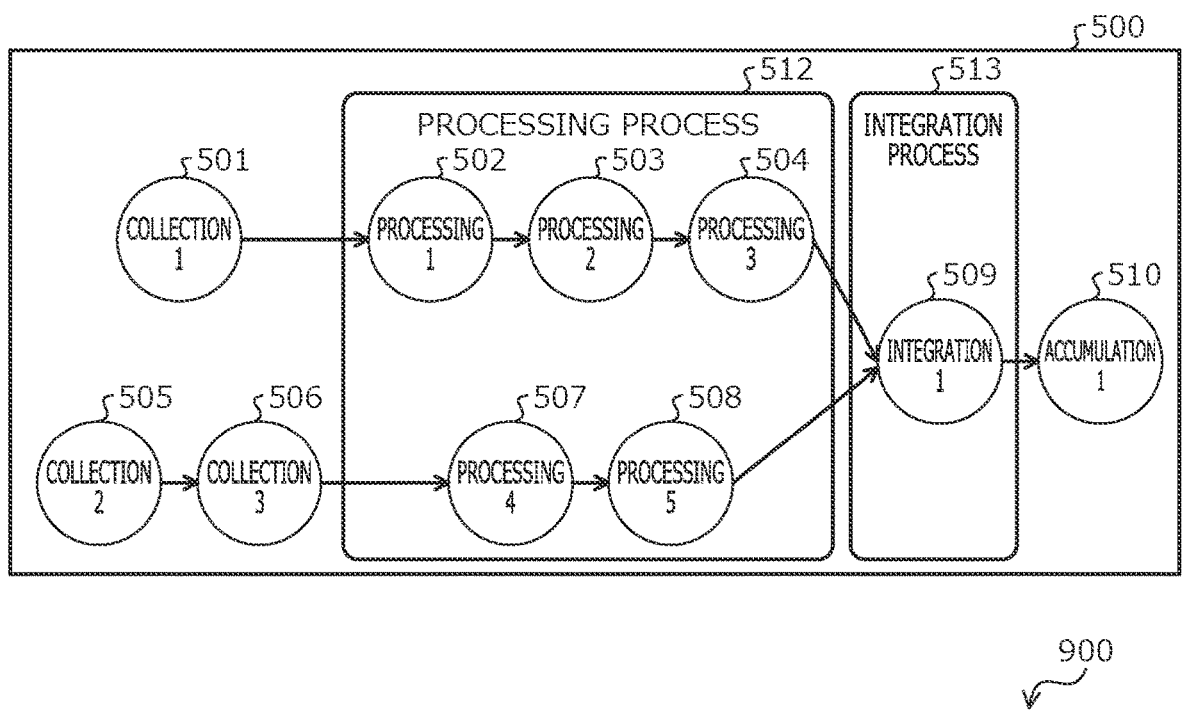
FIG. 16 is an explanatory diagram (part 5) illustrating the specific example in which the job group is classified into the plurality of groups.

In FIG. 16, in accordance with the classification of processing 1 to 5 into the group 512 having the processing attribute, the information processing apparatus 100 specifies processing 1 and 4 as head jobs in the group 512 having the processing attribute. The information processing apparatus 100 stores, in the head information management table 900, a record representing the group 512 having the processing attribute, one or more jobs belonging to the group 512, and processing 1 and 4 that are the specified head jobs in association with each other.

For example, the information processing apparatus 100 generates a record 900-2 in which a group ID for identifying the group 512, a list of a job ID for identifying each job belonging to the group 512, and a job ID for identifying a head job are associated with each other. The information processing apparatus 100 stores the generated record 900-2 in the head information management table 900.

Thus, in a case where the group 512 is set as a starting point from which the job flow 500 is to be restarted, the information processing apparatus 100 may specify which job belonging to the group 512 is set as a specific starting point from which the job flow 500 is to be restarted. Next, description will be continued with reference to FIG. 17.

In FIG. 17, for each group having the processing attribute, the information processing apparatus 100 searches for a preceding job existing before each head job in the group having the processing attribute, finds one or more jobs having a collection attribute, and classifies the job into one group. For example, by using each head job in one group having the processing attribute as a starting point, the information processing apparatus 100 classifies one or more preceding jobs having the collection attribute, which continuously exist before the head job, into one group having the collection attribute. The information processing apparatus 100 updates the group information management table 800 by setting a group ID for identifying a group into which the job is classified, in a record corresponding to the job having the collection attribute in the group information management table 800.

For example, in the example illustrated in FIG. 17, the information processing apparatus 100 refers to the head information management table 900 to specify processing 1 and 4 that are the head jobs in the group 512. For example, the information processing apparatus 100 classifies collection 1 existing before specified processing 1 and collections 2 and 3 continuously existing before specified processing 4 into a group 511 having the collection attribute. For example, the information processing apparatus 100 sets the group ID=group 1 for identifying the group 511 to records corresponding to collections 1 to 3, in the group information management table 800.

Thus, the information processing apparatus 100 may classify the job having the collection attribute into the group. Since it is considered that two or more jobs having a common processing content have similar properties even when the jobs are used as a starting point from which the job flow 500 is to be restarted, a failure is unlikely to occur even when the jobs are collectively handled as the starting point from which the job flow 500 is to be restarted.

By contrast, the information processing apparatus 100 may classify two or more jobs which have the common processing content and are preferably handled collectively as a starting point from which the job flow 500 is to be restarted, into one group. For example, the information processing apparatus 100 may collectively classify two or more jobs having the same collection attribute into one group.

The information processing apparatus 100 may reduce classifying, into one group, two or more jobs that do not have the common processing content and are not preferably handled collectively as a starting point from which the job flow 500 is to be restarted. For example, the information processing apparatus 100 may reduce classification of a job having a collection attribute and a job having an attribute other than the collection attribute into one group. At a time of restarting the job flow 500, the information processing apparatus 100 may handle the job having the collection attribute in group units. Next, description will be continued with reference to FIG. 18.

Figure 18:
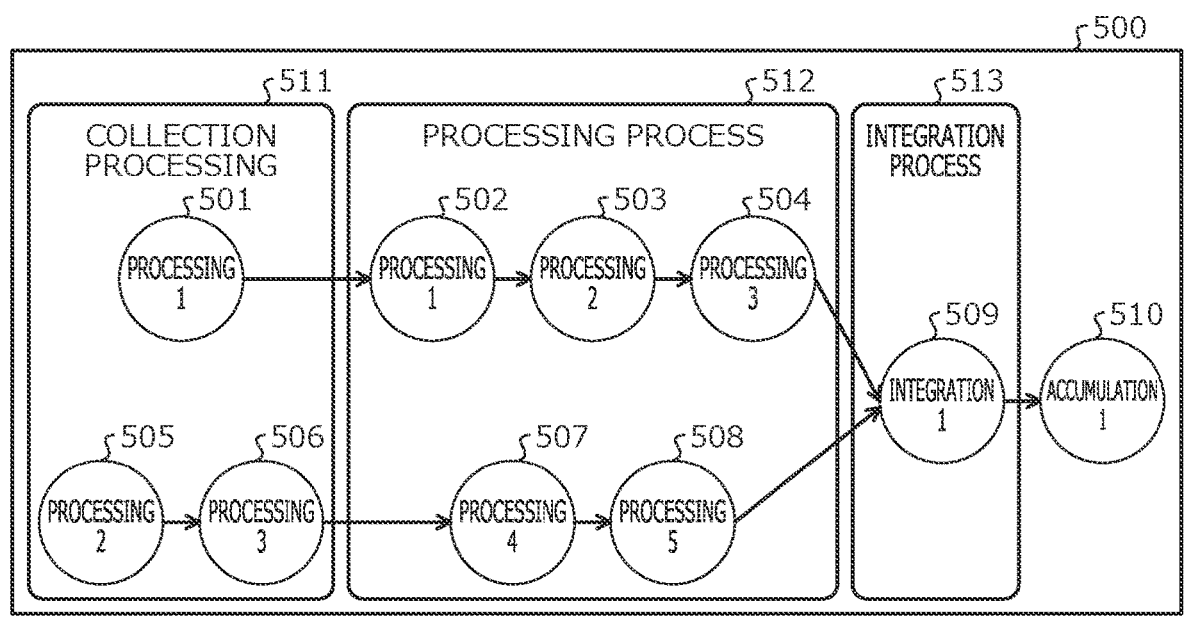
FIG. 18 is an explanatory diagram (part 7) illustrating the specific example in which the job group is classified into the plurality of groups.

In FIG. 18, in accordance with the classification of collections 1 to 3 into the group 511 having the collection attribute, the information processing apparatus 100 specifies collections 1 and 2 as head jobs in the group 511 having the collection attribute. The information processing apparatus 100 stores, in the head information management table 900, a record representing the group 511 having the collection attribute, one or more jobs belonging to the group 511, and collections 1 and 2 that are the specified head jobs in association with each other.

For example, the information processing apparatus 100 generates a record 900-1 in which a group ID for identifying the group 511, a list of a job ID for identifying each job belonging to the group 511, and a job ID for identifying a head job are associated with each other. The information processing apparatus 100 stores the generated record 900-1 in the head information management table 900.

Thus, in a case where the group 511 is set as a starting point from which the job flow 500 is to be restarted, the information processing apparatus 100 may specify which job belonging to the group 511 is set as a specific starting point from which the job flow 500 is to be restarted. Next, description will be continued with reference to FIG. 19.

In FIG. 19, for each job having the integration attribute, the information processing apparatus 100 searches for a following job existing after the job having the integration attribute, finds one or more jobs having an accumulation attribute, and classifies the job into one group. For example, by using one job having the integration attribute as a starting point, the information processing apparatus 100 classifies one or more following jobs having the accumulation attribute, which continuously exist after the one job, into one group having the accumulation attribute. The information processing apparatus 100 updates the group information management table 800 by setting a group ID for identifying a group into which the job is classified, in a record corresponding to the job having the accumulation attribute in the group information management table 800.

For example, in the example illustrated in FIG. 19, the information processing apparatus 100 classifies accumulation 1 existing after integration 1 into a group 514 having the accumulation attribute. For example, the information processing apparatus 100 sets the group ID=group 4 for identifying the group 514 to a record corresponding to accumulation 1, in the group information management table 800.

Thus, the information processing apparatus 100 may classify the job having the accumulation attribute into the group. Since it is considered that two or more jobs having a common processing content have similar properties even when the jobs are used as a starting point from which the job flow 500 is to be restarted, a failure is unlikely to occur even when the jobs are collectively handled as the starting point from which the job flow 500 is to be restarted.

By contrast, the information processing apparatus 100 may classify two or more jobs which have the common processing content and are preferably handled collectively as a starting point from which the job flow 500 is to be restarted, into one group. For example, the information processing apparatus 100 may collectively classify two or more jobs having the same accumulation attribute into one group.

The information processing apparatus 100 may reduce classifying, into one group, two or more jobs that do not have the common processing content and are not preferably handled collectively as a starting point from which the job flow 500 is to be restarted. For example, the information processing apparatus 100 may reduce classification of a job having an accumulation attribute and a job having an attribute other than the accumulation attribute into one group. At a time of restarting the job flow 500, the information processing apparatus 100 may handle the job having the accumulation attribute in group units. Next, description will be continued with reference to FIG. 20.

Figure 20:
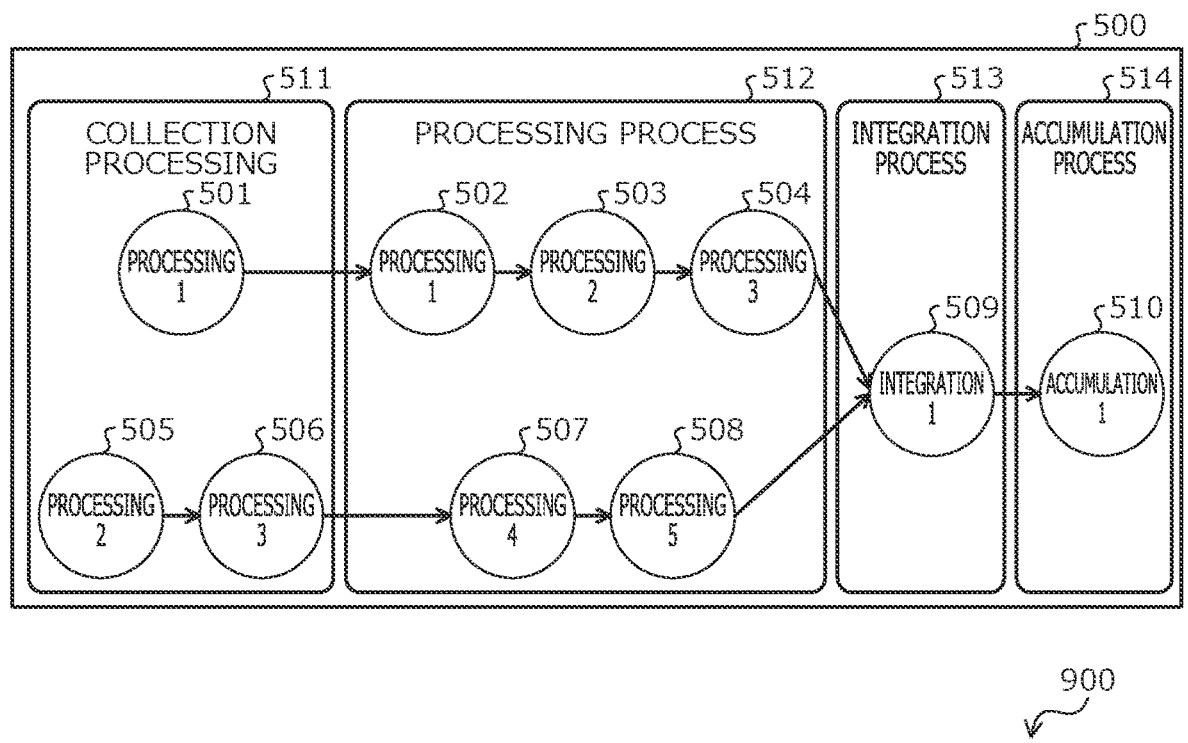
FIG. 20 is an explanatory diagram (part 9) illustrating the specific example in which the job group is classified into the plurality of groups.

In FIG. 20, in accordance with the classification of accumulation 1 into the group 514 having the accumulation attribute, the information processing apparatus 100 specifies accumulation 1 as a head job in the group 514 having the accumulation attribute. The information processing apparatus 100 stores, in the head information management table 900, a record representing the group 514 having the accumulation attribute, one or more jobs belonging to the group 514, and accumulation 1 that is the specified head job in association with each other.

For example, the information processing apparatus 100 generates a record 900-4 in which a group ID for identifying the group 514, a list of a job ID for identifying each job belonging to the group 514, and a job ID for identifying a head job are associated with each other. The information processing apparatus 100 stores the generated record 900-4 in the head information management table 900. Thus, in a case where the group 514 is set as a starting point from which the job flow 500 is to be restarted, the information processing apparatus 100 may specify which job belonging to the group 514 is set as a specific starting point from which the job flow 500 is to be restarted. In this manner, the information processing apparatus 100 may execute preparation for enabling the job flow 500 to be restarted.

An operator or the like of the job flow 500 may use the information processing apparatus 100 to generate the restart information management table 1000. For example, the operator or the like of the job flow 500 may refer to the group information management table 800 to determine which group is set as a starting point from which the job flow 500 is to be restarted in accordance with an abnormality of a job belonging to any one group. The operator or the like of the job flow 500 may use the information processing apparatus 100 to generate the restart information management table 1000 based on a determination result. For example, the information processing apparatus 100 generates the restart information management table 1000 based on an operation input by the operator of the job flow 500.

Based on the operation input by the operator of the job flow 500, the information processing apparatus 100 may acquire, in advance, a rule in which a group having a processing attribute is set as a starting point from which the job flow 500 is to be restarted in accordance with an abnormality of a job belonging to a group having an integration attribute. For example, in accordance with the rule, the information processing apparatus 100 may store, in association with the group having the integration attribute into which the job is actually classified, information indicating a group having a processing attribute into which a job is actually classified, as a starting point from which the job flow 500 is to be restarted.

Next, a specific example in which the information processing apparatus 100 restarts the job flow 500 will be described with reference to FIGS. 21 and 22.

Figure 21:
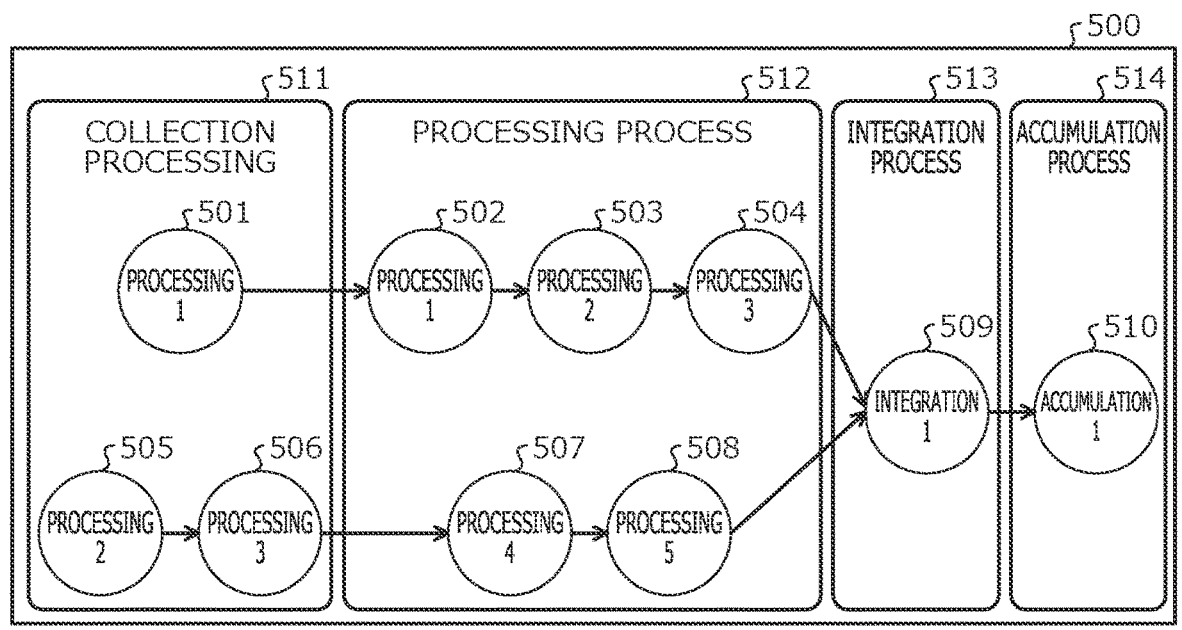
FIG. 21 is an explanatory diagram (part 1) illustrating a specific example of restarting the job flow.
Figure 22:
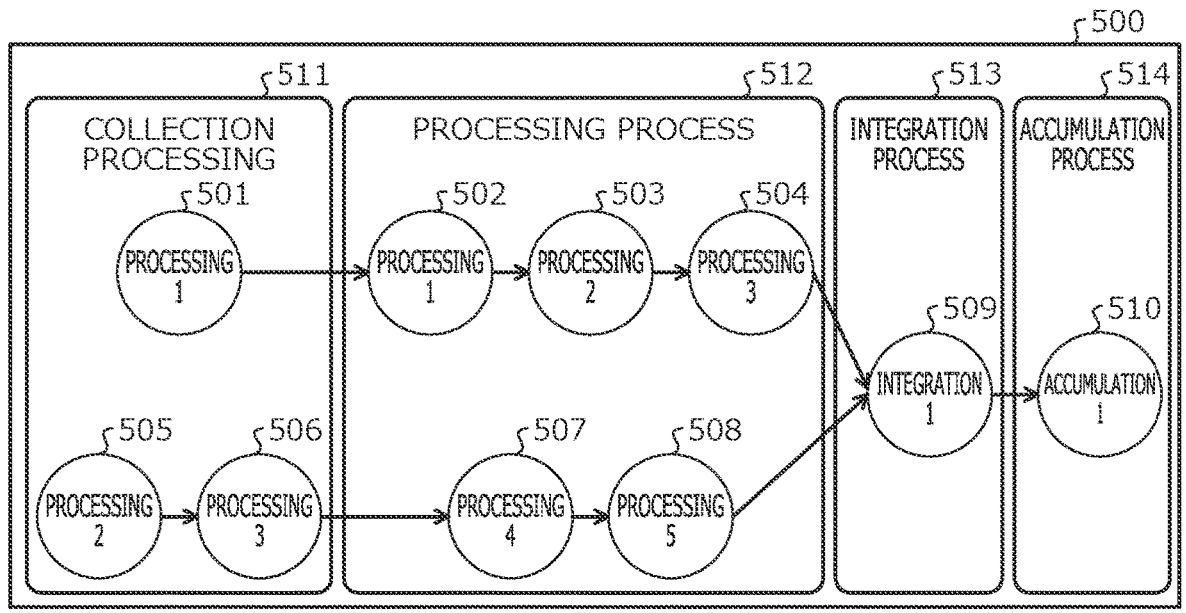
FIG. 22 is an explanatory diagram (part 2) illustrating the specific example of restarting the job flow.

FIGS. 21 and 22 are explanatory diagrams illustrating a specific example of restarting the job flow 500. In FIG. 21, it is assumed that the information processing apparatus 100 sequentially starts execution of each job in a job group in accordance with the job flow 500. It is assumed that, since an abnormality occurs in any one job of the job group, the information processing apparatus 100 abnormally ends the job being executed and abnormally ends the job flow 500.

It is assumed that the information processing apparatus 100 stores, in the execution history management table 1100, execution history information indicating an end status of each job of the job group and an end code of each job of the job group at a time when the job flow 500 is abnormally ended. In response to the abnormal end of the job flow 500, the information processing apparatus 100 restarts the job flow 500.

(21-1) For example, when the job flow 500 is abnormally ended, the information processing apparatus 100 refers to the execution history management table 1100 to specify one or more abnormally ended jobs in a job group. The information processing apparatus 100 refers to the execution history management table 1100 to specify a job end code of each job of the specified one or more abnormally ended jobs.

For example, in the example illustrated in FIG. 21, the information processing apparatus 100 refers to the field of the "job status" in each record 1100-i of the execution history management table 1100, and extracts a record 1100-5 in which the "job status" is "abnormal end". For example, the information processing apparatus 100 refers to the field of the "job ID" in the extracted record 1100-5 to specify the abnormally ended job 5=integration 1. By referring to the field of the "job end code" in the extracted record 1100-5, the information processing apparatus 100 specifies an end code "1" corresponding to the abnormally ended job 5.

(21-2) Before the job flow 500 is restarted, the information processing apparatus 100 may output information indicating the one or more abnormally ended jobs and the end code of each abnormally ended job such that an operator of the job flow 500 may refer to the information. When receiving a specific operation input by the operator of the job flow 500, the information processing apparatus 100 may restart the job flow 500. As a result, the information processing apparatus 100 may leave room for the operator of the job flow 500 to handle the one or more abnormally ended jobs. Here, it is assumed that the information processing apparatus 100 receives a specific operation input by the operator of the job flow 500.

(21-3) Since the specific operation input by the operator of the job flow 500 is received, the information processing apparatus 100 refers to the group information management table 800 to specify a group to which the abnormally ended job belongs. In the example illustrated in FIG. 21, the information processing apparatus 100 refers to a record 800-5 corresponding to the abnormally ended job 5 to specify the group 513 having the group ID "group 3" to which the job 5 belongs, in the group information management table 800. Next, description will be continued with reference to FIG. 22.

In FIG. 22, the information processing apparatus 100 restarts the job flow 500, as described in (22-1) to (22-5) to be described below.

(22-1) The information processing apparatus 100 refers to the field of the "restart condition" corresponding to a group to which each abnormally ended job belongs in the record 1000-*i* to specify one or more conditions corresponding to the group, in the restart information management table 1000.

For example, in the example illustrated in FIG. 22, the information processing apparatus 100 reads a record 1000-5 corresponding to the group 513 to which the abnormally ended job 5 belongs, in the restart information management table 1000. For example, the information processing apparatus 100 refers to the field of the "restart condition" in the read record 1000-5 to specify a condition corresponding to the group 513 to which the abnormally ended job 5 belongs. For example, the information processing apparatus 100 specifies the condition "n/a" corresponding to the group 513 to which the abnormally ended job 5 belongs.

(22-2) The information processing apparatus 100 determines whether or not an end code specified for each abnormally ended job satisfies at least one of one or more conditions corresponding to a group to which the job belongs. By referring to the restart information management table 1000, the information processing apparatus 100 specifies, for the group to which each abnormally ended job belongs, a group serving a starting point from which the job flow 500 is to be restarted, which is combined with a condition determined to be satisfied, corresponding to the group. The information processing apparatus 100 registers, in a list, a combination of the group to which each abnormally ended job belongs and the group serving as a starting point from which the job flow 500 is to be restarted, which is specified for the group.

For example, in the example illustrated in FIG. 22, the information processing apparatus 100 determines that the end code "1" specified for the abnormally ended job 5 satisfies the condition "n/a" corresponding to the group 513 to which the specified job 5 belongs. For example, for the group 513 to which the abnormally ended job 5 belongs, the information processing apparatus 100 specifies the group 512 serving as a starting point from which the job flow 500 is to be restarted, which is combined with the condition "n/a" determined to be satisfied. For example, the information processing apparatus 100 registers, in the list, a combination of the group 513 to which the abnormally ended job 5 belongs and the group 512 serving as a starting point from which the job flow 500 is to be restarted, which is specified for the group 513 to which the abnormally ended job 5 belongs.

(22-3) A case is conceivable in which one or more conditions corresponding to a group to which any one job that is abnormally ended belongs do not exist. In this case, the information processing apparatus 100 registers, in the list, a combination of the group that does not have one or more conditions and a predetermined job serving as a starting point from which the job flow 500 is to be restarted. The predetermined job is, for example, an abnormally ended job belonging to the group that does not have one or more conditions, a preceding job existing immediately before the job, each head job in the group that does not have one or more conditions, or the like.

(22-4) A case is conceivable in which none of one or more conditions corresponding to a group to which any one job that is abnormally ended belongs is satisfied. In this case, the information processing apparatus 100 registers, in the list, a combination of the group of which any condition is not satisfied and a predetermined job serving as a starting point from which the job flow 500 is to be restarted. The predetermined job is, for example, the abnormally ended job belonging to the group of which any condition is not satisfied, a preceding job existing immediately before the job, each head job in the group of which any conditions is not satisfied, or the like.

(22-5) The information processing apparatus 100 restarts the job flow from each head job in each group registered in the list, which is a starting point from which the job flow 500 is to be restarted as a starting point such that the same job is not executed repeatedly. For example, in the example illustrated in FIG. 22, the information processing apparatus 100 restarts the job flow 500 from processing 1 and 4 serving as starting points from which the job flow 500 is to be restarted, which are respective head jobs in the groups 512 registered in the list, as starting points.

Thus, the information processing apparatus 100 may appropriately control the starting point from which the job flow 500 is to be restarted in group units. For example, in a case where any one job belonging to any one group is abnormally ended, the information processing apparatus 100 may switch groups serving as starting points from which the job flow 500 is to be restarted, in accordance with a type of the abnormality.

With the information processing apparatus 100, the operator of the job flow 500 does not have to set, for each job, a job serving as a starting point from which the job flow 500 is to be restarted in response to an abnormal end of the job. Therefore, the information processing apparatus 100 may reduce a work load, a work time, and the like for the operator of the job flow 500.

After waiting for a specific operation input by the user of the information processing apparatus 100, the information processing apparatus 100 may restart the job flow 500. Therefore, before the job flow 500 is restarted, the information processing apparatus 100 may make it easy for the operator or the like of the job flow 500 to handle an abnormality that occurs in any one job.

Here, although the case where the information processing apparatus 100 restarts the job flow 500 after receiving the specific operation input by the operator of the job flow 500 is described, the embodiment is not limited thereto. For example, there may be a case where the information processing apparatus 100 restarts the job flow 500 without receiving a specific operation input by the operator of the job flow 500. In this case, the information processing apparatus 100 may not output information indicating one or more abnormally ended jobs and an end code of each abnormally ended job such that the operator of the job flow 500 may refer to the information.

Next, a specific example in which the information processing apparatus 100 adds a new job to a job group will be described with reference to FIGS. 23 to 26.

Figure 23:
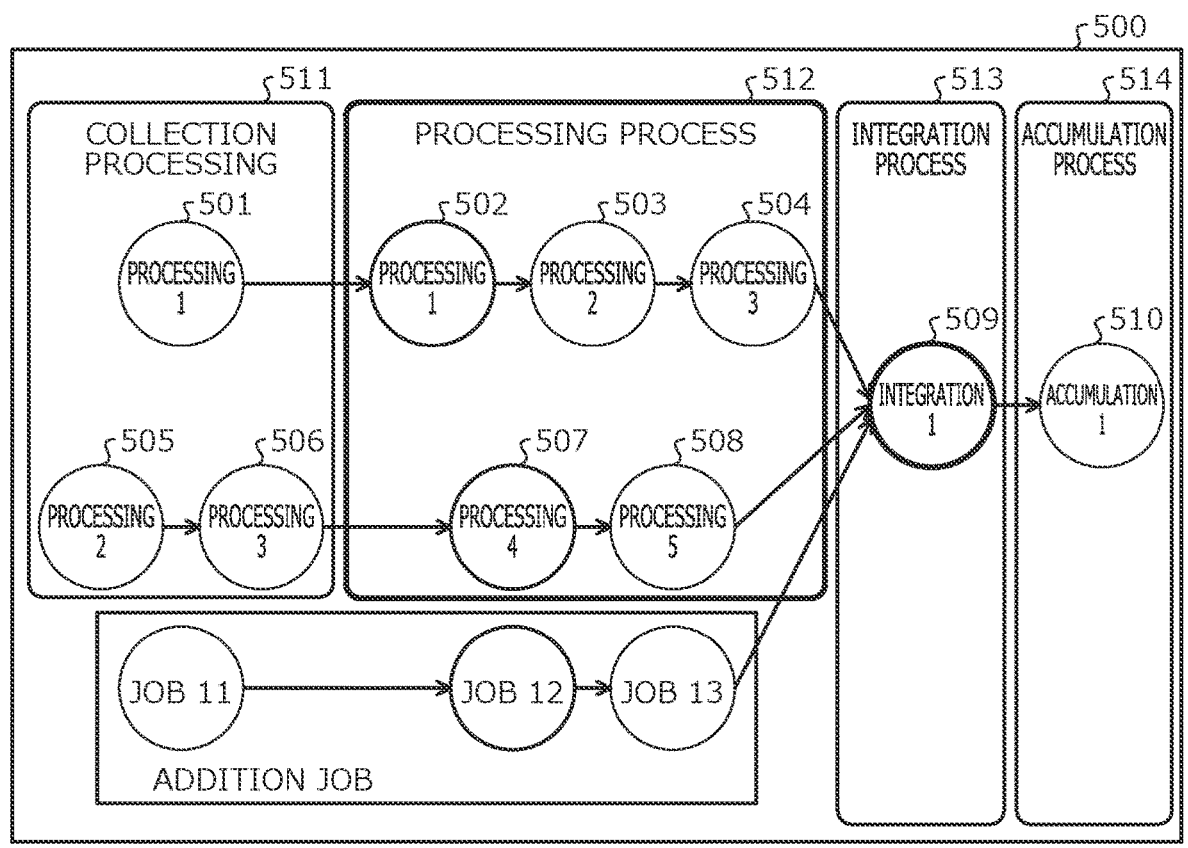
FIG. 23 is an explanatory diagram (part 1) illustrating a specific example in which a new job is added to a job group.

FIGS. 23 to 26 are explanatory diagrams illustrating a specific example in which a new job is added to a job group. In FIG. 23, it is assumed that the information processing apparatus 100 receives an addition request for requesting addition of a new job to a job group. For example, in the example illustrated in FIG. 23, it is assumed that the information processing apparatus 100 receives an addition request for requesting addition of jobs 11 to 13 to a job group, in accordance with addition of a data source from which data is collected. Next, description will be continued with reference to FIG. 24.

In FIG. 24, the information processing apparatus 100 stores, in the attribute information management table 700, a record in which a type field is empty, which corresponds to each addition job. For example, in the example illustrated in FIG. 24, the information processing apparatus 100 stores records 700-11 to 700-13 corresponding to the jobs 11 to 13 and having an empty type field in the attribute information management table 700.

In the same manner as FIG. 12, based on a processing content of each addition job of one or more addition jobs, the information processing apparatus 100 assigns a collection attribute, a processing attribute, an integration attribute, or an accumulation attribute to the addition job to update the attribute information management table 700.

For example, in the example illustrated in FIG. 24, the information processing apparatus 100 sets the collection attribute in a record 700-11 corresponding to the job 11, in the attribute information management table 700. The information processing apparatus 100 assigns an alias name of collection 4 to the job 11. For example, the information processing apparatus 100 sets the processing attribute in records corresponding to the jobs 12 and 13, in the attribute information management table 700. The information processing apparatus 100 assigns an alias name of processing 6 to the job 12. The information processing apparatus 100 assigns an alias name of processing 7 to the job 13. Next, description will be continued with reference to FIG. 25.

In FIG. 25, the information processing apparatus 100 specifies an existing job existing after the addition job and having an integration attribute. The information processing apparatus 100 searches for a preceding job existing before the specified existing job, finds one or more addition jobs having a processing attribute, and classifies the addition job into an existing group having the processing attribute.

For example, the information processing apparatus 100 classifies the one or more addition jobs having the processing attribute, which continuously exist before the specified existing job, into the existing group having the processing attribute. For example, the information processing apparatus 100 may classify the one or more addition jobs having the processing attribute, which continuously exist before the specified existing job via the one or more existing jobs having the processing attribute, into the existing group having the processing attribute.

The information processing apparatus 100 updates the group information management table 800 by setting a group ID for identifying a group into which the addition job is classified, in a record corresponding to the addition job having the processing attribute in the group information management table 800.

For example, in the example illustrated in FIG. 25, the information processing apparatus 100 specifies integration 1 existing after collection 4 and processing 6 and 7, which are addition jobs. For example, the information processing apparatus 100 classifies processing 6 and 7 continuously existing before integration 1 into the group 512 having the processing attribute. For example, the information processing apparatus 100 sets the group ID=group 2 for identifying the group 512 in records 800-12 and 800-13 corresponding to processing 6 and 7 in the group information management table 800.

Thus, the information processing apparatus 100 may classify the addition job having the processing attribute into the group. At a time of restarting the job flow 500, the information processing apparatus 100 may handle the addition job having the processing attribute together with the existing job having the processing attribute in group units. Next, description will be continued with reference to FIG. 26.

Figure 26:
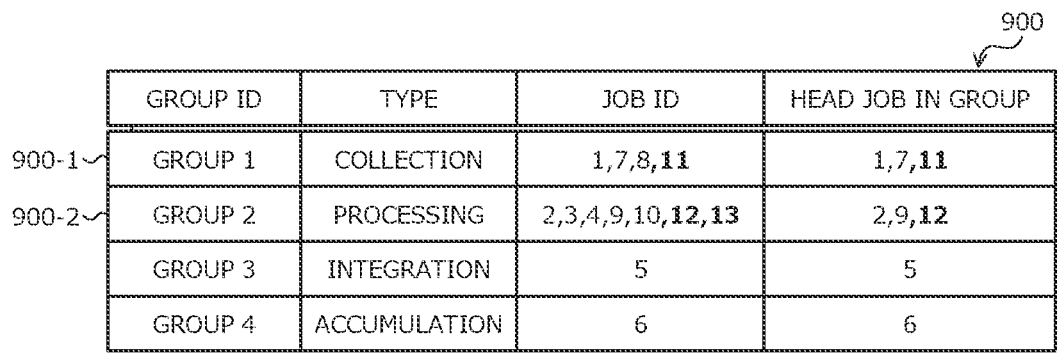
FIG. 26 is an explanatory diagram (part 4) illustrating the specific example in which the new job is added to the job group.

In FIG. 26, in accordance with the classification of processing 6 and 7 into the group 512 having the processing attribute, the information processing apparatus 100 specifies processing 6 as a new head job in the group 512 having the processing attribute. For example, the information processing apparatus 100 sets specified processing 6 in the record 900-2 corresponding to the group 512 having the processing attribute in the head information management table 900.

Thus, in a case where the group 512 is set as a starting point from which the job flow 500 is to be restarted, the information processing apparatus 100 may specify which job belonging to the group 512 is set as a specific starting point from which the job flow 500 is to be restarted. Description will be continued with reference to FIG. 25.

In FIG. 25, the information processing apparatus 100 specifies a group having the processing attribute, which exists before the specified existing job. For each specified group, the information processing apparatus 100 searches for a preceding job existing before each head job in the group, finds one or more addition jobs having a collection attribute, and classifies the addition job into an existing group having a collection attribute.

For example, the information processing apparatus 100 specifies each head job in one group having the processing attribute. For example, the information processing apparatus 100 classifies the one or more addition jobs having the collection attribute, which continuously exist before each specified head job, into the existing group having the collection attribute. For example, the information processing apparatus 100 may classify one or more addition jobs having the collection attribute, which continuously exist before each specified head job via one or more existing jobs having the collection attribute, into the existing group having the collection attribute.

The information processing apparatus 100 updates the group information management table 800 by setting a group ID for identifying a group into which the addition job is classified, in a record corresponding to the addition job having the collection attribute in the group information management table 800.

For example, in the example illustrated in FIG. 25, the information processing apparatus 100 refers to the head information management table 900 to specify processing 1, 4, and 6 that are the head jobs in the group 512. For example, the information processing apparatus 100 classifies collection 4 existing before specified processing 6 into the group 511 having the collection attribute. For example, the information processing apparatus 100 sets the group ID=group 1 for identifying the group 511 to a record 800-11 corresponding to collection 1, in the group information management table 800.

Thus, the information processing apparatus 100 may classify the addition job having the collection attribute into the group. At a time of restarting the job flow 500, the information processing apparatus 100 may handle the addition job having the collection attribute together with the existing job having the collection attribute in group units. Next, description will be continued with reference to FIG. 26.

In FIG. 26, in accordance with the classification of collection 4 into the group 511 having the collection attribute, the information processing apparatus 100 specifies collection 4 as a new head job in the group 511 having the collection attribute. For example, the information processing apparatus 100 sets specified collection 4 in the record 900-1 corresponding to the group 511 having the collection attribute in the head information management table 900.

Thus, in a case where the group 511 is set as a starting point from which the job flow 500 is to be restarted, the information processing apparatus 100 may specify which job belonging to the group 511 is set as a specific starting point from which the job flow 500 is to be restarted. In this manner, the information processing apparatus 100 may appropriately reflect information on the addition job in the various tables. Since the information processing apparatus 100 may reflect the information on the addition job in the various tables, it is possible to reduce a work load, a work time, and the like for the operator or the like of the job flow 500.

As in the operation example described above, when the information processing apparatus 100 acquires the job flow 500, it is possible to reduce the work load, the work time, and the like for the operator or the like of the job flow 500 in preparing various tables with which the job flow 500 may be restarted. For example, the various tables include the job flow management table 600, the attribute information management table 700, the group information management table 800, and the head information management table 900. When a new job is added to the job group, the information processing apparatus 100 updates the various tables with which the job flow 500 may be appropriately restarted, and thus it is possible to reduce the work load, the work time, and the like for the operator or the like of the job flow 500.

For example, in the related art, there is a tendency that an attribute of each job of a job group is not specified in the job flow 500. For example, it is difficult to assign a collection attribute to a job in which data is collected from a file other than an input file in the related art. For example, it the related art, it is difficult to assign an attribute to a job for integrating a plurality of pieces of data, a job for storing data in a DB, and the like. Therefore, in the related art, it is difficult to handle a job in group units in accordance with an attribute of the job.

By contrast, the information processing apparatus 100 may automatically specify an attribute of each job, based on a processing content of each job. The information processing apparatus 100 may collect one or more jobs that have the same attribute and are determined to be collectively handled as a starting point from which the job flow 500 is to be restarted into one group. Therefore, the information processing apparatus 100 may enable the operator of the job flow 500 to set a starting point from which the job flow 500 is to be restarted in group units, and may reduce the work load, the work time, and the like for the operator of the job flow 500.

(Application Example of Information Processing Apparatus 100)

Next, an application example of the information processing apparatus 100 will be described. For example, in the data use field, the information processing apparatus 100 may be applied to a job flow of a large-scale system that collects, processes, and integrates data of several tens of business systems or more.

Thus, the information processing apparatus 100 may flexibly restart the job flow of the large-scale system. Therefore, the information processing apparatus 100 may improve a restoration speed of the large-scale system at a time of an abnormality, improve stability of the large-scale system, or reduce an operation cost of the large-scale system.

The information processing apparatus 100 may enable an operator of a job flow or the like who manages the large-scale system to handle jobs in group units. Accordingly, with the information processing apparatus 100, the operator or the like of the job flow may not have to set the job that is a starting point from which the job flow is to be restarted, for all the jobs that implement the large-scale system. Therefore, the information processing apparatus 100 may reduce a work load and a work time for the operator of the job flow. The information processing apparatus 100 may easily reduce a work error or the like when the large-scale system is managed by the operator of a job flow or the like.

When a new job is added to the job group by an update of the large-scale system, the information processing apparatus 100 may appropriately update various tables for the job. For example, the various tables include the job flow management table 600, the attribute information management table 700, the group information management table 800, and the head information management table 900. In the same manner, when deleting an existing job from the job group, the information processing apparatus 100 may appropriately update the various tables.

Thus, with the information processing apparatus 100, the operator or the like of the job flow does not have to update the various tables at a time of updating the large-scale system, and the work load and the work time for the operator or the like of the job flow may be reduced. Therefore, the information processing apparatus 100 may easily reduce a work error or the like when the operator or the like of the job flow manages the various tables.

(Determination Processing Procedure)

Next, an example of a determination processing procedure to be executed by the information processing apparatus 100 is described with reference to FIG. 27. The determination processing is implemented by, for example, the CPU 301, a storage region such as the memory 302 or the recording medium 305, and the network I/F 303 illustrated in FIG. 3.

Figure 27:
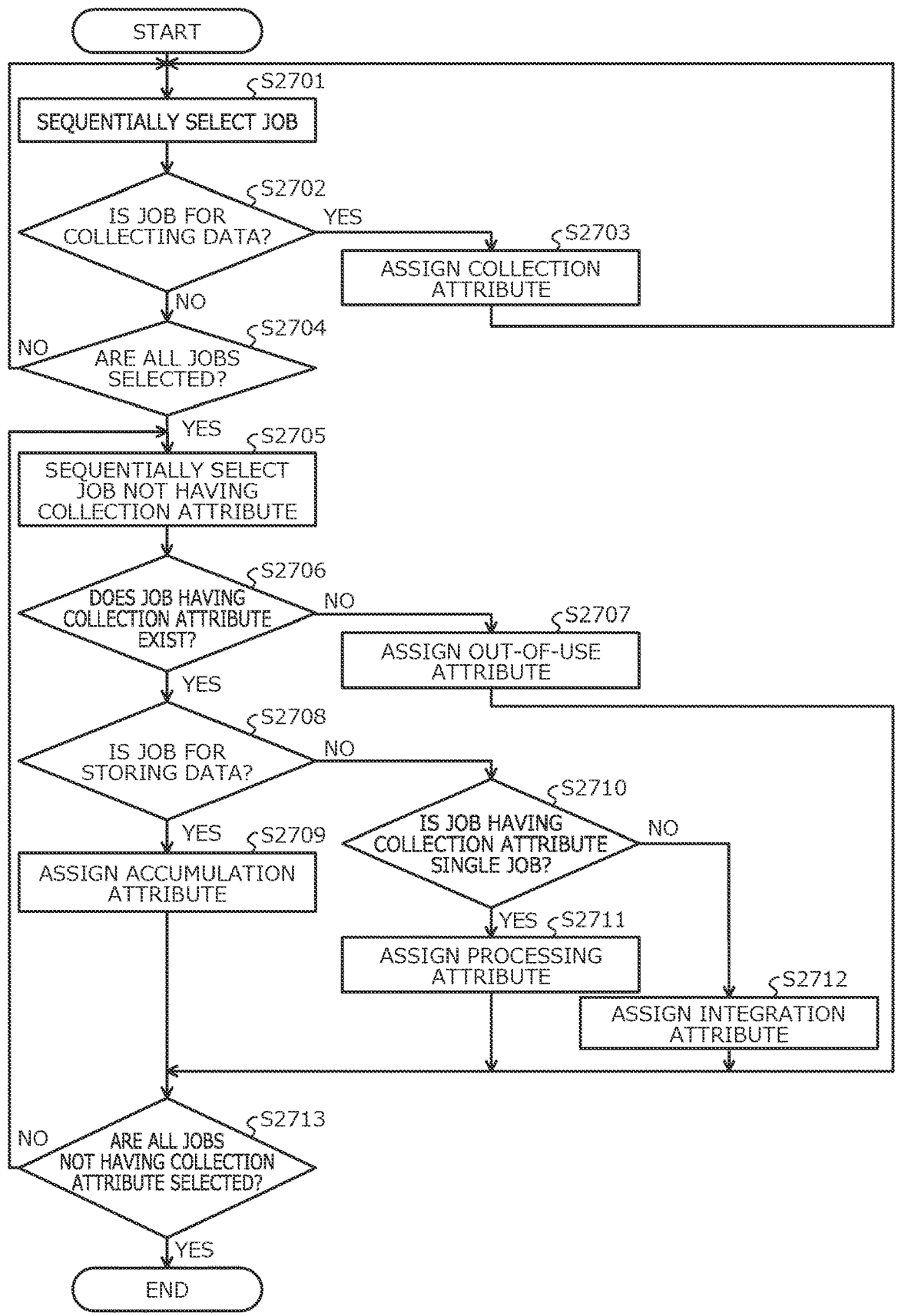
FIG. 27 is a flowchart illustrating an example of a determination processing procedure.

FIG. 27 is a flowchart illustrating the example of the determination processing procedure. In FIG. 27, the information processing apparatus 100 sequentially selects a job included in a job group (step S2701).

Next, based on a processing content of the selected job, the information processing apparatus 100 determines whether or not the selected job is a job for collecting data from a data source (step S2702). In a case where the job is not a job for data collection (No in step S2702), the information processing apparatus 100 proceeds to processing in step S2704. On the other hand, in a case where the job is a job for data collection (Yes in step S2702), the information processing apparatus 100 proceeds to processing in step S2703.

At step S2703, the information processing apparatus 100 assigns a collection attribute to the selected job, and updates the attribute information management table 700 (step S2703). The information processing apparatus 100 returns to the processing in step S2701.

At step S2704, the information processing apparatus 100 determines whether or not all the jobs are selected (step S2704). In a case where an unselected job exists (No in step S2704), the information processing apparatus 100 returns to the processing in step S2701. On the other hand, in a case where all the jobs are selected (Yes in step S2704), the information processing apparatus 100 proceeds to processing in step S2705.

At step S2705, the information processing apparatus 100 sequentially selects a job not having the collection attribute, which is included in the job group (step S2705).

Next, the information processing apparatus 100 determines whether or not a job having the collection attribute, which is preceding the selected job, exists (step S2706). In a case where there is no job having the collection attribute (No in step S2706), the information processing apparatus 100 proceeds to processing in step S2707. On the other hand, in a case where the job having the collection attribute exists (Yes in step S2706), the information processing apparatus 100 proceeds to processing in step S2708.

At step S2707, the information processing apparatus 100 assigns an out-of-use attribute to the selected job, and updates the attribute information management table 700 (step S2707). The information processing apparatus 100 proceeds to processing in step S2713.

At step S2708, the information processing apparatus 100 determines whether or not the selected job is a job for storing data by accessing a DB (step S2708). In a case where the job is a job for storing data (Yes in step S2708), the information processing apparatus 100 proceeds to processing in step S2709. On the other hand, in a case where the job is not a job for storing data (No in step S2708), the information processing apparatus 100 proceeds to processing in step S2710.

At step S2709, the information processing apparatus 100 assigns an accumulation attribute to the selected job, and updates the attribute information management table 700 (step S2709). The information processing apparatus 100 proceeds to the processing in step S2713.

At step S2710, the information processing apparatus 100 determines whether or not the job having the collection attribute, which is preceding the selected job, is a single job (step S2710). In a case where the job is a single job (Yes in step S2710), the information processing apparatus 100 proceeds to processing in step S2711. On the other hand, in a case where the job is not a single job and there are a plurality of jobs (No in step S2710), the information processing apparatus 100 proceeds to processing in step S2712.

At step S2711, the information processing apparatus 100 assigns a processing attribute to the selected job, and updates the attribute information management table 700 (step S2711). The information processing apparatus 100 proceeds to the processing in step S2713.

At step S2712, the information processing apparatus 100 assigns an integration attribute to the selected job, and updates the attribute information management table 700 (step S2712). The information processing apparatus 100 proceeds to the processing in step S2713.

At step S2713, the information processing apparatus 100 determines whether or not all jobs not having the collection attribute, which are included in the job group, are selected (step S2713). In a case where an unselected job exists (No in step S2713), the information processing apparatus 100 returns to the processing in step S2705. On the other hand, in a case where all the jobs are selected (Yes in step S2713), the information processing apparatus 100 ends the determination processing.

(Overall Classification Processing Procedure)

Next, an example of an overall classification processing procedure executed by the information processing apparatus 100 will be described by using FIG. 28. The overall classification processing is implemented by, for example, the CPU 301 illustrated in FIG. 3, a storage region such as the memory 302 or the recording medium 305, and the network I/F 303.

Figure 28:
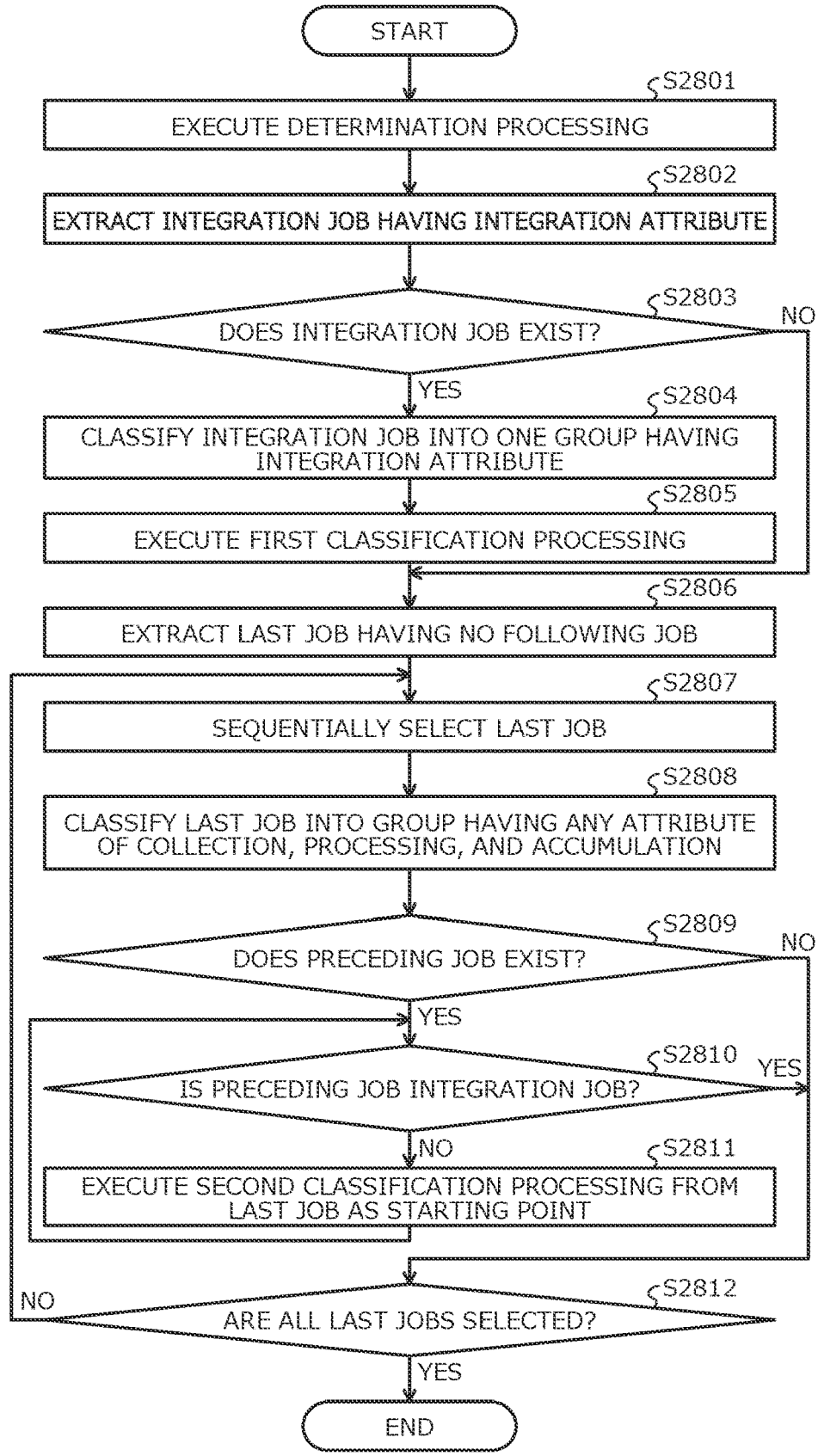
FIG. 28 is a flowchart illustrating an example of an overall classification processing procedure.

FIG. 28 is a flowchart illustrating the example of the overall classification processing procedure. In FIG. 28, the information processing apparatus 100 executes the determination processing illustrated in FIG. 27 (step S2801). The information processing apparatus 100 extracts an integration job having an integration attribute from the job group (step S2802).

Next, the information processing apparatus 100 determines whether or not an integration job exists (step S2803). In a case where there is no integration job (No in step S2803), the information processing apparatus 100 proceeds to processing in step S2806. On the other hand, in a case where an integration job exists (Yes in step S2803), the information processing apparatus 100 proceeds to processing in step S2804.

In step S2804, for each extracted integration job, the information processing apparatus 100 classifies the extracted integration job into one group having the integration attribute, and updates the group information management table 800 (step S2804).

Next, the information processing apparatus 100 executes first classification processing, which will be described in FIG. 29, classifies a preceding job existing before the integration job into one or more groups, and updates the group information management table 800 (step S2805). The information processing apparatus 100 proceeds to processing in step S2806.

At step S2806, the information processing apparatus 100 extracts the last job having no following job from the job group (step S2806).

Next, the information processing apparatus 100 sequentially selects the extracted last job (step S2807). The information processing apparatus 100 classifies the selected last job into a group having any one of a collection attribute, a processing attribute, or an accumulation attribute, and updates the group information management table 800 (step S2808).

Next, the information processing apparatus 100 determines whether or not the classified last job has a preceding job (step S2809). In a case where there is no preceding job (No in step S2809), the information processing apparatus 100 proceeds to processing in step S2812. On the other hand, in a case there the classified job has a preceding job (Yes in step S2809), the information processing apparatus 100 proceeds to the processing in step S2810.

At step S2810, the information processing apparatus 100 determines whether or not the preceding job to the classified last job is an integration job (step S2810). In a case where the job is an integration job (Yes in step S2810), the information processing apparatus 100 proceeds to the processing in step S2812. On the other hand, in a case where the job is not an integration job (No in step S2810), the information processing apparatus 100 proceeds to processing in step S2811.

At step S2811, the information processing apparatus 100 executes second classification processing, which will be described below with reference to FIG. 30, from the classified last job as a starting point (step S2811). By executing the second classification processing, which will be described below in FIG. 30, the information processing apparatus 100 classifies the preceding job existing before the classified last job into the one or more groups, and updates the group information management table 800. The information processing apparatus 100 returns to the processing in step S2810.

At step S2812, the information processing apparatus 100 determines whether or not all the classified last jobs are selected (step S2812). In a case where an unselected last job exists (No in step S2812), the information processing apparatus 100 returns to the processing in step S2807. On the other hand, in a case where all the classified last jobs are selected (Yes in step S2812), the information processing apparatus 100 ends the overall classification processing.

(First Classification Processing Procedure)

Next, an example of a first classification processing procedure executed by the information processing apparatus 100 will be described with reference to FIG. 29. The first classification processing is implemented by, for example, the CPU 301 illustrated in FIG. 3, a storage region such as the memory 302 or the recording medium 305, and the network I/F 303.

Figure 29:
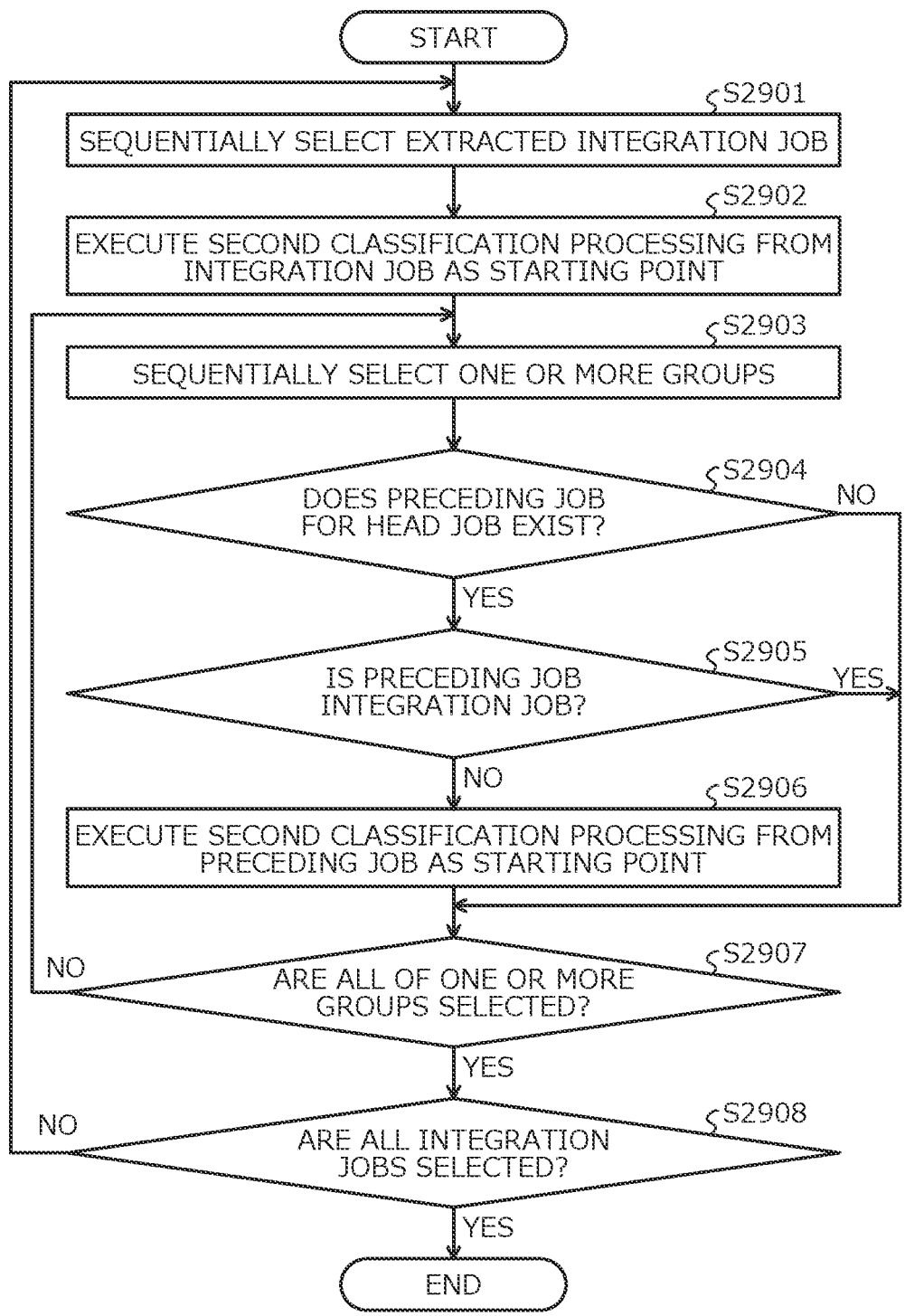
FIG. 29 is a flowchart illustrating an example of a first classification processing procedure.

FIG. 29 is a flowchart illustrating the example of the first classification processing procedure. In FIG. 29, the information processing apparatus 100 sequentially selects an extracted integration job (step S2901).

Next, based on the selected integration job as a starting point, the information processing apparatus 100 executes the second classification processing, which will be described with reference to FIG. 30, classifies a preceding job existing before the selected integration job into one or more groups, and updates the group information management table 800 (step S2902).

The information processing apparatus 100 sequentially selects the one or more groups into which the job is classified (step S2903).

Next, the information processing apparatus 100 determines whether or not a head job in the selected group has a preceding job (step S2904). In a case where there is no preceding job (No in step S2904), the information processing apparatus 100 proceeds to processing in step S2907. On the other hand, in a case where the head job has a preceding job (Yes in step S2904), the information processing apparatus 100 proceeds to processing in step S2905.

At step S2905, the information processing apparatus 100 determines whether or not the preceding job to the head job in the selected group is an integration job (step S2905). In a case where the job is an integration job (Yes in step S2905), the information processing apparatus 100 proceeds to the processing in step S2907. On the other hand, in a case where the job is not an integration job (No in step S2905), the information processing apparatus 100 proceeds to processing in step S2906.

At step S2906, the information processing apparatus 100 executes the second classification processing, which will be described below with reference to FIG. 30, from the preceding job to the head job in the selected group as a starting point (step S2906). By executing the second classification processing, which will be described below in FIG. 30, the information processing apparatus 100 classifies the preceding job existing before the head job into the one or more groups, and updates the group information management table 800. The information processing apparatus 100 proceeds to the processing in step S2907.

At step S2907, the information processing apparatus 100 determines whether or not all of the one or more groups into which the job is classified are selected (step S2907). In a case where an unselected group exists (No in step S2907), the information processing apparatus 100 returns to the processing in step S2903. On the other hand, in a case where all the one or more groups are selected (Yes in step S2907), the information processing apparatus 100 proceeds to the processing in step S2908.

At step S2908, the information processing apparatus 100 determines whether or not all the extracted integration jobs are selected (step S2908). In a case where an unselected integration job exists (No in step S2908), the information processing apparatus 100 returns to the processing in step S2901. On the other hand, in a case where all the extracted integration jobs are selected (Yes in step S2908), the information processing apparatus 100 ends the first classification processing.

(Second Classification Processing Procedure)

Next, an example of a second classification processing procedure executed by the information processing apparatus 100 will be described with reference to FIG. 30. The second classification processing is implemented by, for example, the CPU 301 illustrated in FIG. 3, a storage region such as the memory 302 or the recording medium 305, and the network I/F 303.

Figure 30:
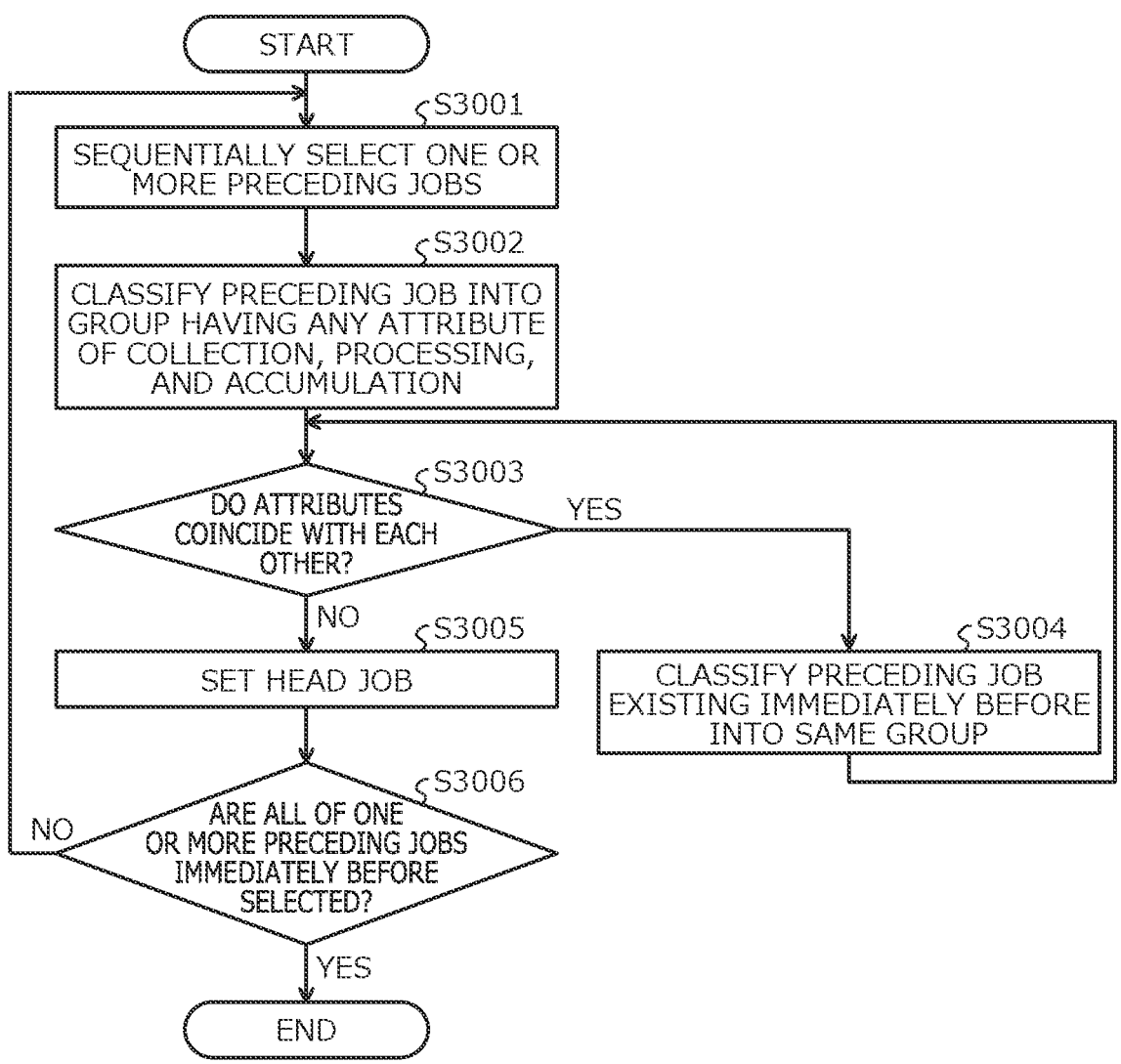
FIG. 30 is a flowchart illustrating an example of a second classification processing procedure.

FIG. 30 is a flowchart illustrating the example of the second classification processing procedure. In FIG. 30, the information processing apparatus 100 sequentially selects one or more preceding jobs immediately before a job set as a starting point (step S3001). The information processing apparatus 100 classifies the selected preceding job into a group having any one of a collection attribute, a processing attribute, or an accumulation attribute, and updates the group information management table 800 (step S3002).

Next, the information processing apparatus 100 determines whether or not the attribute of the preceding job which is classified immediately before coincides with an attribute of a preceding job existing immediately before the preceding job which is classified immediately before (step S3003). In a case where the attributes coincide with each other (Yes in step S3003), the information processing apparatus 100 proceeds to processing in step S3004. In a case where the attributes do not coincide with each other (No in step S3003), the information processing apparatus 100 proceeds to processing in step S3005.

At step S3004, the information processing apparatus 100 classifies the preceding job existing immediately before the preceding job which is classified immediately before into the same group, and updates the group information management table 800 (step S3004). The information processing apparatus 100 returns to the processing in step S3003.

At step S3005, the information processing apparatus 100 sets a head job in the group into which the selected preceding job is classified, and updates the head information management table 900 (step S3005). For example, in the group into which the selected preceding job is classified, the information processing apparatus 100 sets a job having an attribute that does not coincide with the attribute of the preceding job existing immediately before and a job having no preceding job, as a head job in the group.

Next, the information processing apparatus 100 determines whether or not all of one or more preceding jobs immediately before the job set as the starting point are selected (step S3006). In a case where an unselected preceding job exists (No in step S3006), the information processing apparatus 100 returns to the processing in step S3001. On the other hand, in a case where all the one or more preceding jobs are selected (Yes in step S3006), the information processing apparatus 100 ends the second classification processing.

(Restart Processing Procedure)

Next, an example of a restart processing procedure executed by the information processing apparatus 100 will be described with reference to FIG. 31. The restart processing is implemented by, for example, the CPU 301, a storage region such as the memory 302 or the recording medium 305, and the network I/F 303 illustrated in FIG. 3.

Figure 31:
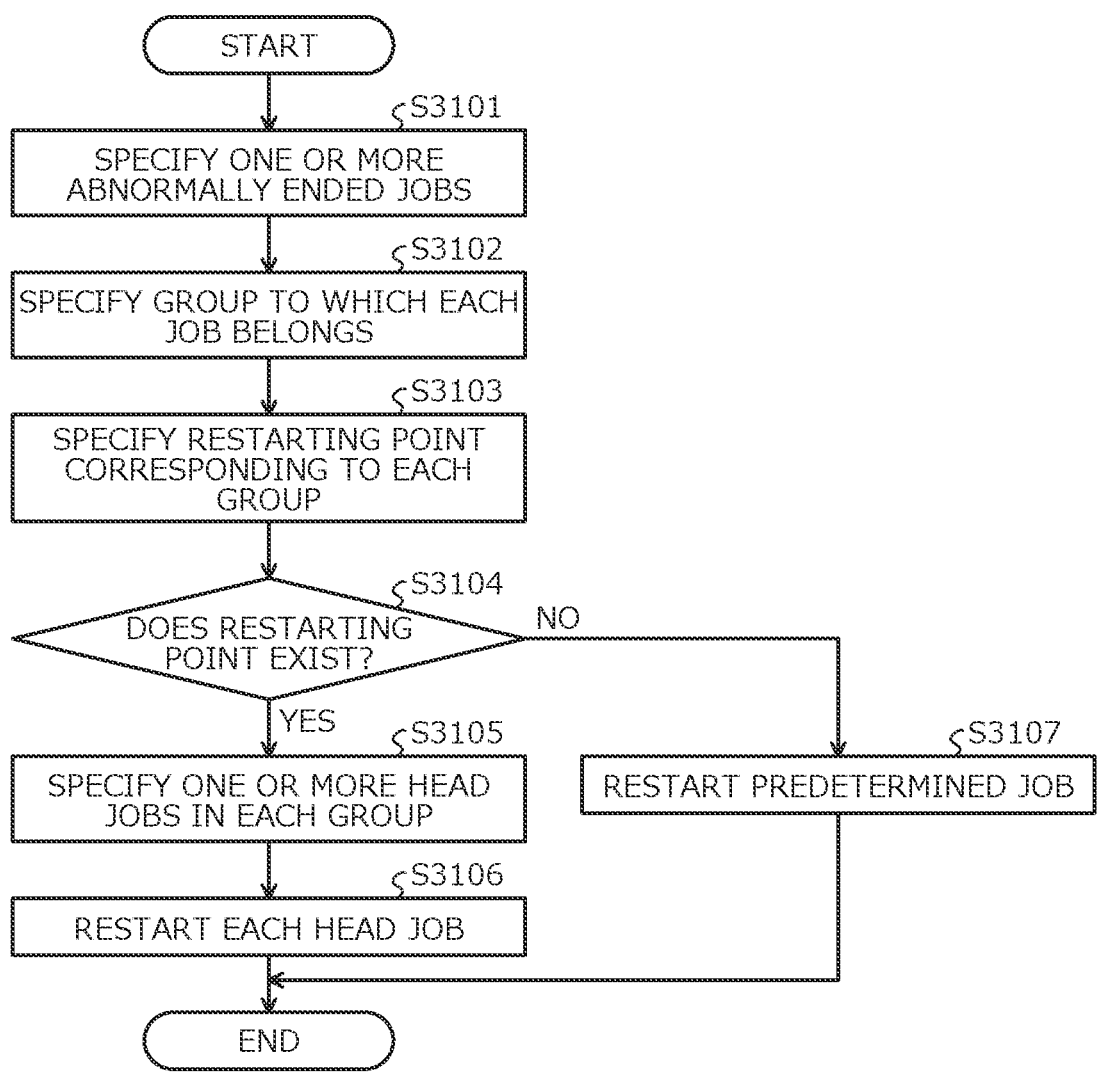
FIG. 31 is a flowchart illustrating an example of a restart processing procedure.

FIG. 31 is a flowchart illustrating the example of the restart processing procedure. In FIG. 31, the information processing apparatus 100 refers to the execution history management table 1100 to specify one or more jobs which are abnormally ended (step S3101).

Next, the information processing apparatus 100 refers to the group information management table 800 to specify a group to which each job of one or more specified abnormally ended jobs belongs (step S3102). By referring to the restart information management table 1000, the information processing apparatus 100 specifies a restarting point corresponding to each specified group (step S3103).

Next, the information processing apparatus 100 determines whether or not a restarting point exists (step S3104). In a case where there is no restarting point (No in step S3104), the information processing apparatus 100 proceeds to processing in step S3107. On the other hand, in a case where a restarting point exists (Yes in step S3104), the information processing apparatus 100 proceeds to the processing in step S3105.

At step S3105, the information processing apparatus 100 refers to the group information management table 800 to specify one or more head jobs in each specified group (step S3105).

Next, the information processing apparatus 100 restarts each head job of the one or more specified head jobs to restart the entire job flow (step S3106). The information processing apparatus 100 ends the restart processing.

At step S3107, the information processing apparatus 100 restarts a predetermined job corresponding to the one or more abnormally ended jobs to restart the entire job flow (step S3107). The information processing apparatus 100 ends the restart processing.

(Addition Processing Procedure)

Next, an example of an addition processing procedure executed by the information processing apparatus 100 will be described with reference to FIG. 32. The addition processing is implemented by, for example, the CPU 301, a storage region such as the memory 302 or the recording medium 305, and the network I/F 303 illustrated in FIG. 3.

Figure 32:
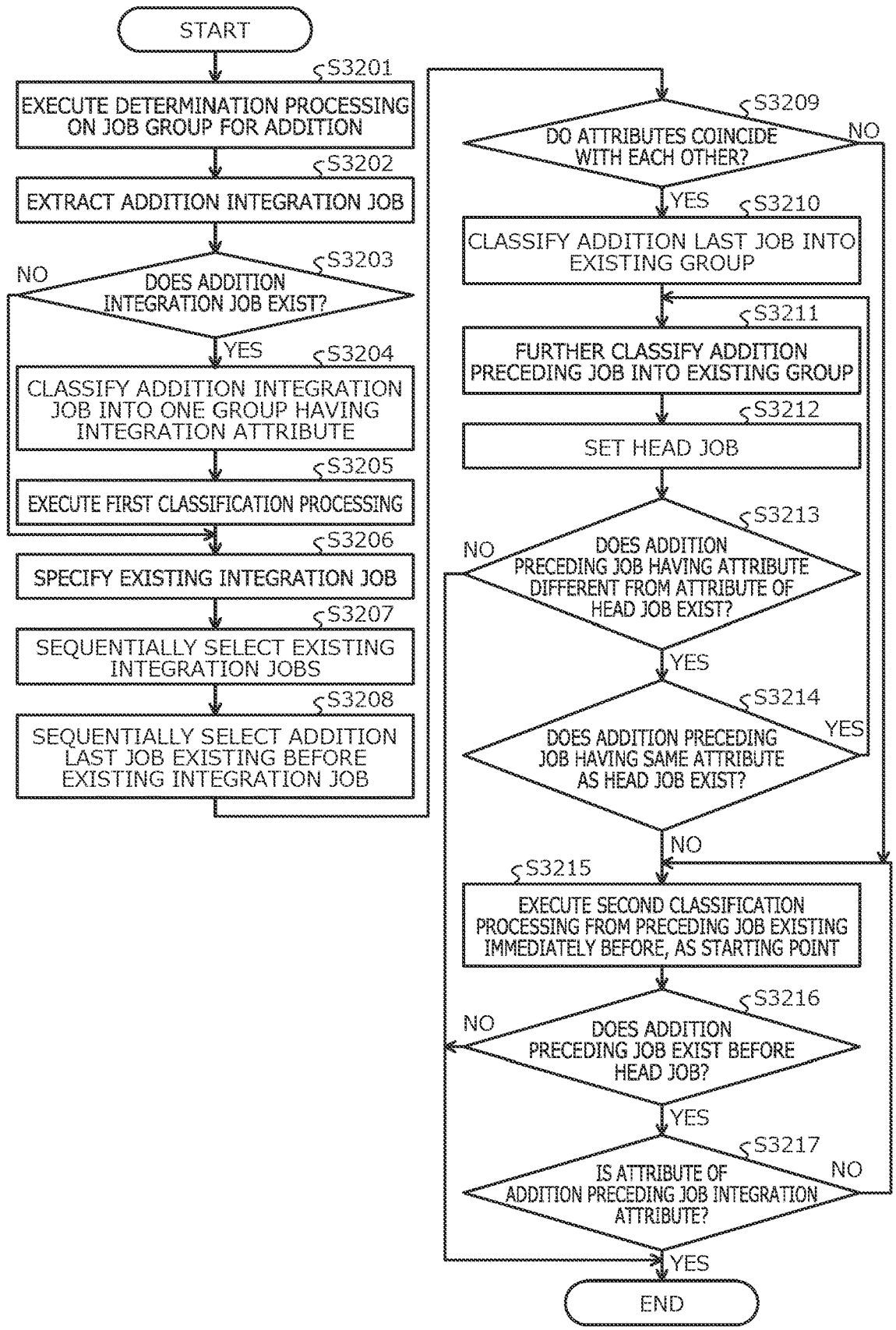
FIG. 32 is a flowchart illustrating an example of an addition processing procedure.

FIG. 32 is a flowchart illustrating the example of the addition processing procedure. In FIG. 32, the information processing apparatus 100 executes the determination processing illustrated in FIG. 17 on a job group for addition (step S3201). By executing the determination processing illustrated in FIG. 17, the information processing apparatus 100 assigns any one attribute of a collection attribute, a processing attribute, an integration attribute, an accumulation attribute, and an out-of-use attribute to each addition job to the job group for addition.

Next, the information processing apparatus 100 extracts an addition integration job having an integration attribute from the job group for addition (step S3202).

The information processing apparatus 100 determines whether or not an addition integration job exists in the job group for addition (step S3203). In a case where there is no addition integration job (No in step S3203), the information processing apparatus 100 proceeds to processing in step S3206. On the other hand, in a case where an addition integration job exists (Yes in step S3203), the information processing apparatus 100 proceeds to processing in step S3204.

For each extracted addition integration job in step S3204, the information processing apparatus 100 classifies the extracted addition integration job into one group having the integration attribute, and updates the group information management table 800 (step S3204).

Next, the information processing apparatus 100 executes the first classification processing illustrated in FIG. 19, classifies, into one or more groups, an addition preceding job existing before the extracted addition integration job in the job group for addition, and updates the group information management table 800 (step S3205). The information processing apparatus 100 proceeds to the processing in step S3206.

At step S3206, the information processing apparatus 100 specifies an existing integration job existing after at least one addition last job in the job group for addition (step S3206).

Next, the information processing apparatus 100 sequentially selects the specified existing integration job (step S3207). The information processing apparatus 100 sequentially selects an addition last job existing before the selected existing integration job, from one or more addition last jobs in the job group for addition (step S3208).

Next, the information processing apparatus 100 determines whether or not an attribute of the selected addition last job coincides with an attribute of an existing job immediately following the selected addition last job (step S3209). In a case where the attributes do not coincide with each other (No in step S3209), the information processing apparatus 100 proceeds to the processing in step S3215. On the other hand, in a case where the attributes coincide with each other (Yes in step S3209), the information processing apparatus 100 proceeds to processing in step S3210.

At step S3210, the information processing apparatus 100 classifies the selected addition last job into an existing group to which the existing job belongs (step S3210).

Next, when a preceding addition job having the same attribute as the attribute of the addition job exists immediately before the addition job classified into the existing group immediately before, the information processing apparatus 100 further classifies the addition preceding job into the existing group (step S3211).

The information processing apparatus 100 sets a head job in the existing group, and updates the head information management table 900 (step S3212). For example, in the existing group, the information processing apparatus 100 sets a job having an attribute that does not coincide with the attribute of the preceding job existing immediately before and a job having no preceding job, as a head job in the group.

Next, the information processing apparatus 100 determines whether or not an addition preceding job having an attribute different from the attribute of the head job exists after the addition integration job and before the set head job, in the job group for addition (step S3213). In a case where there is no addition preceding job (No in step S3213), the information processing apparatus 100 ends the addition processing. On the other hand, in a case where an addition preceding job exists (Yes in step S3213), the information processing apparatus 100 proceeds to processing in step S3214.

The information processing apparatus 100 determines whether or not an addition preceding job having the same attribute as the attribute of the head job exists after the addition integration job and immediately before the set head job, in the job group for addition (step S3214). In a case where there is no addition preceding job (No in step S3214), the information processing apparatus 100 proceeds to processing in step S3215. On the other hand, in a case where an addition preceding job exists (Yes in step S3214), the information processing apparatus 100 returns to processing in step S3211.

At step S3215, the information processing apparatus 100 executes the second classification processing illustrated in FIG. 20, from the preceding job existing immediately before each head job set immediately before as a starting point (step S3215). By executing the second classification processing illustrated in FIG. 20, the information processing apparatus 100 classifies the preceding job existing before the head job into the one or more groups, and updates the group information management table 800.

At step S3216, the information processing apparatus 100 determines whether or not an addition preceding job exists before the head job in any group classified immediately before (step S3216). In a case where there is no addition preceding job (No in step S3216), the information processing apparatus 100 ends the addition processing. On the other hand, in a case where an addition preceding job exists (Yes in step S3216), the information processing apparatus 100 proceeds to processing in step S3217.

At step S3217, the information processing apparatus 100 determines whether or not an attribute of the addition preceding job before the head job in any group classified immediately before is an integration attribute (step S3217). In a case where the attribute is not the integration attribute (No in step S3217), the information processing apparatus 100 returns to the processing in Step S3215. On the other hand, in a case where the attribute is the integration attribute (Yes in step S3217), the information processing apparatus 100 ends the addition processing.

The information processing apparatus 100 may execute the processing in each of the flowcharts illustrated in FIGS. 27 to 32 while interchanging the processing order of some steps. The information processing apparatus 100 may omit the processing of some steps in each of the flowcharts illustrated in FIGS. 27 to 32.

As described above, with the information processing apparatus 100, it is possible to classify a job group into a plurality of groups, based on a processing content of each job of the job group having an execution order defined in a job flow. With the information processing apparatus 100, it is possible to store, in the storage unit 400, information indicating a head job in a group serving as a starting point from which the job flow is to be restarted among the plurality of groups, in association with at least one group of the plurality of groups. With the information processing apparatus 100, in a case where an abnormality of a first job classified into a first group is detected, it is possible to specify a head job in a second group serving as a starting point from which the job flow is to be restarted, which is associated with the first group, by referring to the storage unit 400. With the information processing apparatus 100, it is possible to restart the job flow from the specified head job as a starting point. Thus, when the job flow is restarted, the information processing apparatus 100 may handle the job group in group units. Therefore, the information processing apparatus 100 may make it easy to set a starting point from which the job flow is to be restarted, and may reduce a work load, a work time, and the like for an operator or the like of the job flow when setting the starting point from which the job flow is to be restarted.

With the information processing apparatus 100, it is possible to add a third job preceding a second job classified into the second group of the plurality of groups to the job group, in response to reception of a request to add the third job to the job group. With the information processing apparatus 100, it is possible to classify the third job into a third group of the plurality of groups, based on a processing content of the third job. With the information processing apparatus 100, in a case where the third job is a head job in the third group, it is possible to update information indicating the head job in the third group, which is stored in the storage unit 400. Thus, the information processing apparatus 100 may add a new job to the job group, and may appropriately reflect the addition of the new job to the job group in the storage unit 400. With the information processing apparatus 100, when the new job is added to the job group, it is possible to reduce a work load and a work time for the operator or the like of the job flow.

With the information processing apparatus 100, it is possible to delete a fourth job classified into a fourth group of the plurality of groups from the job group, in response to reception of a request to delete the fourth job from the job group. With the information processing apparatus 100, in a case where the fourth job is a head job in the fourth group, it is possible to update information indicating the head job in the fourth group, which is stored in the storage unit 400. Thus, the information processing apparatus 100 may delete an existing job from the job group, and may appropriately reflect the deletion of the existing job from the job group in the storage unit 400. With the information processing apparatus 100, when the existing job is deleted from the job group, it is possible to reduce the work load and the work time for the operator or the like of the job flow.

With the information processing apparatus 100, it is possible to store, in the storage unit 400, a condition for restarting the job flow and information indicating a head job in a group serving as a starting point from which the job flow is restarted, in association with at least one group of the plurality of groups. With the information processing apparatus 100, it is possible to determine whether or not the detected abnormality of the first job satisfies the condition for restarting the job flow, which is associated with the first group. With the information processing apparatus 100, in a case where it is determined that the condition is satisfied, it is possible to specify a head job in the second group as a starting point from which the job flow is to be restarted, which is associated with the first group, by referring to the storage unit 400. With the information processing apparatus 100, it is possible to restart the job flow from the specified head job as a starting point. Thus, the information processing apparatus 100 may easily switch the groups serving as the starting points from which the job flow is to be restarted, in accordance with the condition.

With the information processing apparatus 100, in a case where it is determined that a fifth job included in the job group is a collection job based on a processing content of the fifth job, it is possible to classify the fifth job into a collection group. Thus, the information processing apparatus 100 may appropriately classify the collection job into the group.

With the information processing apparatus 100, in a case where it is determined that a sixth job included in the job group is a processing job based on a processing content of the sixth job, it is possible to classify the sixth job into a processing group. Thus, the information processing apparatus 100 may appropriately classify the processing job into the group.

With the information processing apparatus 100, in a case where it is determined that a seventh job included in the job group is an integration job based on a processing content of the seventh job, it is possible to classify the seventh job into an integration group. Thus, the information processing apparatus 100 may appropriately classify the integration job into the group.

With the information processing apparatus 100, in a case where it is determined that an eighth job included in the job group is an accumulation job based on a processing content of the eighth job, it is possible to classify the eighth job into an accumulation group. Thus, the information processing apparatus 100 may appropriately classify the accumulation job into the group.

The information processing method described in the present embodiment may be implemented by causing a computer, such as a PC or a workstation, to execute a program prepared in advance. The information processing program described in the present embodiment is recorded on a computer-readable recording medium and is read from the recording medium to be executed by the computer. The recording medium is a hard disk, a flexible disk, a compact disc (CD)-ROM, a magneto optical (MO) disc, a Digital Versatile Disc (DVD), or the like. The information processing program described in the present embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program causing a computer to execute a process comprising:

assigning an attribute including a collection, a processing, an integration and an accumulation to each of jobs in a job group which has an execution order defined in a job flow, based on a processing content of each of the jobs;

classifying, based on the attribute of each of the jobs, the jobs into a plurality of groups; and restarting, in a case where an abnormality of a first job classified into a first group of the plurality of groups is detected, by referring to a memory that stores, in association with at least one group of the plurality of groups, information which indicates a job in a head execution order in a group as a starting point from which the job flow is to be restarted among the plurality of groups, based on information which indicates a job in a head execution order in a second group as a starting point from which the job flow is to be restarted, and is associated with the first group, the job flow from the job in the head execution order in the second group as the starting point, wherein the information processing program causes the computer to execute a process of adding, in response to reception of a request to add a third job which precedes a second job classified into the second group of the plurality of groups to the job group, the third job to the job group;

classifying the third job into a third group of the plurality of groups based on a processing content of the third job; and updating, in a case where the third job is a job in a head execution order in the third group, information which indicates the job in the head execution order in the third group, and is stored in the memory, wherein the plurality of groups include a collection group including one or more jobs with the attribute of the collection and into which a collection job for collecting data from a data source is classified, and in the classifying, in a case where it is determined that a fifth job included in the job group is the collection job based on a processing content of the fifth job, the fifth job is classified into the collection group, wherein the plurality of groups include a processing group including one or more jobs with the attribute of the processing into which a processing job for acquiring and processing data which indicates a processing result from a single job is classified and in the classifying, in a case where it is determined that a sixth job included in the job group is the processing job based on a processing content of the sixth job, the sixth job is classified into the processing group, wherein the plurality of groups include an integration group including one or more jobs with the attribute of the integration into which an integration job for acquiring and integrating data which indicates processing results from a plurality of jobs is classified, and in the classifying, in a case where it is determined that a seventh job included in the job group is the integration job based on a processing content of the seventh job, the seventh job is classified into the integration group, wherein the plurality of groups include an accumulation group including one or more jobs with the attribute of the accumulation into which an accumulation job for acquiring data and storing the data in a database is classified, and in the classifying, in a case where it is determined that an eighth job included in the job group is the accumulation job based on a processing content of the eighth job, the eighth job is classified into the accumulation group.

2. The non-transitory computer-readable recording medium according to claim 1, wherein the information processing program causes the computer to execute a process of deleting, in response to reception of a request to delete a fourth job classified into a fourth group of the plurality of groups from the job group, the fourth job from the job group; and updating, in a case where the fourth job is a job in a head execution order in the fourth group, information which indicates the job in the head execution order in the fourth group, and is stored in the memory.

3. The non-transitory computer-readable recording medium according to claim 1, wherein the memory stores, in association with at least one group of the plurality of groups, a condition for restarting the job flow and the information which indicates the job in the head execution order in the group as the starting point from which the job flow is to be restarted, among the plurality of groups, the information processing program causing the computer to execute the process further comprises:

determining whether or not the detected abnormality of the first job satisfies a condition for restarting the job flow, which is associated with the first group, and in the restarting, in a case where it is determined that the detected abnormality of the first job satisfies the condition for restarting the job flow, which is associated with the first group, by referring to the memory, based on the information which indicates the job in the head execution order in the second group as the starting point from which the job flow is to be restarted, and is associated with the first group, the job flow is restarted from the job in the head execution order in the second group as the starting point.

4. An information processing method comprising:

assigning an attribute including a collection, a processing, an integration and an accumulation to each of jobs in a job group which has an execution order defined in a job flow, based on a processing content of each of the jobs;

classifying, based on the attribute of each of the jobs, the jobs into a plurality of groups; and restarting, in a case where an abnormality of a first job classified into a first group of the plurality of groups is detected, by referring to a memory that stores, in association with at least one group of the plurality of groups, information which indicates a job in a head execution order in a group as a starting point from which the job flow is to be restarted among the plurality of groups, based on information which indicates a job in a head execution order in a second group as a starting point from which the job flow is to be restarted, and is associated with the first group, the job flow from the job in the head execution order in the second group as the starting point, wherein the information processing method further includes:

adding, in response to reception of a request to add a third job which precedes a second job classified into the second group of the plurality of groups to the job group, the third job to the job group;

classifying the third job into a third group of the plurality of groups based on a processing content of the third job; and updating, in a case where the third job is a job in a head execution order in the third group, information which indicates the job in the head execution order in the third group, and is stored in the memory, wherein the plurality of groups include a collection group including one or more jobs with the attribute of the collection and into which a collection job for collecting data from a data source is classified, and in the classifying, in a case where it is determined that a fifth job included in the job group is the collection job based on a processing content of the fifth job, the fifth job is classified into the collection group, wherein the plurality of groups include a processing group including one or more jobs with the attribute of the processing into which a processing job for acquiring and processing data which indicates a processing result from a single job is classified, and in the classifying, in a case where it is determined that a sixth job included in the job group is the processing job based on a processing content of the sixth job, the sixth job is classified into the processing group, wherein the plurality of groups include an integration group including one or more jobs with the attribute of the integration into which an integration job for acquiring and integrating data which indicates processing results from a plurality of jobs is classified, and in the classifying, in a case where it is determined that a seventh job included in the job group is the integration job based on a processing content of the seventh job, the seventh job is classified into the integration group, wherein the plurality of groups include an accumulation group including one or more jobs with the attribute of the accumulation into which an accumulation job for acquiring data and storing the data in a database is classified, and in the classifying, in a case where it is determined that an eighth job included in the job group is the accumulation job based on a processing content of the eighth job, the eighth job is classified into the accumulation group.

5. An information processing apparatus comprising:

a memory; and a processor coupled to the memory and configured to:

assign an attribute including a collection, a processing, an integration and an accumulation to each of jobs in a job group which has an execution order defined in a job flow, based on a processing content of each of the jobs;

classify, based on the attribute of each of the jobs, the jobs into a plurality of groups; and restart, in a case where an abnormality of a first job classified into a first group of the plurality of groups is detected, by referring to the memory that stores, in association with at least one group of the plurality of groups, information which indicates a job in a head execution order in a group as a starting point from which the job flow is to be restarted among the plurality of groups, based on information which indicates a job in a head execution order in a second group as a starting point from which the job flow is to be restarted, and is associated with the first group, the job flow from the job in the head execution order in the second group as the starting point, wherein the processor is further configured to:

add, in response to reception of a request to add a third job which precedes a second job classified into the second group of the plurality of groups to the job group, the third job to the job group;

classify the third job into a third group of the plurality of groups based on a processing content of the third job; and update, in a case where the third job is a job in a head execution order in the third group, information which indicates the job in the head execution order in the third group, and is stored in the memory, wherein the plurality of groups include a collection group including one or more jobs with the attribute of the collection and into which a collection job for collecting data from a data source is classified, and in the classifying, in a case where it is determined that a fifth job included in the job group is the collection job based on a processing content of the fifth job, the fifth job is classified into the collection group, wherein the plurality of groups include a processing group including one or more jobs with the attribute of the processing into which a processing job for acquiring and processing data which indicates a processing result from a single job is classified and in the classifying, in a case where it is determined that a sixth job included in the job group is the processing job based on a processing content of the sixth job, the sixth job is classified into the processing group, wherein the plurality of groups include an integration group including one or more jobs with the attribute of the integration into which an integration job for acquiring and integrating data which indicates processing results from a plurality of jobs is classified, and in the classifying, in a case where it is determined that a seventh job included in the job group is the integration job based on a processing content of the seventh job, the seventh job is classified into the integration group, wherein the plurality of groups include an accumulation group including one or more jobs with the attribute of the accumulation into which an accumulation job for acquiring data and storing the data in a database is classified, and in the classifying, in a case where it is determined that an eighth job included in the job group is the accumulation job based on a processing content of the eighth job, the eighth job is classified into the accumulation group.

* * * * *